US007075609B2

(12) United States Patent
Ohmuro et al.

(10) Patent No.: US 7,075,609 B2
(45) Date of Patent: Jul. 11, 2006

(54) LIQUID CRYSTAL DISPLAY DEVICE COMPRISING P-TYPE LIQUID CRYSTAL LAYER OPERATING IN VERTICALLY ALIGNED MODE INCLUDING FIRST AND SECOND RETARDATION FILMS

(75) Inventors: Katsufumi Ohmuro, Kawasaki (JP); Yoshio Koike, Kawasaki (JP); Takahiro Sasaki, Kawasaki (JP); Hideaki Tsuda, Kawasaki (JP); Hideo Chida, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/667,566

(22) Filed: Sep. 22, 2003

(65) Prior Publication Data

US 2005/0248704 A1 Nov. 10, 2005

Related U.S. Application Data

(62) Division of application No. 08/939,822, filed on Sep. 29, 1997, now Pat. No. 6,642,981.

(30) Foreign Application Priority Data

Sep. 30, 1996 (JP) .................................. 8-259872

(51) Int. Cl.
*G02F 1/1337* (2006.01)
*G02F 1/1335* (2006.01)
*G02F 1/1343* (2006.01)

(52) U.S. Cl. .................... 349/130; 349/120; 349/141; 349/118

(58) Field of Classification Search ................ 349/141, 349/117, 120
See application file for complete search history.

(56) References Cited

U.S. PATENT DOCUMENTS 3,883,227 A * 5/1975 Kobayashi et al. ............ 349/33
3,910,680 A 10/1975 Kakeda
3,912,369 A * 10/1975 Kashnow .................... 349/117
4,398,803 A 8/1983 Pohl et al.
4,701,028 A 10/1987 Clerc et al.

(Continued)

FOREIGN PATENT DOCUMENTS

CH 661361 7/1987

(Continued)

OTHER PUBLICATIONS

Machine Translation of parts of Tomoya JP06-227397.*

(Continued)

*Primary Examiner*—Andrew Schechter
*Assistant Examiner*—W. Patty Chen
(74) *Attorney, Agent, or Firm*—Greer, Burns & Crain, Ltd

(57) ABSTRACT

A liquid crystal display device includes a first substrate and a second substrate sandwiching a liquid crystal layer therebetween, a first polarizer disposed adjacent to the first substrate at a side opposite to a side of the first polarizer facing the liquid crystal layer, with a first gap between the first polarizer and the first substrate, a second polarizer disposed adjacent to the second substrate at a side opposite to a side of the second polarizer facing the liquid crystal layer, with a second gap between the second polarizer and the second substrate, wherein at least one of the first and second gaps includes therein a first retardation film having a positive optical anisotropy and a second retardation film having a negative optical anisotropy, such that the first retardation film is disposed closer to the liquid crystal layer with respect to the second retardation film.

2 Claims, 95 Drawing Sheets

U.S. PATENT DOCUMENTS

| | | | |
|---|---|---|---|
| 4,957,349 A | 9/1990 | Clerc et al. | |
| 5,138,474 A | 8/1992 | Arakawa | |
| 5,196,953 A * | 3/1993 | Yeh et al. | 349/119 |
| 5,235,450 A | 8/1993 | Yoshimura et al. | |
| 5,249,071 A * | 9/1993 | Yoshimizu et al. | 349/102 |
| 5,309,264 A | 5/1994 | Lien et al. | |
| 5,313,562 A | 5/1994 | Wiltshire | |
| 5,380,459 A * | 1/1995 | Kanemoto et al. | 252/299.01 |
| 5,477,358 A | 12/1995 | Rosenblatt et al. | |
| 5,576,867 A * | 11/1996 | Baur et al. | 349/142 |
| 5,602,662 A | 2/1997 | Rosenblatt et al. | |
| 5,608,556 A | 3/1997 | Koma | |
| 5,621,558 A | 4/1997 | Shimada et al. | |
| 5,666,179 A | 9/1997 | Koma | |
| 5,694,188 A * | 12/1997 | Sano et al. | 349/139 |
| 5,757,454 A | 5/1998 | Ogishima et al. | |
| 5,757,455 A | 5/1998 | Sugiyama et al. | |
| 5,796,456 A | 8/1998 | Takatori et al. | |
| 5,805,253 A | 9/1998 | Mori et al. | |
| 5,808,705 A | 9/1998 | Hishida et al. | |
| 6,057,901 A | 5/2000 | Xu | |
| 6,061,116 A | 5/2000 | Nishida et al. | |
| 6,141,075 A | 10/2000 | Ohmuro et al. | |
| 6,181,402 B1 * | 1/2001 | Shim et al. | 349/130 |
| 6,281,956 B1 | 8/2001 | Ohmuro et al. | |
| 6,320,634 B1 * | 11/2001 | Winker et al. | 349/117 |

FOREIGN PATENT DOCUMENTS

| | | |
|---|---|---|
| EP | 0350382 | 1/1990 |
| EP | 0538796 | 4/1993 |
| FR | 2595156 | 9/1987 |
| GB | 1475378 | 6/1977 |
| JP | 50-93665 | 7/1975 |
| JP | 53-120299 | 10/1978 |
| JP | 57-618 | 1/1982 |
| JP | 57-40229 | 3/1982 |
| JP | 60-211421 | 10/1985 |
| JP | 62-180326 | 8/1987 |
| JP | 2-15239 | 1/1990 |
| JP | 2-176625 | 7/1990 |
| JP | 2-548979 | 7/1990 |
| JP | 2-242225 | 9/1990 |
| JP | 3-5721 | 1/1991 |
| JP | 03-103822 | 4/1991 |
| JP | 3-223812 | 10/1991 |
| JP | 03-243919 | 10/1991 |
| JP | 4-14329 | 3/1992 |
| JP | 04-153621 | 5/1992 |
| JP | 4-225325 | 8/1992 |
| JP | 5-53134 | 3/1993 |
| JP | 05-66401 | 3/1993 |
| JP | 5-113561 | 5/1993 |
| JP | 6-43462 | 2/1994 |
| JP | 06222397 A * | 8/1994 |
| JP | 6-301036 | 10/1994 |
| JP | 7-13164 | 1/1995 |
| JP | 7-28063 | 1/1995 |
| JP | 7-191320 | 7/1995 |
| JP | 07-244280 | 9/1995 |
| JP | 8-43825 | 2/1996 |
| JP | 08043861 A * | 2/1996 |
| JP | 08-122750 | 5/1996 |
| JP | 8-201802 | 8/1996 |
| JP | 9-29455 | 2/1997 |
| JP | 10-123576 | 5/1998 |
| WO | 95/00879 | 1/1995 |
| WO | 96/10774 | 4/1996 |

OTHER PUBLICATIONS

Soref, Field Effect in Nematic Liquid Crsytal obtained with interdigital electrodesJ Ap Phys, vol. 45, No. 12, Dec. 1974, pp. 5466-5467.*

Wu, "Phase Matched Compensation Films for LCDs", SID 95, May 1995, pp. 555-558.*

S. Yamaguchi, M. Aizawa, J.F. Clerc, T. Uchida, J. Duchene, "Homeotropic-Alignment Full-Color LCD" '89 Digest pp. 378-381.

Hitoshi Hatoh, Kiyoshi Shohara, Yoshihiro Kinoshita, and Noriko Ookoshi "Molecular tilt direction in a slightly tilted homeotropic aligned liquid crystal cell" Applied Physics Letters vol. 63 (1993) No. 26, pp. 3577-3579.

F. Clerc "Electro-optical limits of the electrically controlled birefringence effect in nematic liquid crystals", Displays, pp. 341-347, Oct. 1981.

* cited by examiner $$\frac{R'}{\Delta n d} = 0.6$$

$$\frac{R'}{\Delta nd} = 0.75$$

d = 1 μm d = 3 μm d = 4 μm d = 5 μm

PRETILT= 89.99°
CELL= 3μm, 45° TWIST

PRETILT= 75°
CELL= 3μm, 45° TWIST

FIG. 54
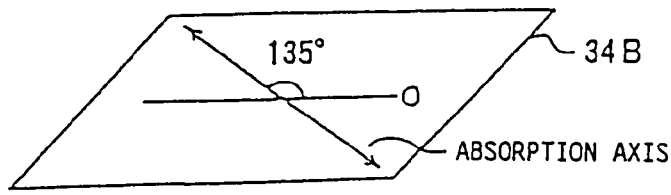
$n_x = n_y > n_z$
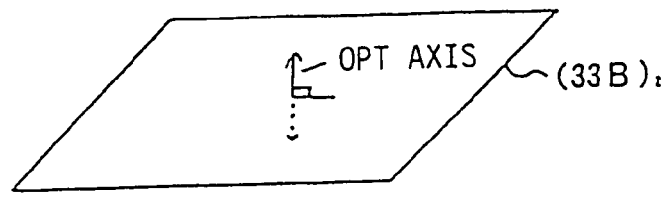
$n_x > n_y = n_z$
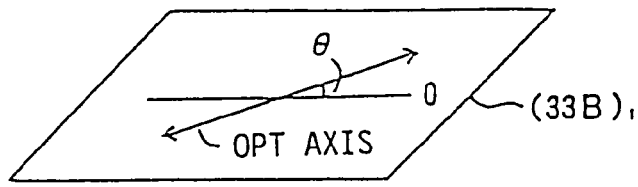
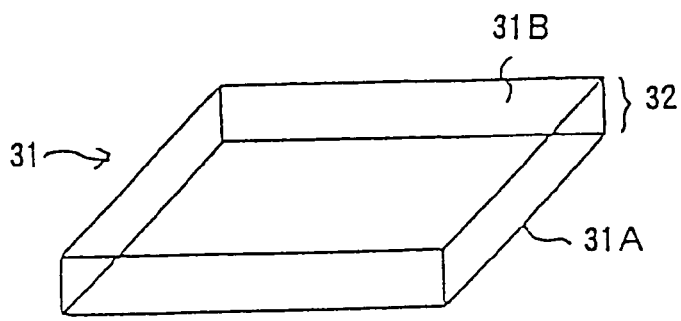
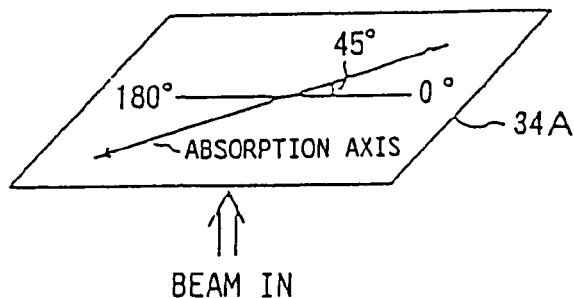

FIG.70
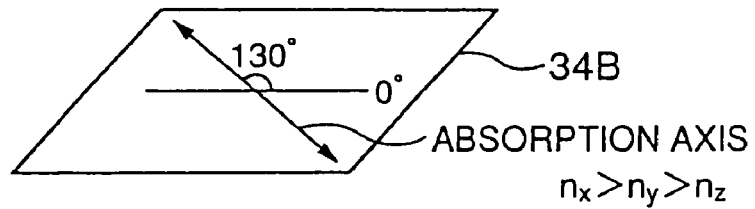
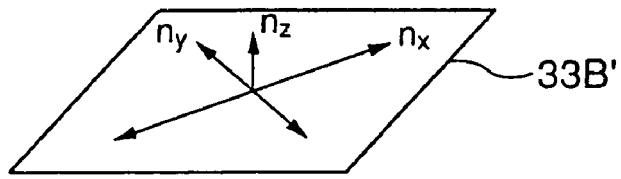
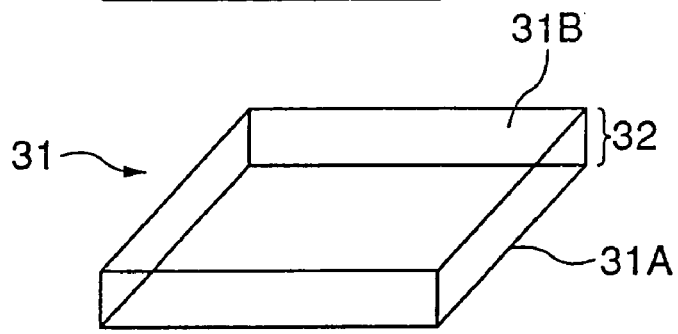
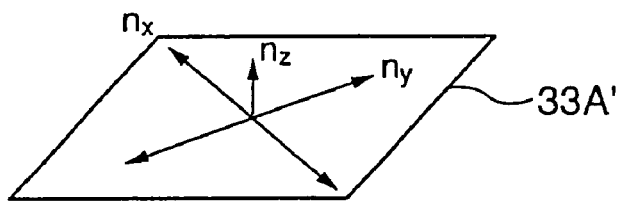
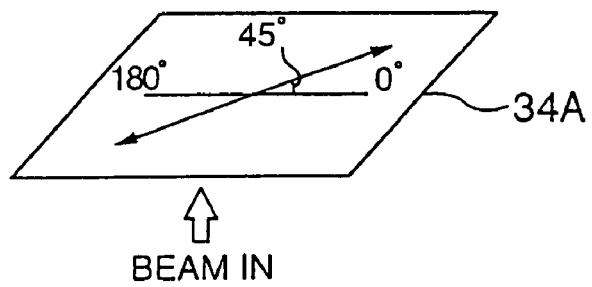

FIG.72
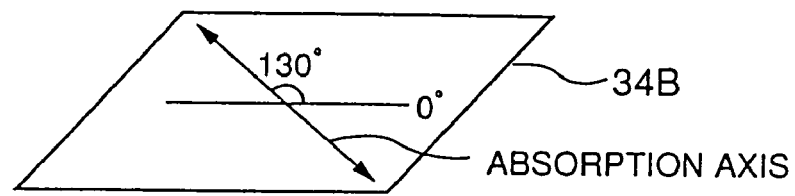
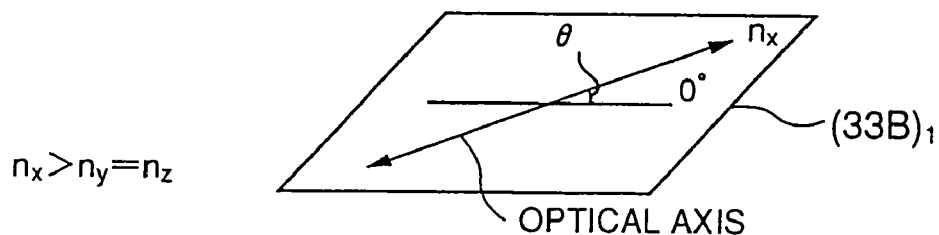
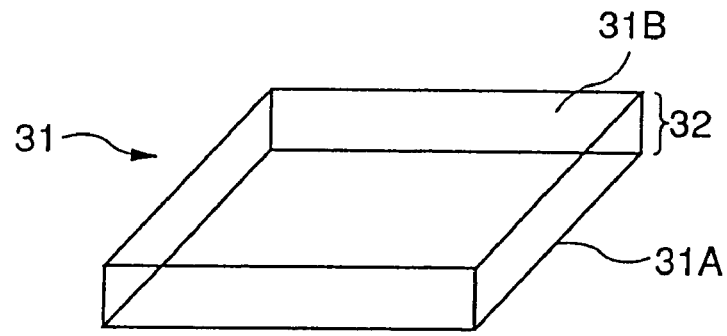
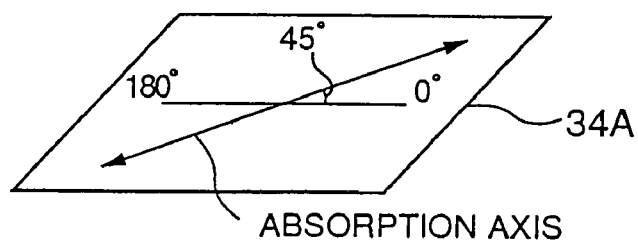
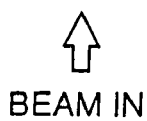

LIQUID CRYSTAL DISPLAY DEVICE COMPRISING P-TYPE LIQUID CRYSTAL LAYER OPERATING IN VERTICALLY ALIGNED MODE INCLUDING FIRST AND SECOND RETARDATION FILMS

This is a divisional, of application Ser. No. 08/939,822, filed Sep. 29, 1997 now U.S. Pat. No. 6,642,981.

BACKGROUND OF THE INVENTION

The present invention generally relates to liquid crystal display devices and more particularly to a liquid crystal display device operating in a so-called VA (Vertically Aligned) mode in which liquid crystal molecules having a negative dielectric anisotropy or positive dielectric anisotropy are aligned generally perpendicularly to a panel surface of the liquid crystal display device.

Liquid crystal display devices are used as a display device of various information processing apparatuses such as a computer. Liquid crystal display devices, having a compact size and consuming little electric power, are particularly suitable for application in portable information processing apparatuses. On the other hand, use of such liquid crystal display devices also in a fixed-type information processing apparatus such as a desktop-type computer, is also studied.

Conventional liquid crystal display devices generally use a so-called TN (Twisted Nematic)-mode construction in which p-type liquid crystal molecules having a positive dielectric anisotropy are aligned horizontally between a pair of mutually opposing panel substrates, wherein the liquid crystal molecules adjacent to one panel substrate and the liquid crystal molecules adjacent to the other panel substrate are aligned in respective directions crossing with each other perpendicularly.

In such a TN-mode liquid crystal display device, various liquid crystals are already developed, and the liquid crystal display device can be fabricated by a well-established process with low cost.

On the other hand, a TN-mode liquid crystal display device has a drawback in realizing a high contrast representation of images. It should be noted that a TN-mode liquid crystal display device provides a black representation by causing the liquid crystal molecules to align vertically to the principal surface of the panel substrate by applying a driving electric field, while the liquid crystal molecules immediately adjacent to the panel substrate tend to maintain the horizontal alignment even when the driving electric field is applied. Thereby, the birefringence associated with such horizontal liquid crystal molecules allows a passage of light even in the activated state in which the passage of light through the liquid crystal layer should be interrupted completely. Thus, there occurs a leakage of light or coloring of the panel when an attempt is made in a TN-mode liquid crystal display device to display a white image on a black background (so-called "normally black mode") as is commonly adopted in a CRT display device. Thus, the black representation becomes worse than that of a "normally white mode," in which black images are displayed on a white background, because of dispersion. This is the reason why conventional TN-mode liquid crystal display devices are operated in the normally white mode.

A VA-mode liquid crystal display device is a liquid crystal display device in which liquid crystal molecules having a negative or positive dielectric anisotropy are confined between a pair of panel substrates in a state that the liquid crystal molecules are aligned in a direction generally perpendicular to the principal surface of the panel substrates in a non-activated state of the liquid crystal display device. Thus, a light passes through a liquid crystal layer in such a liquid crystal display device without changing the polarization plane thereof in the non-activated state of the liquid crystal device, and the light is effectively interrupted by a pair of polarizers disposed at both sides of the liquid crystal layer in a crossed Nicol state. In such a VA-mode liquid crystal display device, therefore, it is possible to achieve a near-ideal black representation in the non-activated state of the liquid crystal display device. In other words, such a VA-mode liquid crystal display device can easily achieve a very high contrast representation not possible by a TN-mode liquid crystal display device.

In an activated state of a VA-mode liquid crystal display device, it should be noted that the liquid crystal molecules are aligned generally parallel to the panel substrates due to the electric field applied to the liquid crystal molecules, and a rotation is induced in the polarization state of an incident optical beam. Thereby, the liquid crystal molecules thus activated show a 90°-twist between the first panel substrate and the second panel substrate.

The VA-mode itself has been known for a long time. Further, there exists a report about the property of a liquid crystal having a negative dielectric anisotropy (D. de Rossi, J. Appl. Phys. 49(3), March, 1978).

On the other hand, it has been thought conventionally that a VA-mode liquid crystal display device cannot provide the quality of representation comparative to that of a TN-mode liquid crystal display device, in terms of response time, viewing-angle characteristics, voltage retention (or voltage holding ratio), and the like. Thus, little effort has been made so far for realizing a practical liquid crystal display device using a VA-mode liquid crystal. Particularly, it has been believed that construction of an active-matrix liquid crystal display device that uses thin-film transistors (TFT) is very difficult.

As a VA-mode liquid crystal can provide a contrast ratio superior to that of a conventional CRT (cathode-ray tube) display device, it is predicted that the major target of such a VA-mode liquid crystal display device would be to replace conventional CRT display devices. In order to achieve this target, however, it is particularly necessary to improve the viewing-angle characteristics of the display device, in addition to usual requirements of increasing the display area and improving the response.

Japanese Laid-open Patent Publication 62-180326 describes a VA-mode liquid crystal display device in which a liquid crystal layer formed of liquid crystal molecules having a negative dielectric anisotropy, is confined between a pair of glass substrates such that the liquid crystal molecules align generally perpendicularly to the substrate surface in a non-activated state thereof in which no drive voltage is applied across the glass substrates. The reference further describes a construction to cause a 90°-twist for the liquid crystal molecules in the direction generally parallel to the substrate surface in the activated state thereof in which the drive voltage is applied across the substrates. Further, the reference teaches to dispose a polarizer and an analyzer at respective outer sides of the glass substrates such that respective optical absorption axes intersect perpendicularly with each other.

Japanese Laid-open Patent Publication 3-5721, on the other hand, describes a VA-mode liquid crystal display device in which a liquid crystal layer formed of liquid crystal molecules having a negative dielectric anisotropy, is confined between a pair of substrates, In the above noted reference, the liquid crystal layer has a retardation set in a range between 0.6 μm and 0.9 μm, and first and second birefringence media are disposed at both sides of a liquid crystal panel thus formed. Further, the reference teaches to provide a polarizer and an analyzer at respective outer sides of the foregoing birefringence media so as to cross the respective optical absorption axes perpendicularly. Further, the reference teaches to set the optical absorption axes so as to form a 45° angle with respect to the optical axes of the birefringence media.

Further, Japanese Laid-open Patent Publication 5-113561 describes a photo-conduction type liquid crystal light valve, wherein the reference teaches the use of a liquid crystal of negative dielectric anisotropy for a liquid crystal layer provided adjacent to a photo-conduction layer, such that the liquid crystal molecules align generally perpendicularly to the electrode surface in the non-activated state of the liquid crystal layer. Further, the reference teaches a feature to set the retardation of the liquid crystal layer to be 0.3 μm or more.

Further, Japanese Laid-open Patent Publication 5-113561 describes a VA-mode liquid crystal display device that includes optical compensation means having a negative optical activity in addition to a pair of substrates that confine a liquid crystal layer of liquid crystal molecules having a negative dielectric anisotropy therebetween, wherein the liquid crystal display device further includes first and second quarter-wavelength phase shift plates such that the first phase shift plate has a positive optical activity and an optical axis parallel to the substrates and such that the second phase shift plate has a negative optical activity and an optical axis parallel to the optical axis of the first phase shift plate. The liquid crystal display device of the reference further includes a polarizer and an analyzer in a crossed Nicol state such that the polarizer and the analyzer sandwich the foregoing construction therebetween.

However, such conventional VA-mode liquid crystal devices, while capable of providing a contrast ratio exceeding the contrast ratio achieved by the conventional TN-mode or STN-mode liquid crystal display devices, cannot provide response, viewing-angle characteristics, brightness and colorless representation required for a desktop display device.

SUMMARY OF THE INVENTION

Accordingly, it is a general object of the present invention to provide a novel and useful liquid crystal display device wherein the foregoing problems are eliminated.

Another and more specific object of the present invention is to provide a VA-mode liquid crystal display device that uses a liquid crystal having a negative or positive dielectric anisotropy, in which the liquid crystal display device is optimized with respect to response, viewing-angle and contrast of representation.

Another object of the present invention is to provide a liquid crystal display device, comprising:

a first substrate and a second substrate sandwiching a liquid crystal layer therebetween;

a first polarizer disposed adjacent to said first substrate at a side opposite to a side of said first polarizer facing said liquid crystal layer, with a first gap between said first polarizer and said first substrate;

a second polarizer disposed adjacent to said second substrate at a side opposite to a side of said second polarizer facing said liquid crystal layer, with a second gap between said second polarizer and said second substrate;

at least one of said first and second gaps including therein a first retardation film having a positive optical anisotropy and a second retardation film having a negative optical anisotropy, such that said first retardation film is disposed closer to said liquid crystal layer with respect to said second retardation film.

According to the present invention, a wide viewing-angle is realized in a VA-mode liquid crystal display device by disposing the first and second retardation films adjacent to the liquid crystal layer.

Another object of the present invention is to provide a liquid crystal display device, comprising:

a first substrate and a second substrate sandwiching a liquid crystal layer therebetween;

a first polarizer disposed adjacent to said first substrate at a side opposite to a side of said first polarizer facing said liquid crystal layer, with a first gap between said first polarizer and said first substrate;

a second polarizer disposed adjacent to said second substrate at a side opposite to a side of said second polarizer facing said liquid crystal layer, with a second gap between said second polarizer and said second substrate;

at least one of said first and second gaps including therein an optically biaxial retardation film.

According to the present invention, a wide viewing-angle can be realized by using the optically biaxial retardation film adjacent to the liquid crystal layer.

Another object of the present invention is to provide a liquid crystal display device, comprising:

first and second substrates disposed substantially parallel to each other, said first substrate having a first principal surface at a side thereof facing said second substrate, said second substrate having a second principal surface at a side thereof facing said first substrate;

a first electrode pattern provided on said first principal surface of said first substrate;

a second electrode pattern provided on said second principal surface of said second substrate;

a first molecular orientation film disposed on said first principal surface of said first substrate so as to cover said first electrode pattern;

a second molecular orientation film disposed on said second principal surface of said second substrate so as to cover said second electrode pattern;

a liquid crystal layer confined between said first and second molecular orientation films;

said liquid crystal layer containing liquid molecules such that a major axis of said liquid crystal molecule aligns generally perpendicularly to at least one of said first and second principal surfaces;

said liquid crystal layer having a retardation of about 80 nm or more but below about 400 nm.

According to the present invention, it becomes possible to construct the liquid crystal display device to have a wide viewing-angle, high response speed and a colorless, high-contrast representation.

Other objects and further features of the present invention will become apparent from the following detailed description when read in conjunction with the attached drawings.

BRIEF DESCRIPTION OF THE DRAWINGS

FIG. 54 is a diagram showing a construction of the liquid crystal display device according to a third embodiment of the present invention;

FIG. 70 is a diagram showing the construction of a liquid crystal display device according to a seventh embodiment of the present invention;

FIG. 72 is a diagram showing the construction of a liquid crystal display device according to an eighth embodiment of the present invention;

DETAILED DESCRIPTION OF THE PREFERRED EMBODIMENTS

[Principle]

First, the principle of the present invention will be explained.

Figure 1:
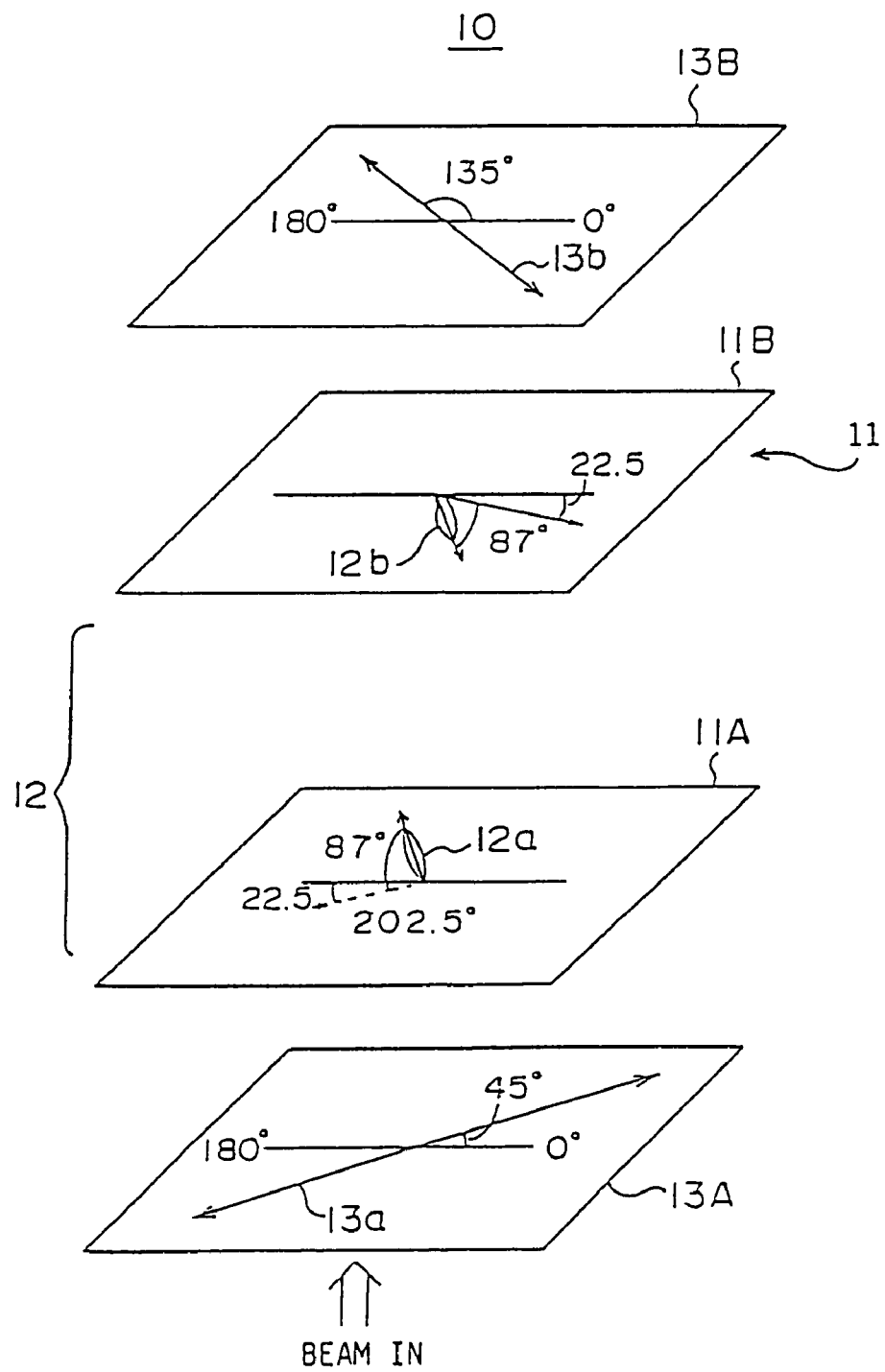
FIG. 1 is a diagram showing the fundamental construction of a liquid crystal display device of the present invention.

FIG. 1 shows the construction of a liquid crystal display device 10, wherein it should be noted that FIG. 1 represents the fundamental construction of the liquid crystal display device of the present invention.

Referring to FIG. 1, the liquid crystal device 10 includes a pair of mutually opposing glass substrates 11A and 11B confining therebetween a liquid crystal layer 12 having a thickness d. Thereby, the substrates 11A and 11B and the liquid crystal layer 12 form together a liquid crystal panel 11. Further, a first polarizer 13A having an absorption axis 13a in a first direction is disposed below the liquid crystal panel 11, and a second polarizer (called also "analyzer") 13B having an absorption axis 13b in a second direction is disposed above the liquid crystal panel 11.

In the liquid crystal display device 10 of FIG. 1, it should be noted that the liquid crystal layer 12 is formed of an n-type liquid crystal having a negative dielectric anisotropy or a p-type liquid crystal having a positive dielectric anisotropy. Thereby, each of the substrates 11A and 11B carries thereon a molecular alignment layer (not shown), and the molecular alignment films thus formed are prepared, typically by means of rubbing, such that liquid crystal molecules 12a adjacent to the lower substrate 11A are aligned generally vertically to the substrate 11A. Similarly, liquid crystal molecules 12b adjacent to the upper substrate 11B are aligned generally vertically to the substrate 11B. In other words, the liquid crystal display device 10 is a device of the so-called VA (vertically aligned)-mode.

In the construction of FIG. 1, it should be noted that the lower substrate 11A carries, on an upper major surface thereof, a first molecular alignment layer (not illustrated, to be described later with reference to embodiments), wherein the first molecular alignment layer is subjected to a rubbing process in a direction offset in the counter-clockwise direction from the longer edge of the substrate 11A by an angle of 22.5°. The first molecular alignment layer thus processed causes a director, which indicates the direction of alignment of the liquid crystal molecules 12a, to point a direction offset in an upward direction from the rubbing direction of the first molecular alignment layer by an angle of about 87°.

Similarly, the upper substrate 11B carries, on a lower major surface thereof, a second molecular alignment layer (not illustrated, to be described later with reference to embodiments), wherein the second molecular alignment layer is subjected to a rubbing process in a direction offset in the clockwise direction from the longer edge of the substrate 11B by an angle of 22.5°. The second molecular alignment layer thus processed causes a director of the liquid crystal molecules 12b to point a direction offset in a downward direction from the rubbing direction of the second molecular alignment layer by an angle of about 87°. Thereby, the liquid crystal molecules in the liquid crystal layer 12 form a twist angle of 45° between the upper and lower substrates 11A and 11B.

It should be noted that the substrates 11A and 11B are set in the respective orientations, when forming the liquid crystal panel 11, such that the general rubbing direction of the substrate 11A and the general rubbing direction of the substrate 11B are opposite of each other.

As already noted, the polarizer 13A having the absorption axis 13a is disposed below the liquid crystal panel 11, wherein the polarizer 13A polarizes an optical beam incident to the liquid crystal panel 11 from the lower direction, such that the plane of polarization is perpendicular to the foregoing absorption axis 13a. Similarly, the polarizer 13B having the absorption axis 13b is disposed above the liquid crystal panel 11, wherein the polarizer 13B polarizes the optical beam incident to the liquid crystal panel 11 from the lower direction, such that the plane of polarization is perpendicular to the absorption axis 13b.

Thus, by disposing the polarizers 13A and 13B such that respective absorption axes 13a and 13b intersect each other perpendicularly, it is possible to interrupt the optical beam passing through the liquid crystal panel 11 without a substantial change of the polarization plane. In other words, the polarizer 13B interrupts the optical beam polarized by the polarizer 13A and passed through the liquid crystal panel 11 without experiencing a rotation of the polarization plane, and the liquid crystal display device provides a black representation.

It should be noted that each of the substrates 11A and 11B carries a transparent electrode (not illustrated) in the state that the transparent electrode is embedded in the molecular alignment layer. In the non-activated state of the liquid crystal device in which no drive voltage is applied across the electrodes, the liquid crystal molecules in the liquid crystal layer 12 align generally vertically to the substrates as in the case of the liquid crystal molecule 12a or the liquid crystal molecule 12b. Thereby, a near-ideal black representation is achieved in the non-activated state of the liquid crystal display device.

In an activated state, on the other hand, the liquid crystal molecules are aligned generally parallel to the substrates 11A and 11B. Thereby, the optical beam passing through the liquid crystal panel 11 experiences a rotation of the polarization plane due to such horizontally aligned liquid crystal molecules and passes through the polarizer 13B. Thereby, the liquid crystal display device 10 provides a white representation in the activated state.

Figure 2A:
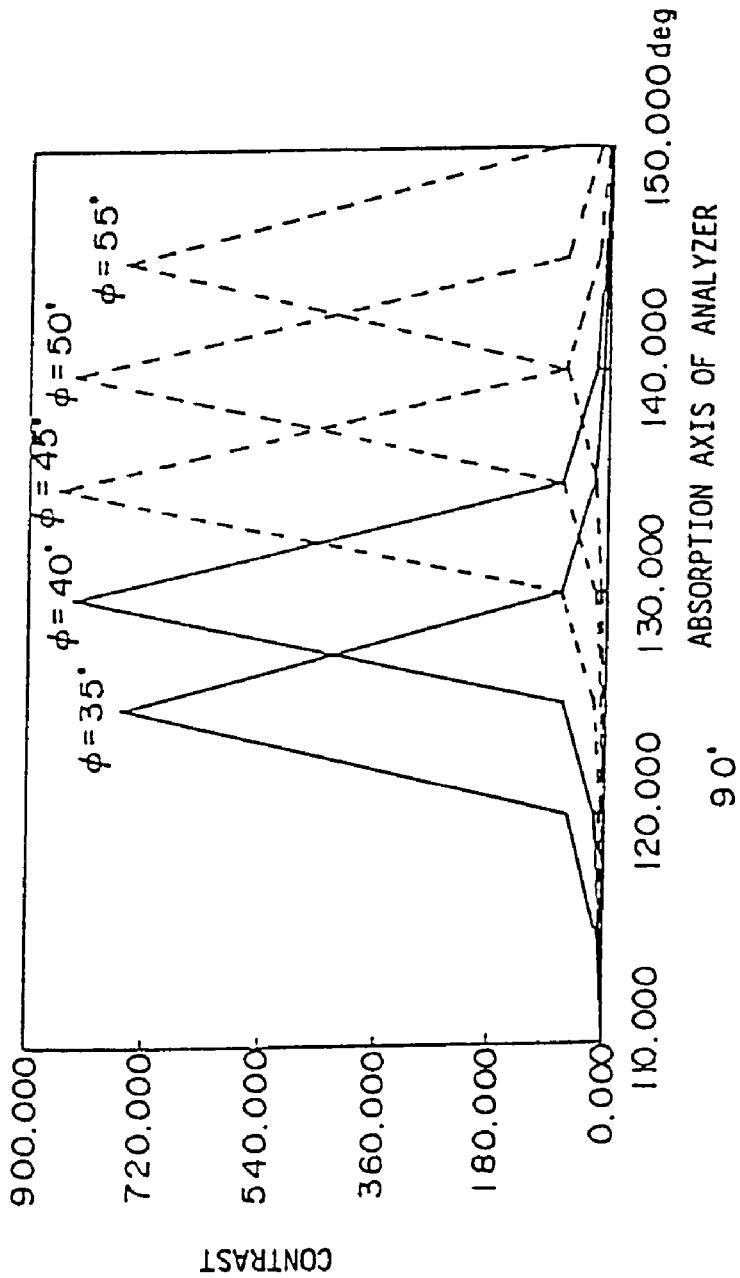
FIGS. 2A and 2B are diagrams respectively showing the relationship between the contrast and orientation of polarizers used in the liquid crystal display device of FIG. 1 and the definition of parameters used in FIG. 2A.
Figure 2B:
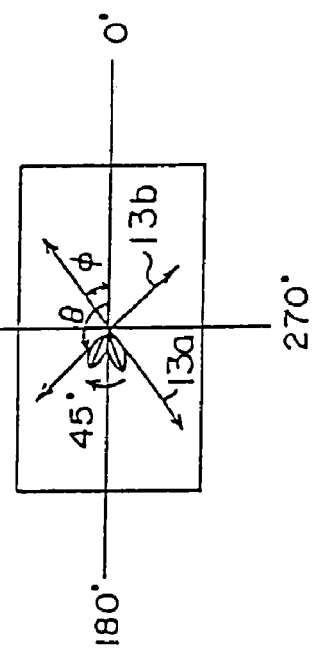

FIG. 2A shows the contrast ratio achieved by the liquid crystal display device 10 for the case in which the angle $\phi$ of the absorption axis 13a and the angle $\theta$ of the absorption axis 13b are changed variously, wherein the definition of the angles $\phi$ and $\theta$ is given in FIG. 2B. The contrast ratio was measured by comparing the transmittance of the liquid crystal display device 10 for the non-activated state in which no drive voltage is applied and the transmittance of an activated state in which a drive voltage of 5 V is applied.

In the example of FIG. 2A, a liquid crystal supplied from E. Merck, Inc. (MJ95785, $\Delta n=0.0813$, $\Delta \in =-4.6$) is used for the liquid crystal layer 12, wherein $\Delta \in$ represents the dielectric anisotropy of the liquid crystal, while $\Delta n$ represents the birefringence of the liquid crystal defined as $\Delta n = n_e - n_o$, in which $n_e$ is a refractive index of an extraordinary ray in the liquid crystal while no represents a refractive index of an ordinary ray also in the liquid crystal. Further, a commercially available product of Nitto Denko KK (G1220DU) is used for the polarizers 13A and 13B. The thickness d of the liquid crystal layer 12 is set to 3.5 µm.

In FIG. 2B showing the definition of the angles $\phi$ and $\theta$, it should be noted that, in order to represent the twist angle and to define the center of the twist clearly, the upper substrate 11B is illustrated in a state rotated by 180° to the state of FIG. 1.

Referring to FIG. 2A, it should be noted that the contrast ratio of the liquid crystal display device 10 becomes maximum in the crossed-Nickol state in which the absorption axis 13a of the polarizer 13A and the absorption axis 13b of the polarizer 13B intersect perpendicularly, and particularly when the angle $\phi$ is set to 45° ($\phi=45°$). In this state, it should be noted that the absorption axis 13a of the polarizer 13A forms an angle of 45° with respect to the center line C of twist, which coincides with a line represented in FIG. 2B by 0°–180°. In the crossed Nickol state, therefore, the angle of the absorption axis 13b of the polarizer 13B with respect to the center line C of the twist becomes 135°.

It will be obvious that a similar maximum of the contrast ratio is also achieved when the angles $\phi$ and $\theta$ are set respectively to −45° and −135°. In this case, the absorption axis 13a of the polarizer 13A forms the angle of 135° with respect to the center line C of the twist, while the absorption axis 13b of the polarizer 13B forms the angle of 45°.

As will be seen from FIG. 2A, the liquid crystal display device 10 achieves a contrast ratio exceeding 700 for any settings of the angles $\phi$ and $\theta$. This is a remarkable improvement over normal TN-mode liquid crystal display devices, in which the maximum contrast ratio is in the order of 100 at best.

FIGS. 3A–3D show the operational characteristics of the liquid crystal display device 10 of FIG. 1, wherein the results shown in FIGS. 3A–3D are for the liquid crystal display device having the construction described already.

Figure 3A:
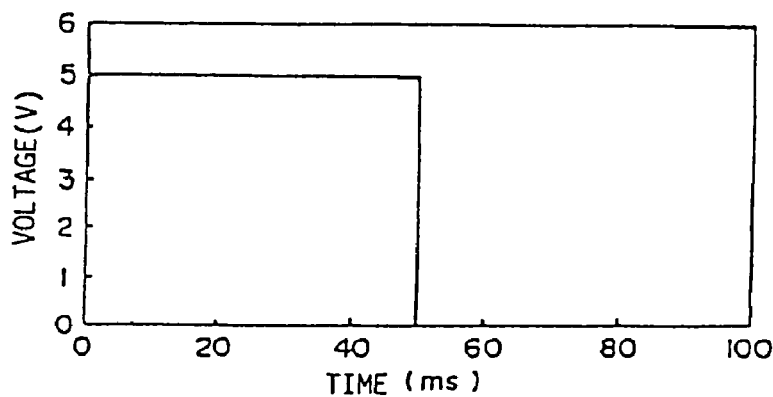
FIGS. 3A–3D are diagrams showing a dynamic performance of the liquid crystal display device of FIG. 1 for various constructions.
Figure 3B:
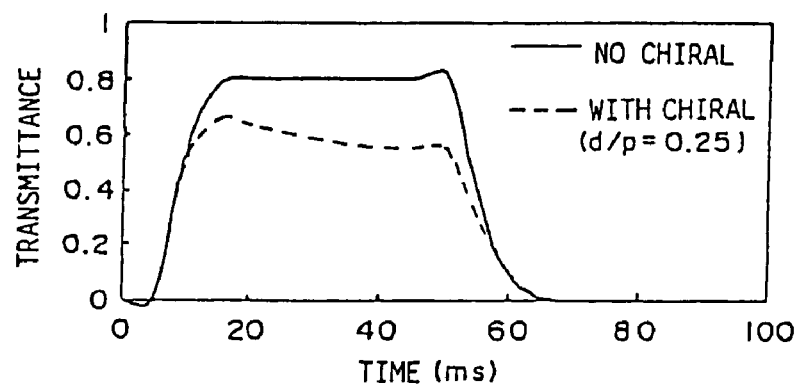

Referring to the drawings, FIG. 3A shows the waveform of the drive voltage pulse applied to the liquid crystal layer in the liquid crystal panel 11, while FIG. 3B shows the change of the transmittance occurring in the liquid crystal panel 11 in response to the drive voltage pulse of FIG. 3A.

In FIG. 3B, the continuous line represents the result in which no chiral substance is added to the liquid crystal layer 12 in the panel 11, while the broken line represents the result in which a chiral substance is added, as is commonly practiced in a TN-mode liquid crystal display device. The result of FIG. 3B is for the case in which the thickness d of the liquid crystal layer 12 is set to 3.5 µm and the twist angle of the liquid crystal molecules is set to 45° as already noted. In the example of FIG. 3B, the chiral substance admixed in the liquid crystal layer 12 has a pitch p set such that a ratio d/p with respect to the thickness d of the liquid crystal layer is 0.25.

The result of FIG. 3B clearly indicates that admixing of the chiral substance in the liquid crystal layer 12 provides an adverse effect on the dynamic response of the liquid crystal display device 10 substantially. More specifically, it is noted that, while the liquid crystal display device 10 shows a high optical transmittance continuously in response to the drive voltage pulse of FIG. 3A for the entire duration of the drive voltage pulse when no chiral substance is added to the liquid crystal layer, the optical transmittance decreases with time when the chiral substance is added, even when the electric drive pulse is applied to the liquid crystal layer 12 continuously with a constant magnitude.

Figure 3C:
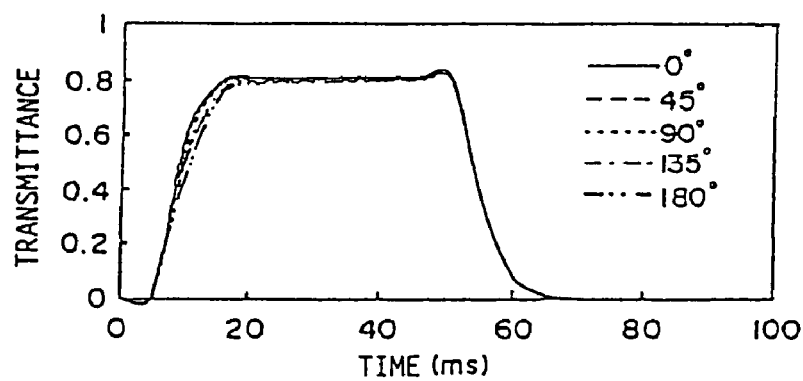

FIG. 3C shows the transmittance of the liquid crystal display device 10 in response to the voltage pulse of FIG. 3A for the case in which the thickness d of the liquid crystal layer 12 is set to 3.5 µm, wherein the twist angle of the liquid crystal molecules is changed in the experiment of FIG. 3C in the range between 0°–90°. As will be seen clearly from FIG. 3C, the dynamic response is not affected substantially by the twist angle of the liquid crystal molecules. In the experiment of FIG. 3C, it should be noted that the twist angle was controlled by setting the rubbing directions of the substrates 11A and 11B.

Figure 3D:
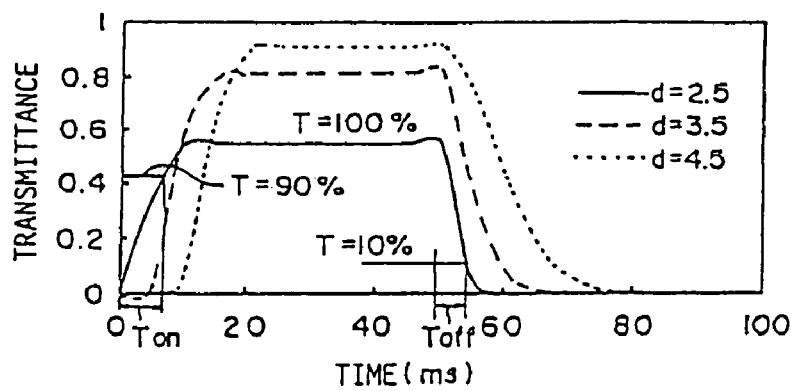

FIG. 3D shows the change of the transmittance in response to the voltage pulse of FIG. 3A of the liquid crystal display device 10 wherein the thickness d of the liquid crystal layer 12 is changed variously in the range between 4.5 µm and 2.5 µm. As can be seen clearly from FIG. 3D, the magnitude of change of the transmittance decreases with the decrease of the thickness d. Further, it should be noted that a turn-on transient time $T_{on}$, indicating the time needed for the transmittance of the liquid crystal display device 10 to reach, starting from a 0% transmittance state, a 90% transmittance state of the saturated transmittance (T=100%), decreases with decreasing thickness d of the liquid crystal layer 12. Similarly, a turn-off transient time $T_{off}$, indicating the time needed for the transmittance of the device 10 to reach, starting from a saturated transmittance state (T=100%), a 10% transmittance state of the saturated state, decreases with decreasing thickness d of the liquid crystal layer 12. In other words, the response of the liquid crystal display device 10 becomes faster with decreasing thickness d of the liquid crystal layer 12. Particularly, the rising and falling of the transmittance becomes very sharp when the thickness d is set to 2.5 µm or less.

Figure 4A:
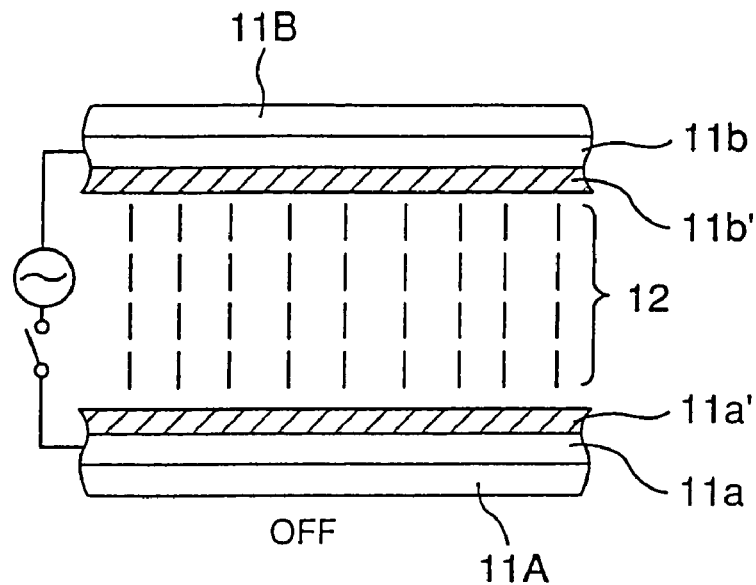
FIGS. 4A and 4B are diagrams showing the principle of a VA-mode liquid crystal display device that uses a liquid crystal having a negative dielectric anisotropy.
Figure 4B:
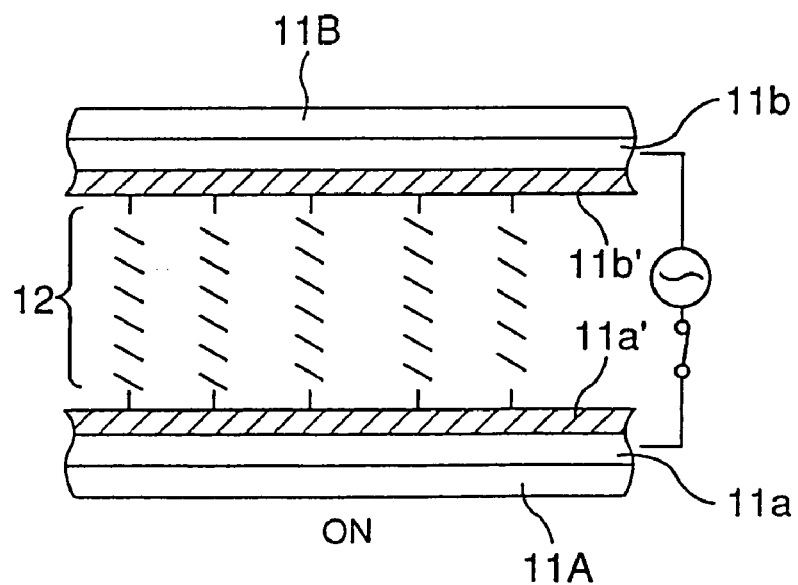

FIGS. 4A and 4B show the operation of the liquid crystal display device of FIG. 1 for the case in which a liquid crystal having a negative dielectric anisotropy is used for the liquid crystal layer 12.

Referring to FIGS. 4A and 4B, it should be noted that the glass substrate 11A carries thereon an electrode pattern 11a and a molecular alignment film 11a' while the glass substrate 11B carries thereon an electrode pattern 11b and a molecular alignment film 11b.' Further, a liquid crystal layer 12 is confined between the molecular alignment films 11a' and 11b.'

In the state of FIG. 4A, showing an non-activated state in which no drive voltage is applied across the electrode patterns 11a and 11b, it should be noted that the liquid crystal molecules align generally perpendicularly to the principal surface of the substrate 11A or 11B as a result of the interaction with the molecular alignment film 11a' or 11b.'

When a drive voltage is applied across the electrode patterns 11a and 11b, on the other hand, the liquid crystal molecules having the negative dielectric anisotropy are aligned in a generally horizontal direction such that the liquid crystal molecules intersect generally perpendicular to the driving electric field across the electrode patterns 11a and 11b.

Figure 5A:
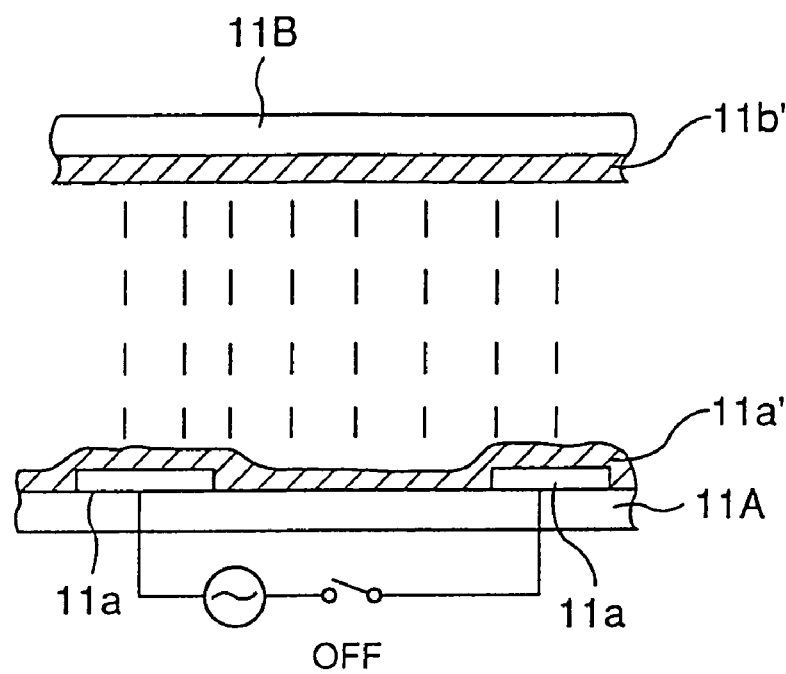
FIGS. 5A and 5B are diagrams showing the principle of a VA-mode liquid crystal display device that uses a liquid crystal having a positive dielectric anisotropy.
Figure 5B:
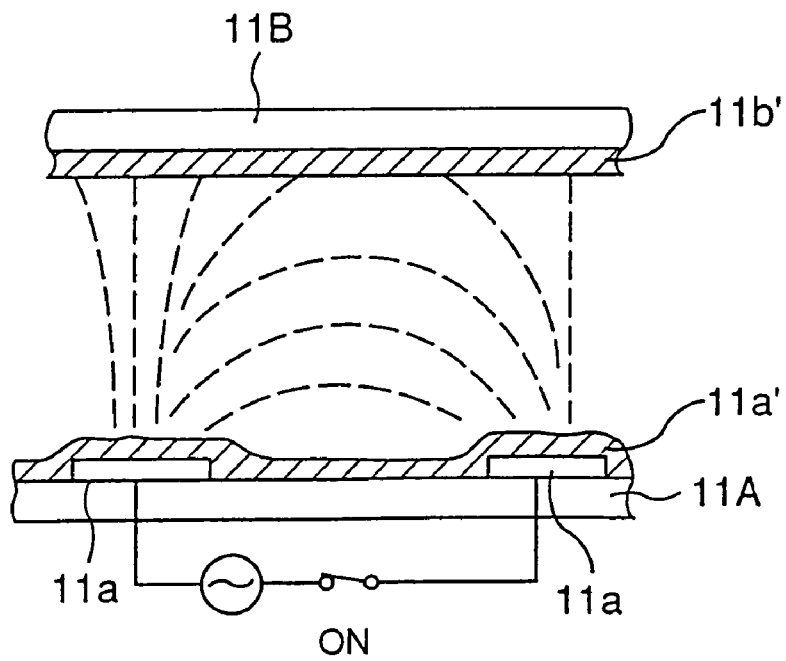

FIGS. 5A and 5B show the operation of the VA-mode liquid crystal display device of FIG. 1 in which a liquid crystal having a positive dielectric anisotropy is used for the liquid crystal layer 12. In FIG. 5A and 5B, those parts corresponding to the parts described previously are designated by the same reference numerals and the description thereof will be omitted.

Referring to FIGS. 5A and 5B, it should be noted that no electrode pattern is formed on the substrate 11B, and a pair of adjacent electrode patterns 11a are formed on the substrate 11A.

In the non-activated state of FIG. 5A, the liquid crystal molecules are aligned generally vertically to the principal surface of the substrate 11A or 11B, similarly to the case of FIG. 4A, while it should be noted that the liquid crystal molecules are generally aligned horizontally in the activated state of FIG. 5B, in which a drive voltage is applied across the adjacent pair of the electrode patterns 11a, along the electric field formed between the foregoing electrode patterns 11a.

Figure 6A:
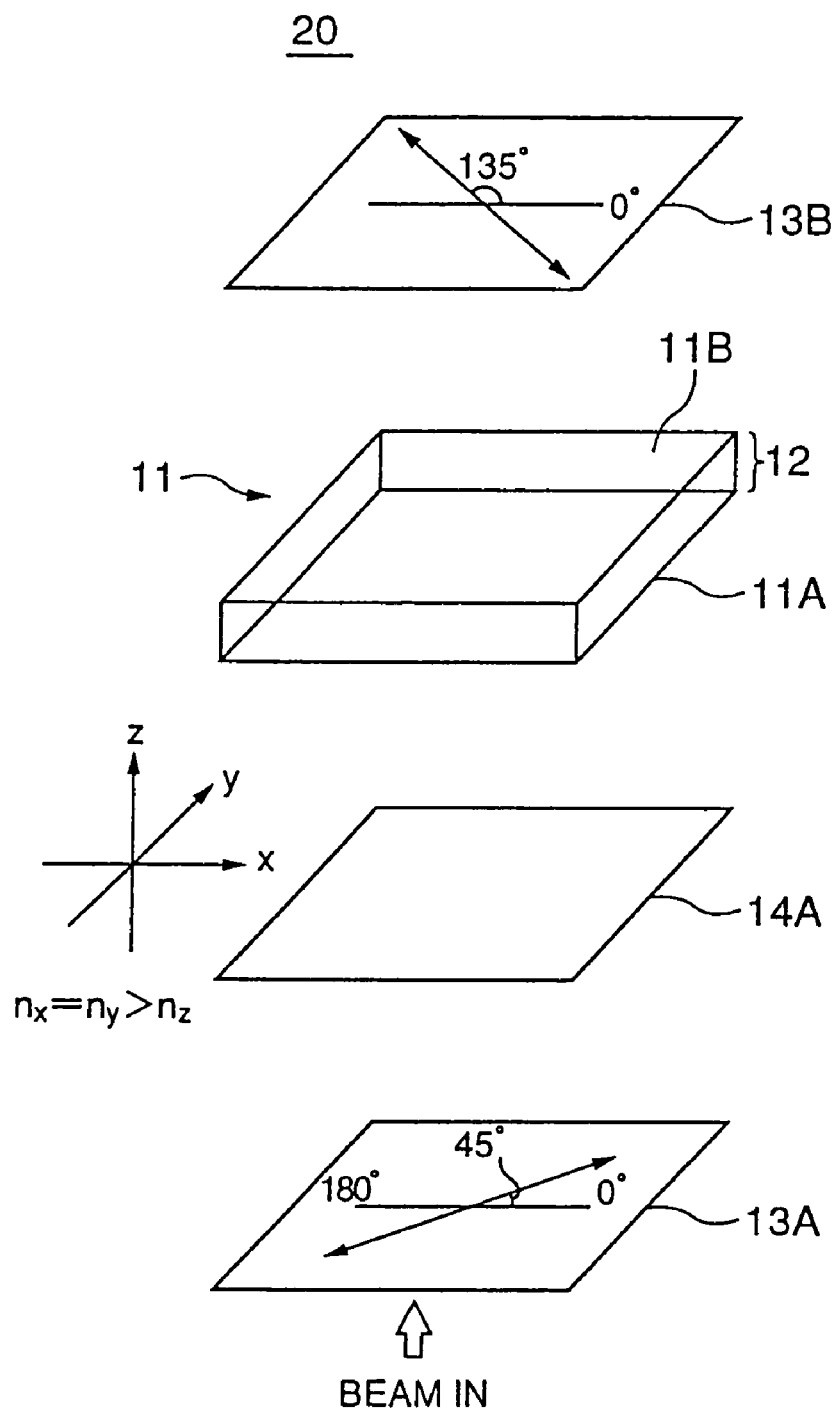
FIG. 6A is a diagram showing a modification of the liquid crystal display device of FIG. 1 in which a retardation film is added adjacent to a liquid crystal panel in the construction of FIG. 1.
Figure 6B:
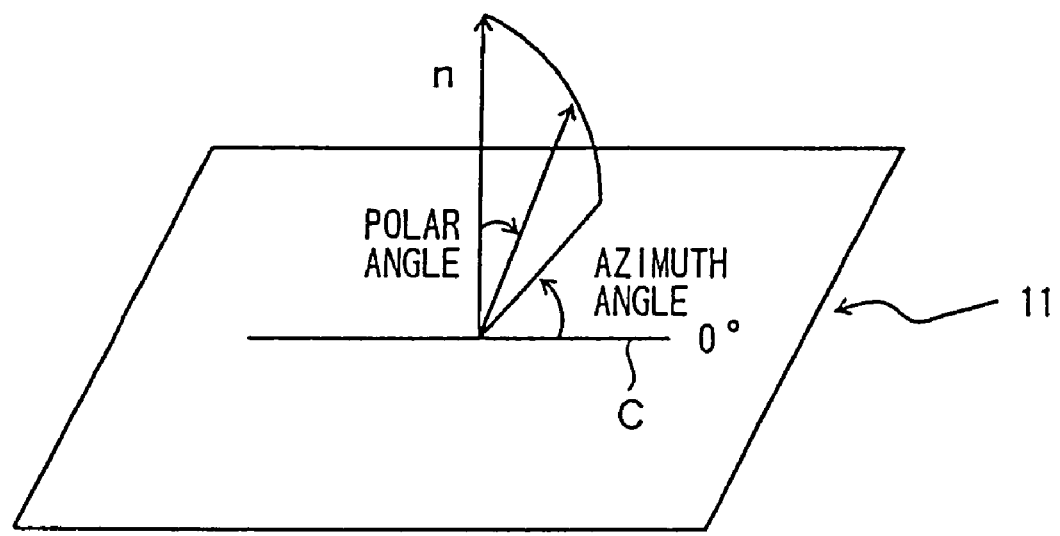
FIG. 6B is a diagram showing a definition of azimuth angle and polar angle.

FIG. 6A shows the construction of a liquid crystal display device 20 in which a retardation film 14A is added to the structure of FIG. 1 below the liquid crystal panel 11 for improving the viewing-angle characteristics of the liquid crystal display device further. It should be noted that the retardation film 14A compensates for a phase shift of the optical beam passing through or passed through the liquid crystal layer 12 in the liquid crystal panel 11.

In the construction of FIG. 6A, it should be noted that the retardation film 14A provides a negative retardation $\Delta n \cdot d_1$ in the z-direction ($\Delta n = n_y - n_z = n_x - n_z$; where $n_x$, $n_y$ and $n_z$ represent refractive indices specified by a refractive index ellipsoid respectively on the principal axes x, y and z; $d_1$ represents the thickness of the retardation film), wherein the retardation film 14A is disposed between the polarizer 13A and the liquid crystal panel 11. Thereby, the retardation film 14A compensates for the birefringence occurring in the optical beam passing through the liquid crystal panel 11.

FIGS. 7–16 represent the viewing-angle characteristics of the liquid crystal display device 20 including the retardation film 14A, for various values of the retardation R' produced by the retardation film 14A, wherein each of FIGS. 5–14 shows a contrast ratio CR achieved by the liquid crystal display device 20 in the form of contour lines. In the illustrated examples, the contrast ratio CR is represented for the values of 500.0, 200.0, 100.0, 50.0 and 10.0, wherein the contour lines are represented in a coordinate system shown in FIG. 4B specified by an azimuth angle and a polar angle. As indicated in FIG. 6B, the azimuth angle is measured in the plane parallel to the liquid crystal panel from the center line C of the twist, while the polar angle is measured from a normal to the liquid crystal panel. The polar angle becomes zero in the direction perpendicular to the liquid crystal panel 11.

Each of FIGS. 7–16 includes the azimuth angles of 0.0°, 90.0°, 180.0° and 270.0° as represented along the circumference and a polar angle of 0.0° to 80.0° in the form of concentric circles. In each of FIGS. 7–16, the center of the circle indicates the front direction of the liquid crystal display device 20 where the polar angle is 0.0°. Further, the outermost circle represents the polar angle of 80.0°. In the experiments of FIGS. 7–16, the birefringence $\Delta n$ of the liquid crystal panel is set to 0.0804, the thickness d to 3 µm, the twist angle of the liquid crystal molecules to 45°, and the pretilt angle to 89°. Thus, the liquid crystal panel 11 provides a retardation $\Delta n \cdot d$ of 241 nm.

Figure 7:
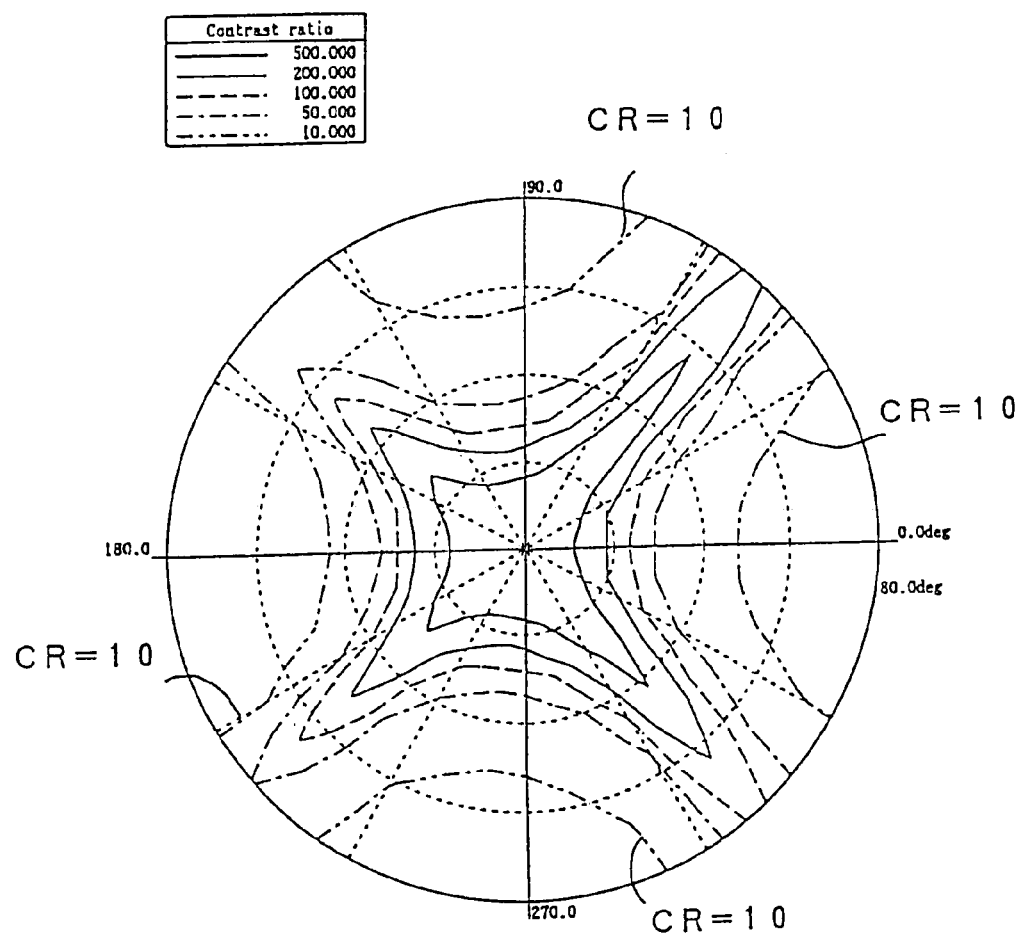
FIGS. 7–16 are diagrams showing the viewing-angle characteristics of the liquid crystal display device of FIG. 6A for various settings of retardation of the retardation film.
Figure 8:
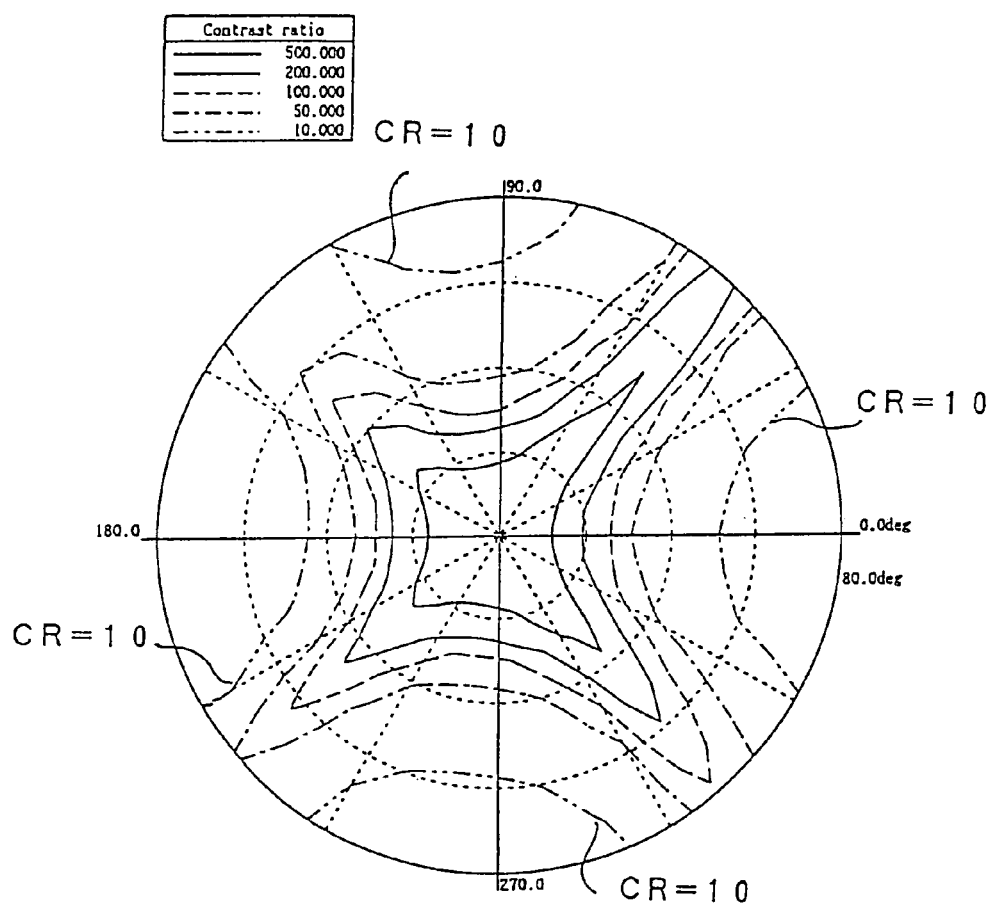
Figure 9:
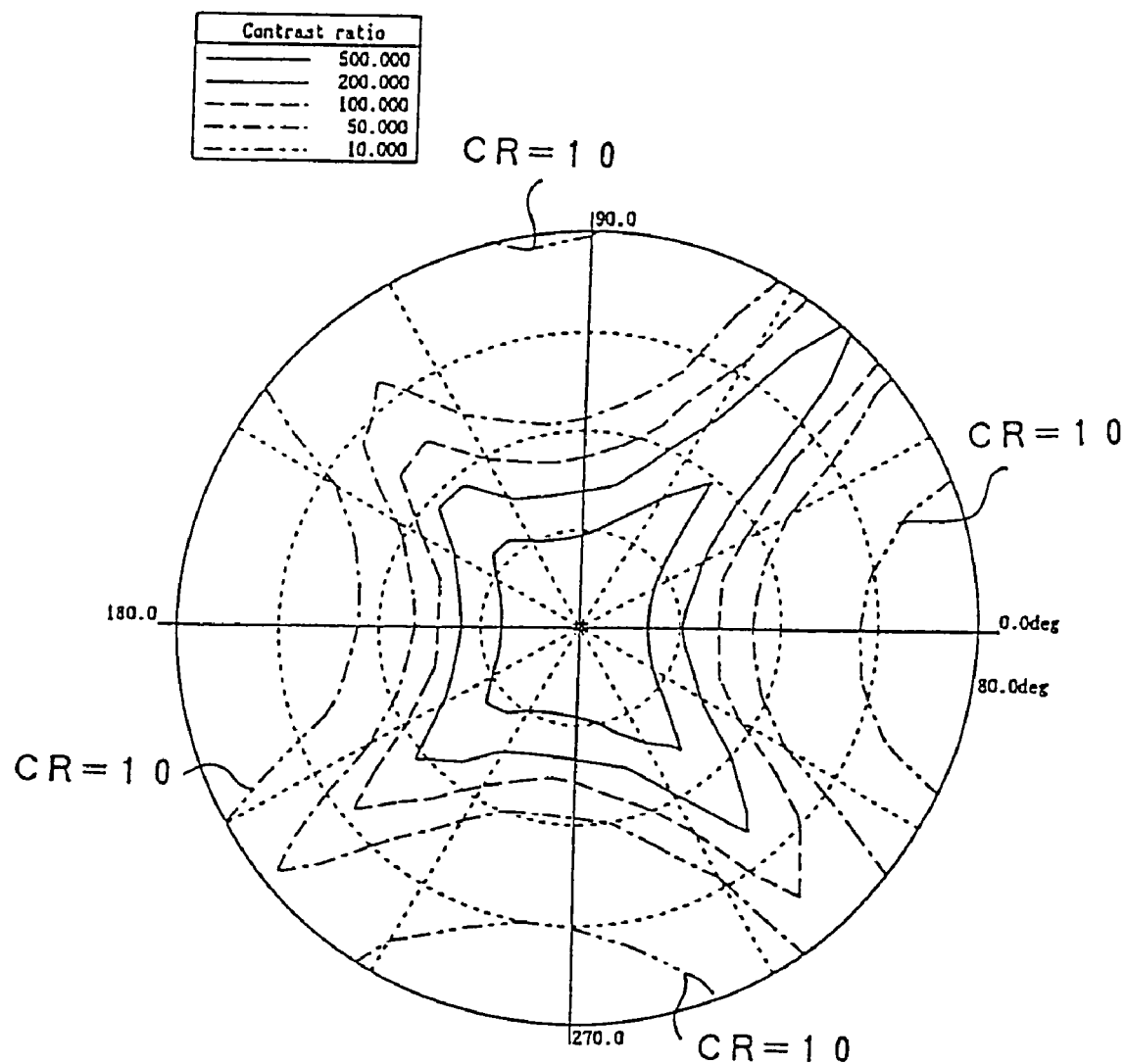
Figure 10:
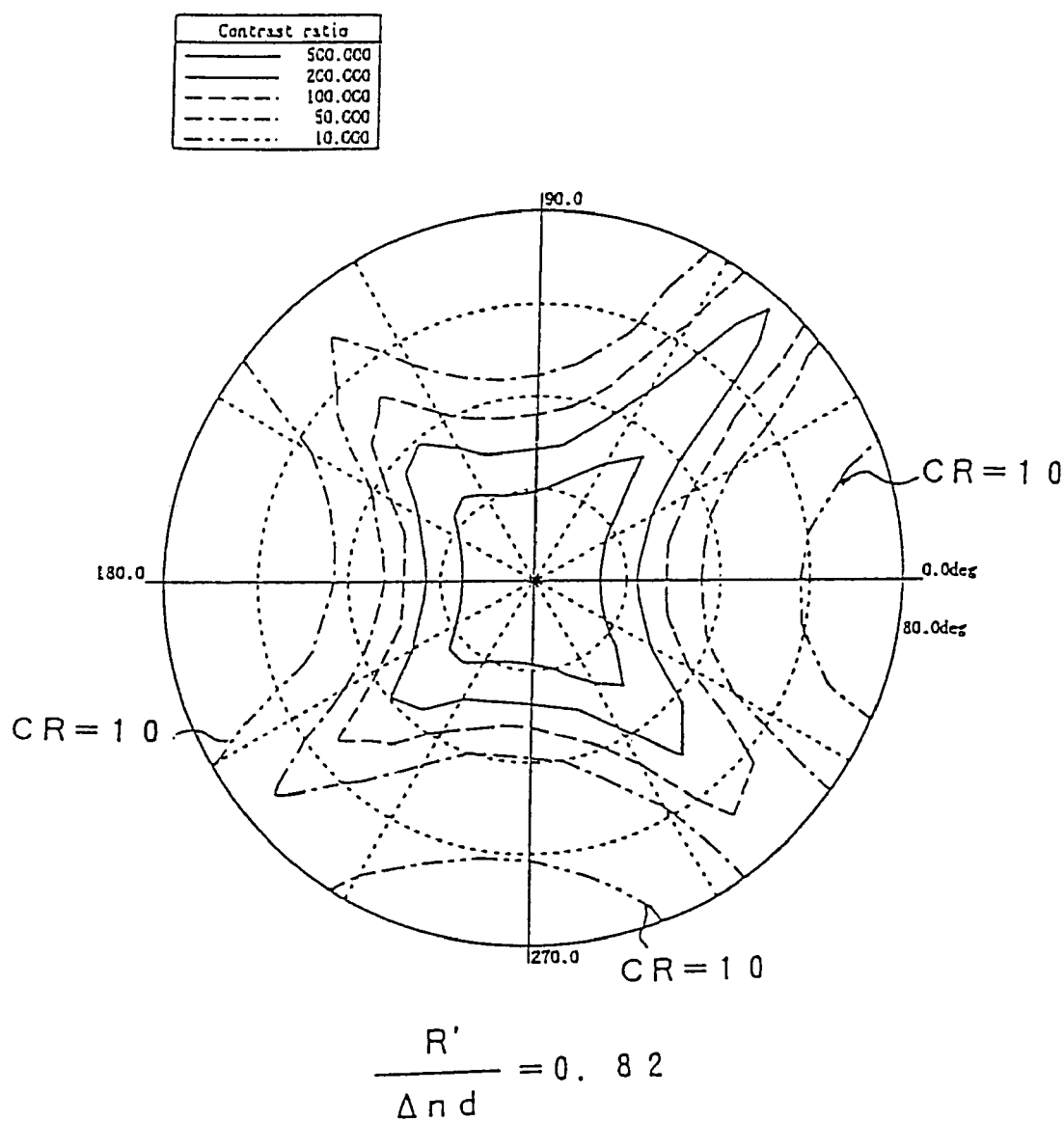
Figure 11:
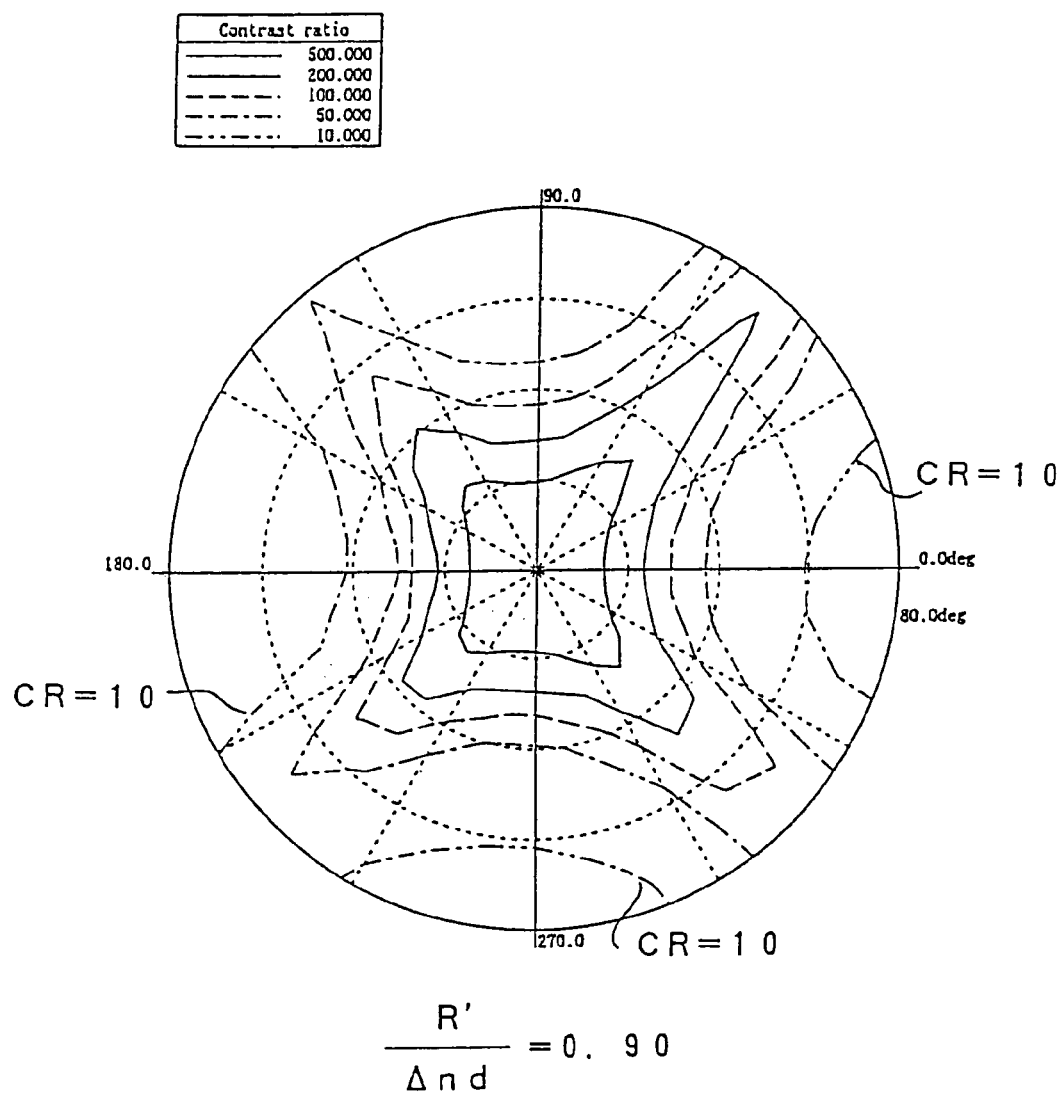
Figure 12:
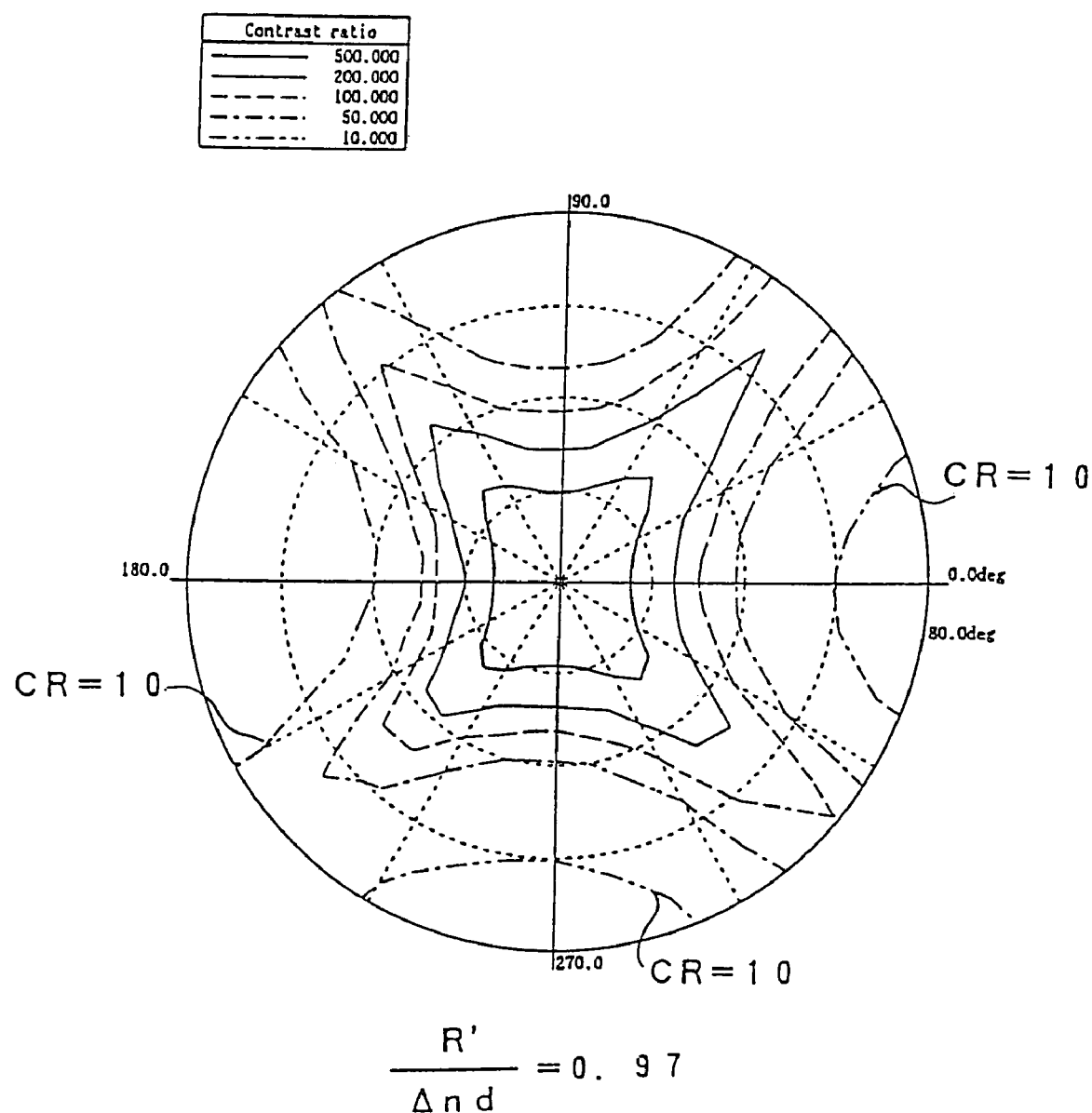
Figure 13:
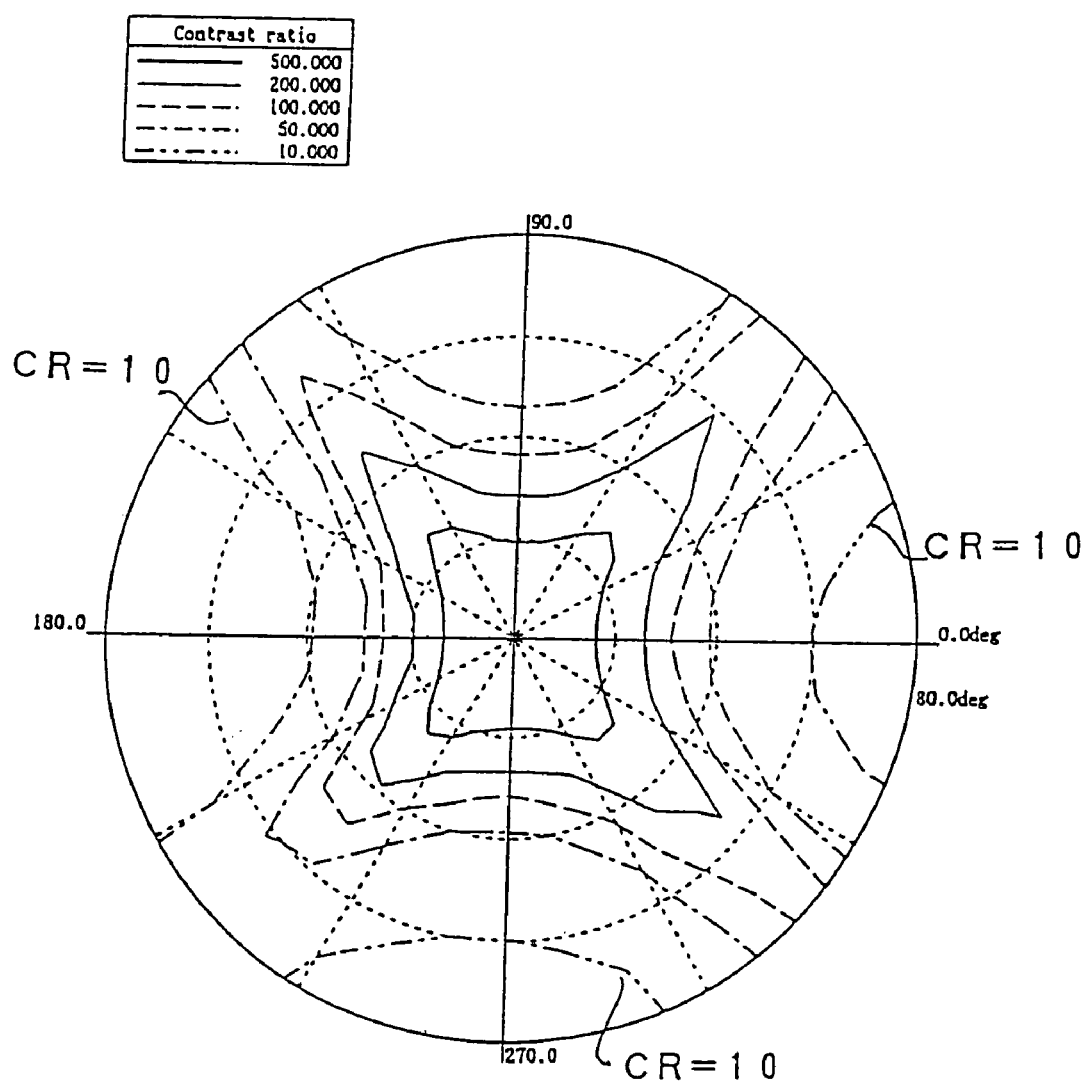
Figure 14:
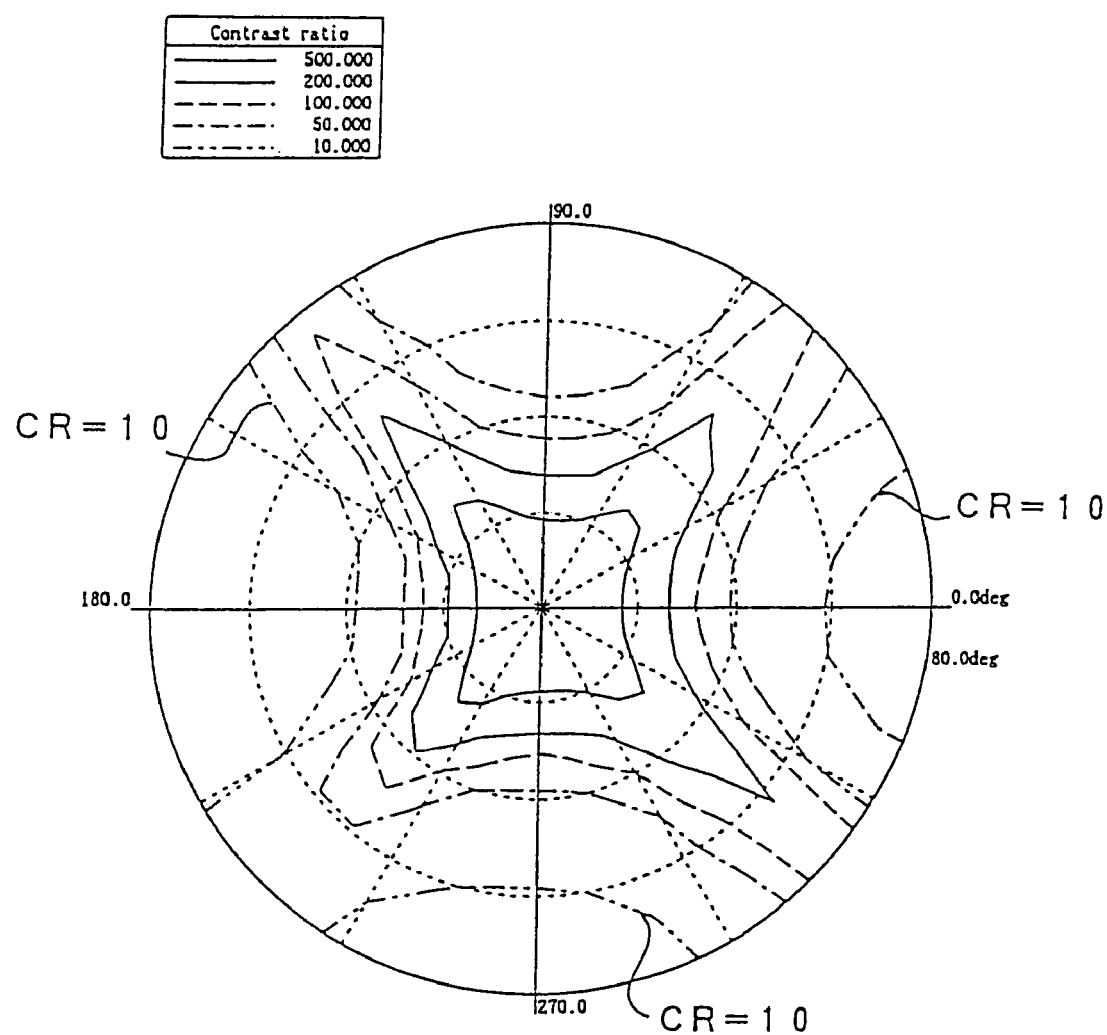
Figure 15:
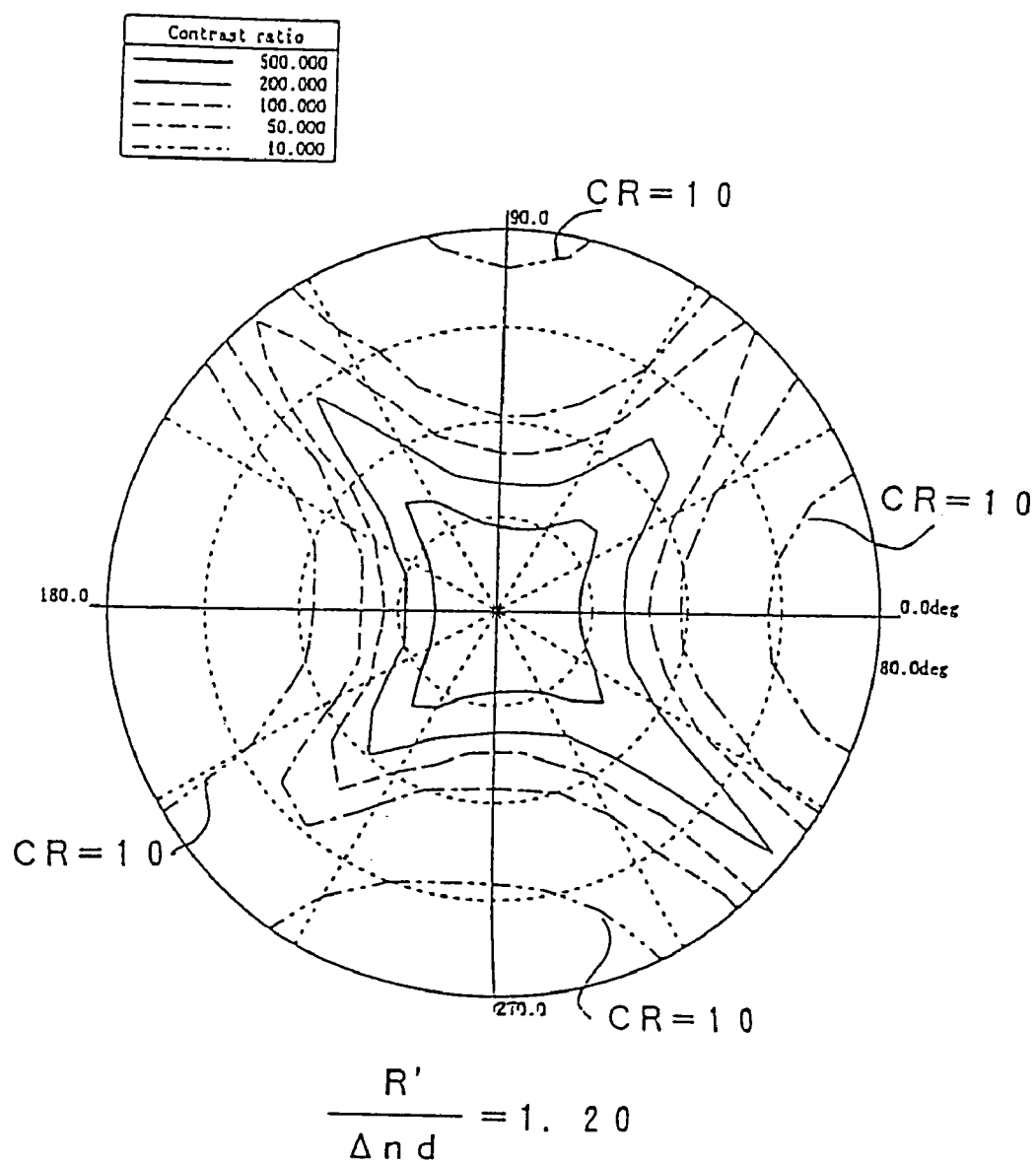
Figure 16:
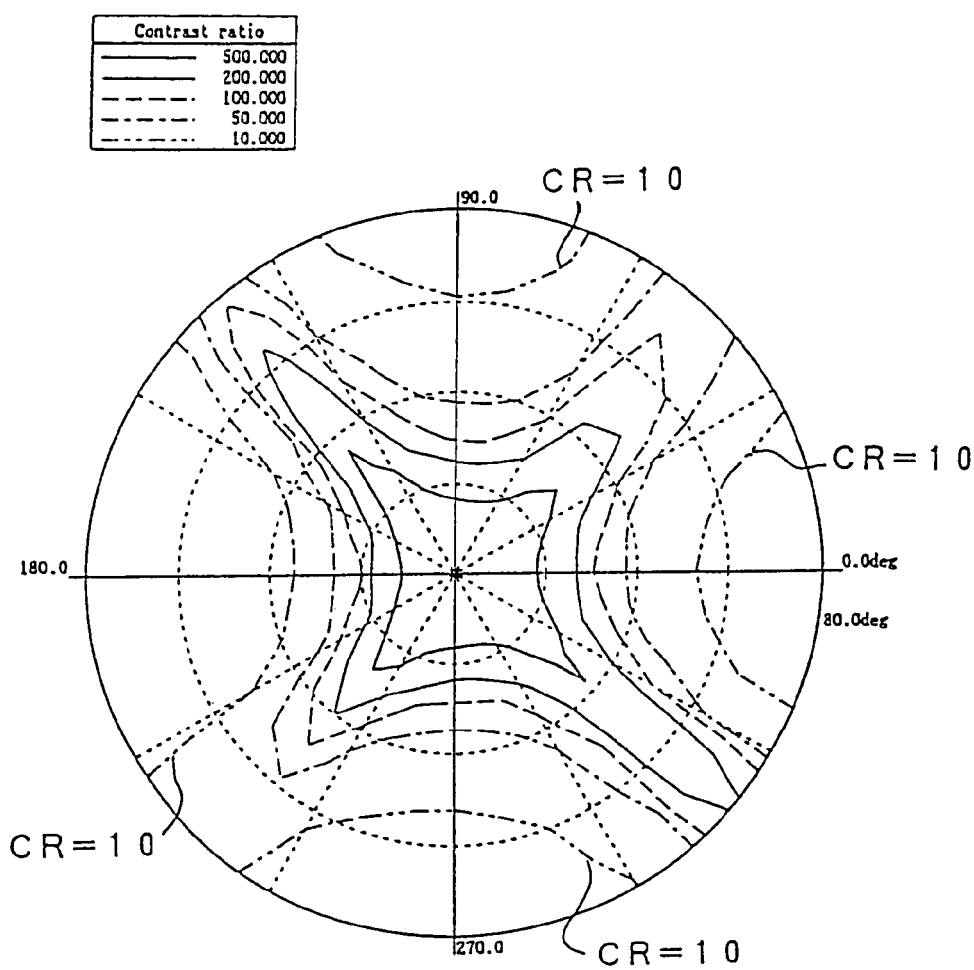
Figure 17:
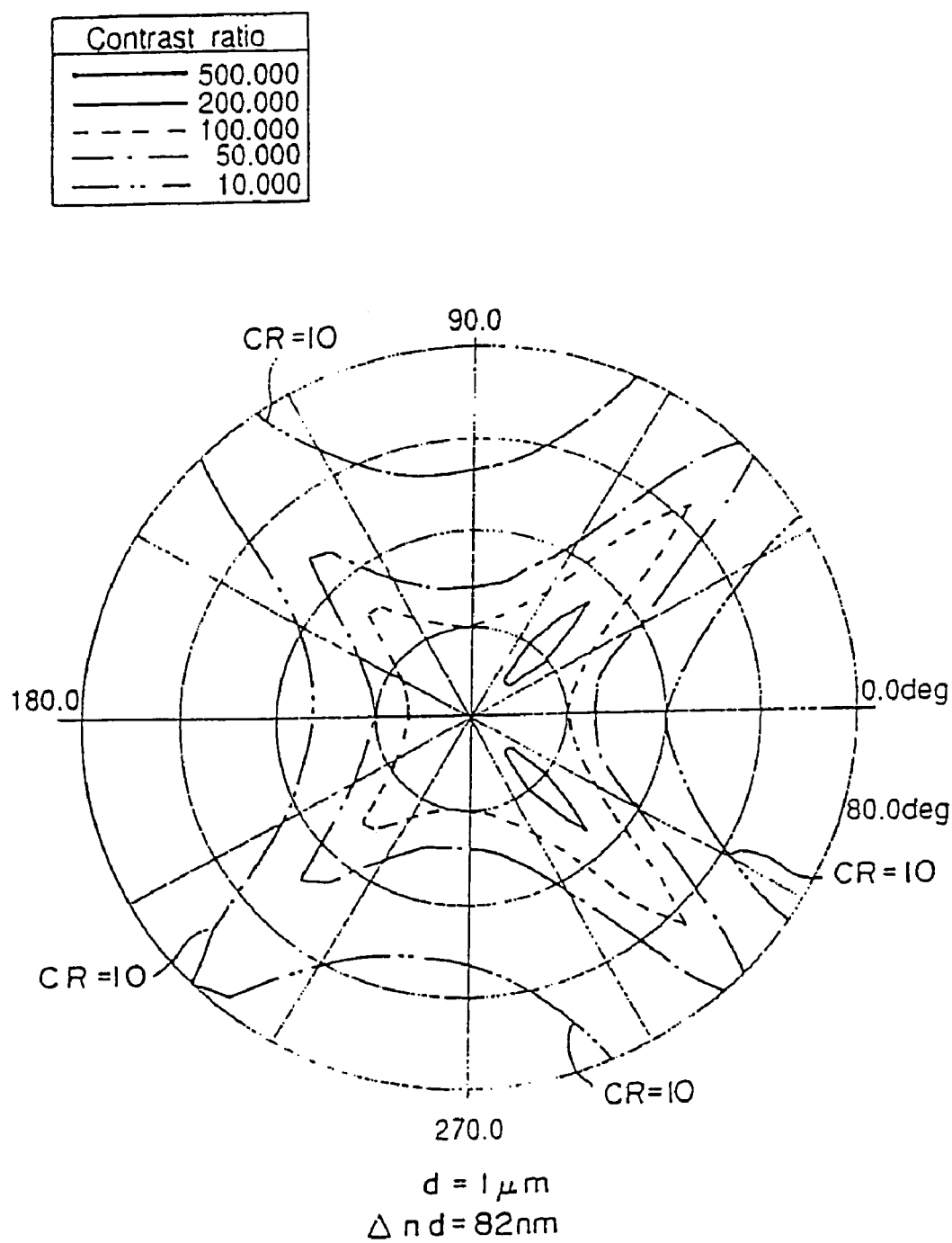
FIGS. 17–22 are diagrams showing the viewing-angle characteristics of the liquid crystal display device of FIG. 6A for various thicknesses d of the liquid crystal layer in the liquid crystal panel.
Figure 18:
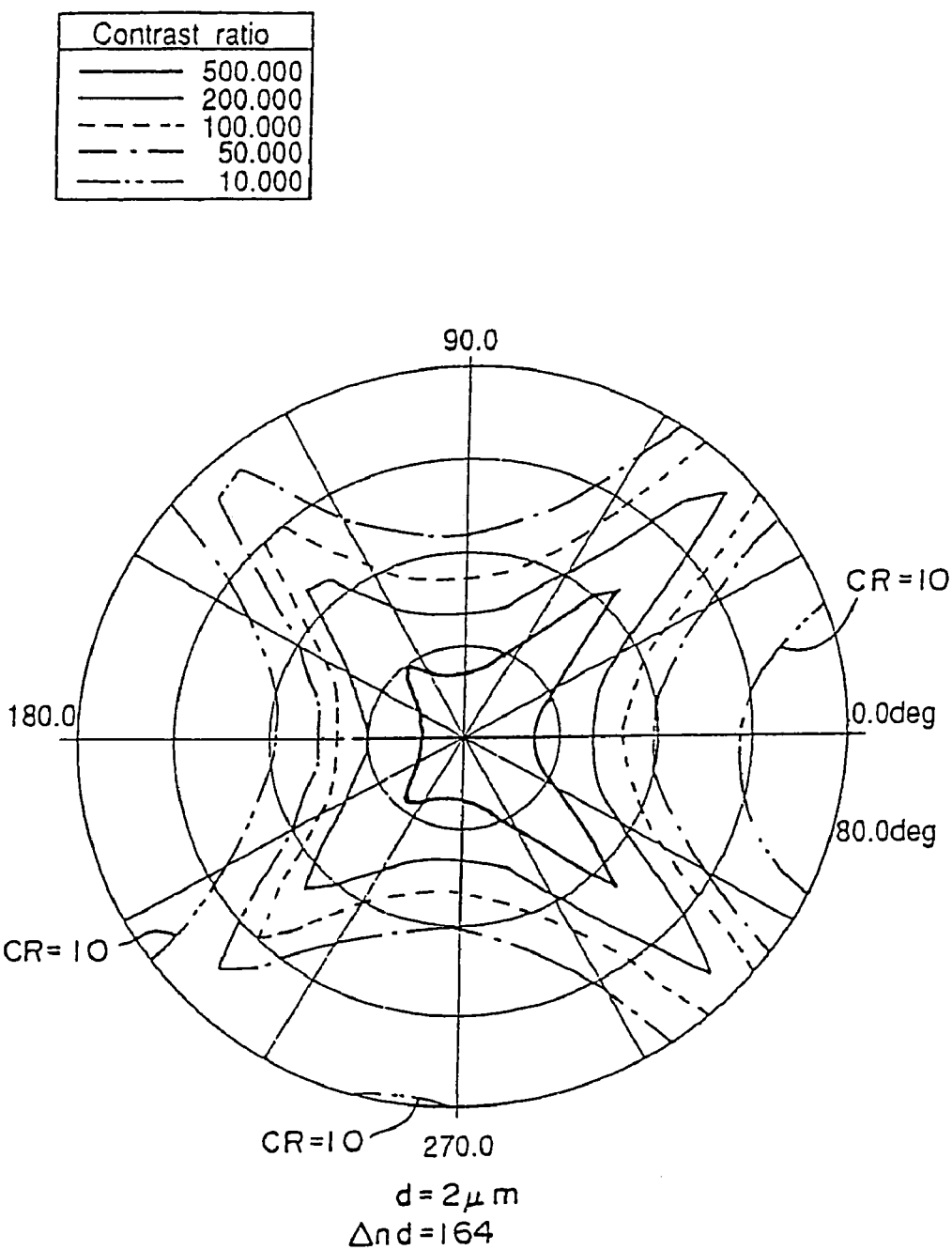

In the example of FIG. 7, the retardation R' is set to 108 nm. Thus, a ratio R'/$\Delta n \cdot d$ indicating the ratio of the retardation R' to the retardation of the liquid crystal panel 11 takes a value of 0.45. In the example of FIG. 8, on the other hand, the retardation R' is 144 nm and the ratio R'/$\Delta n \cdot d$ takes a value of 0.6. Further, in the example of FIG. 9, the retardation R' is 180 nm and the ratio R'/$\Delta n \cdot d$ takes a value of 0.75. In the example of FIG. 10, the retardation R' is 198 nm and the ratio R'/$\Delta n \cdot d$ takes a value of 0.82. In the example of FIG. 11, the retardation R' is 216 nm and the ratio R'/$\Delta n \cdot d$ takes a value of 0.90. In the example of FIG. 12, the retardation R' is 234 nm and the ratio R'/$\Delta n \cdot d$ takes a value of 0.97. In the example of FIG. 13, the retardation R' is 252 nm and the ratio R'/$\Delta n \cdot d$ takes a value of 1.05. In the example of FIG. 14, the retardation R' is 270 nm and the ratio R'/$\Delta n \cdot d$ takes a value of 1.12. In the example of FIG. 15, the retardation R' is 288 nm and the ratio R'/$\Delta n \cdot d$ takes a value of 1.20. Further, in the example of FIG. 16, the retardation R' is 324 nm and the ratio R'/$\Delta n \cdot d$ takes a value of 1.34.

Referring to FIGS. 7–16, it should be noted that the liquid crystal display device 20 provides particularly excellent viewing-angle characteristics in the condition of FIG. 11 or FIG. 12 in which the foregoing ratio R'/$\Delta n \cdot d$ is set near 1 (0.97 to 1.05). In other words, the result of FIGS. 7–16 clearly indicates that the viewing-angle characteristics of the liquid crystal display device 20 are improved substantially by disposing the retardation film 14A adjacent to the liquid crystal panel 11 such that the total retardation of the retardation film(s) is generally equal to the retardation of the liquid crystal panel.

It should be noted that the foregoing relationship holds also when another retardation film 14B is disposed above the liquid crystal panel 11. In this case, the foregoing value R' of the retardation is given as a sum of the retardation film 14A and the retardation film 14B.

FIGS. 17–22 show the viewing-angle characteristics of the liquid crystal display device 20 of FIG. 6A for the case in which the thickness d of the liquid crystal layer 12 forming the liquid crystal panel 11 is changed variously, while maintaining the total retardation R' of the retardation films 14A and 14B to be generally equal to the retardation Δn·d of the liquid crystal panel 11. In FIGS. 17–22, it should be noted that the contour designated by "CR=10" indicates the viewing-angle characteristics in which a contrast ratio of 10 are achieved. The same applies also to FIGS. 7–16 described previously.

Referring to FIGS. 17–22, it should be noted that the viewing-angle characteristics of the liquid crystal display device 20 are obviously deteriorated when the thickness d is reduced below 1 μm and hence the retardation Δn·d of the liquid crystal panel 11 is reduced below 82 nm. Further, when the thickness d exceeds 5 μm and the retardation Δn·d exceeds 410 nm, the viewing-angle characteristics of the liquid crystal display device 20 deteriorate again. Thus, it is preferable to set the retardation of the liquid crystal panel 11 to be larger than about 80 nm, more preferably equal to or larger than 82 nm and smaller than about 410 nm, more preferably smaller than about 400 nm. It should be noted that a similar conclusion is obtained also in the case of the liquid crystal display device of FIGS. 5A and 5B that uses a liquid crystal having a positive dielectric anisotropy.

FIGS. 23–28 show the transmittance of the liquid crystal display device 20 of FIG. 6A for the front direction while changing the thicknesses d of the liquid crystal layer 12 variously, wherein each of FIGS. 23–28 shows the change of the transmittance for each of the three primary colors, blue (B), green (G) and red (R). In FIGS. 23–28, the change of the transmittance is caused by changing the drive voltage from 0 V to 6V.

As will be seen clearly from FIGS. 23–26, the transmittance is very small for any of the three primary colors even when a drive voltage of 6 V is applied, as long as the thickness d of the liquid crystal layer is smaller than about 1 μm (Δn·d=82 nm). See FIG. 23.

When the thickness d of the liquid crystal layer is increased above 1 μm, the transmittance increases steeply for all of the three primary colors. Further, as can be seen clearly in FIGS. 26 and 27, it is possible to set the transmittance to be generally equal for all of the R, G and B by setting the magnitude of the drive voltage pulse to about 4 V.

Figure 28:
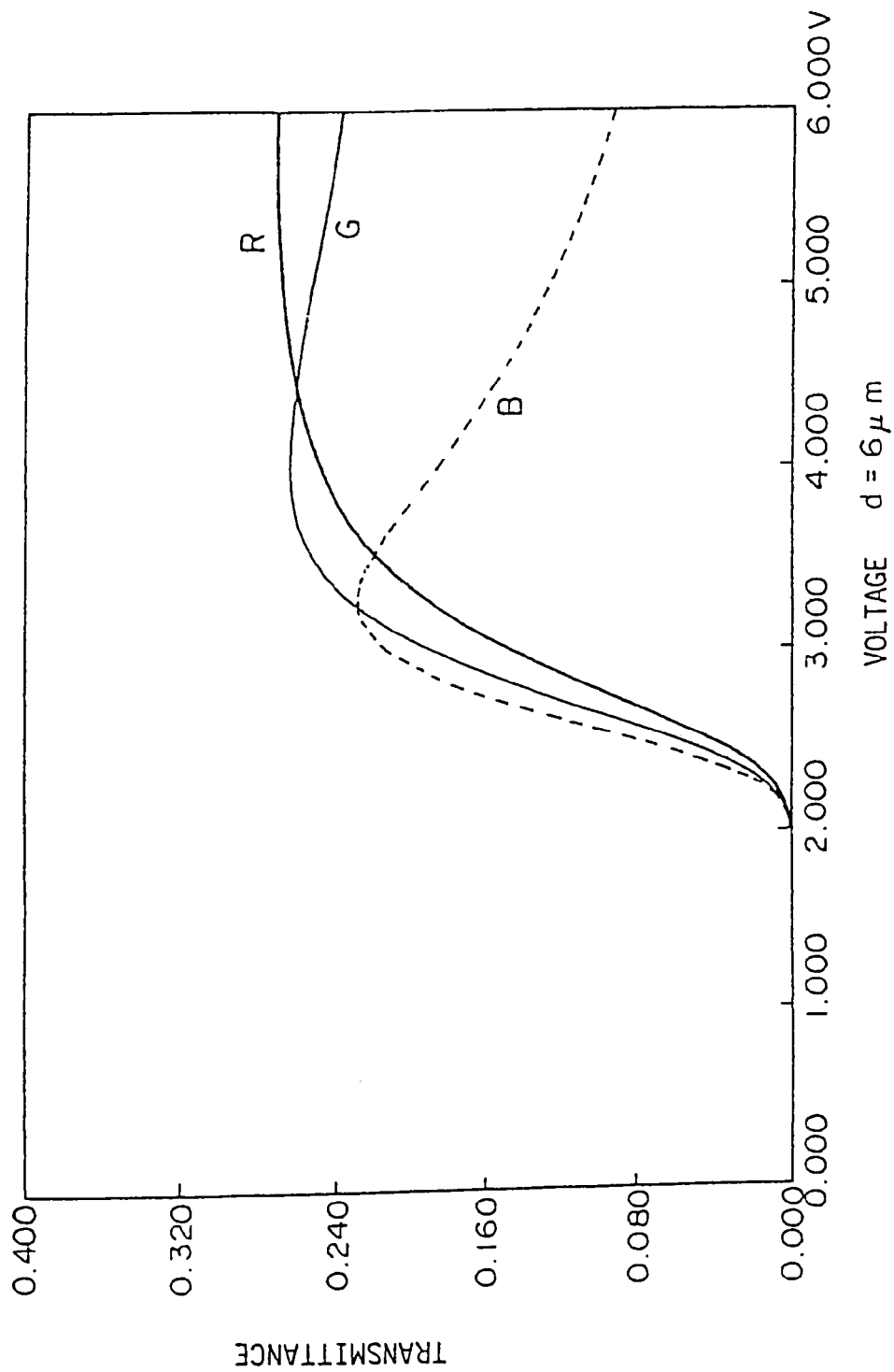

When the thickness d is increased further as in the case of FIG. 28, in which the thickness d is set to 6 μm, the drive voltage that provides a generally common transmittance for all of the three primary colors is reduced to about 3 V. In this case, however, the range or band of the drive voltage in which the foregoing common transmittance is obtained is substantially narrowed as compared with the case of FIG. 26 or 27 in which the thickness d is set not to exceed 6 μm. In other words, the result of FIG. 28 indicates that a small variation of the drive voltage may cause a coloring of the represented image. In order to avoid such a problem of unwanted coloring, it is necessary to control the drive voltage exactly. However, such an exact control of the drive voltage in a mass-produced liquid crystal display device is difficult.

The foregoing analysis indicates that it is preferable to set the thickness d of the liquid crystal layer 12 of FIG. 6A to be larger than about 1 μm but not exceeding about 6 μm. Associated with this, it is preferable to set the retardation of the liquid crystal layer 12 to be larger than about 80 nm but not exceeding about 400 nm. It should be noted that the foregoing conclusion is applicable not only to the liquid crystal display device of FIGS. 4A and 4B that uses a liquid crystal having a negative dielectric anisotropy but also to the liquid crystal display device of FIGS. 5A and 5B that uses a liquid crystal having a positive dielectric anisotropy.

FIGS. 29–33 are CIE-plots (CIE-1931 standard chromaticity diagram) showing the change of the reproduced color observed in the liquid crystal display device of FIG. 6A for the case in which the polar angle is changed from +80° to −80°. In FIGS. 29–33, the thick continuous line shows the case in which the azimuth angle is set to 0°, the thin continuous line shows the case in which the azimuth angle is set to 45°, and the broken line shows the case in which the azimuth angle is set to 90°.

Figure 29:
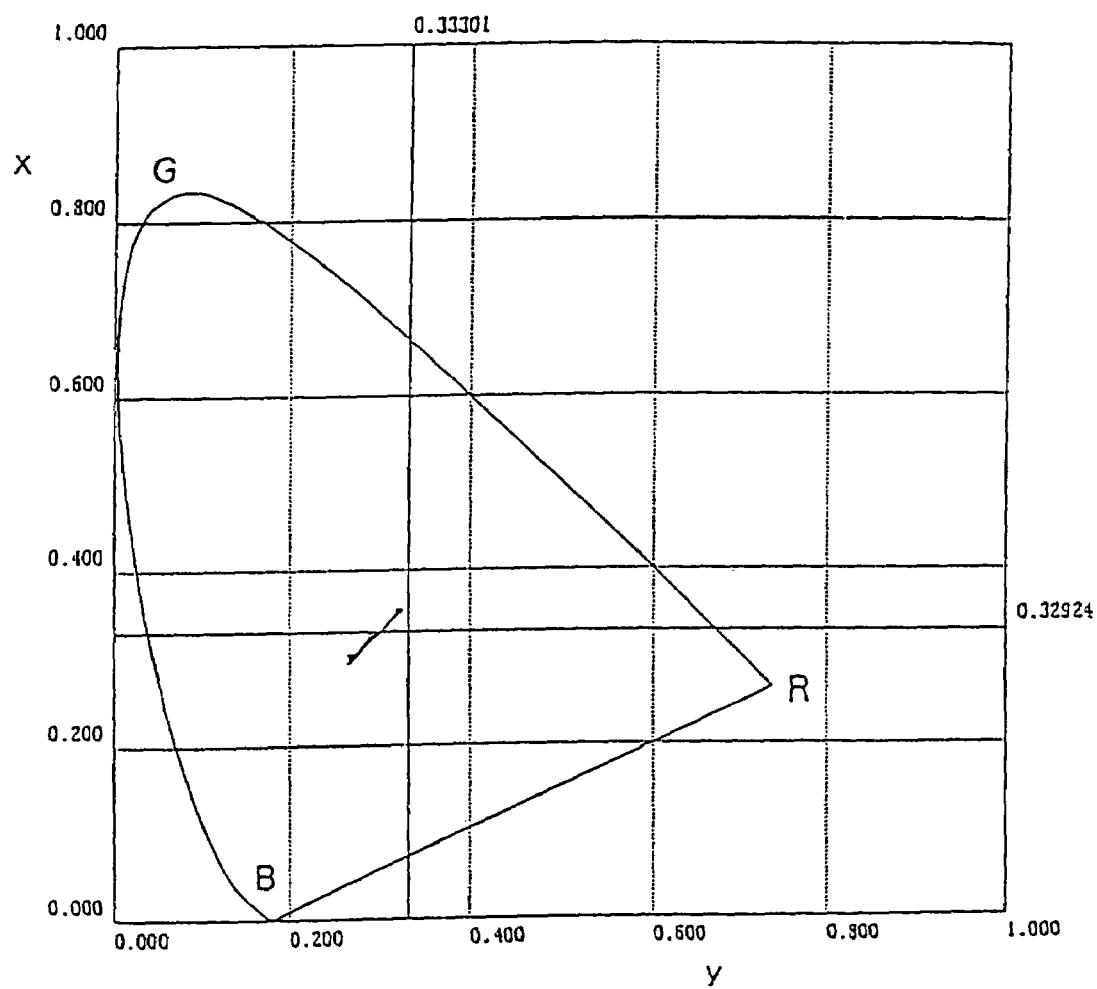
FIGS. 29–33 are diagrams showing a coloring of the liquid crystal display device of FIG. 6A for various thicknesses of the liquid crystal layer.

Referring to FIG. 29, it should be noted that the observed color change is minimum for any settings of the polar angle and the azimuth angle as long as the thickness d of the liquid crystal layer 12 is set to 1 μm and the retardation Δn·d of the liquid crystal panel 11 to 82 nm. When the thickness d of the liquid crystal layer 12 exceeded 3 μm (246 nm in terms of the retardation Δn·d of the liquid crystal panel 11) as in the case of FIG. 30, the observed color change is slightly pronounced. However, azimuth-dependence of the color is still not observed in the case of FIG. 30.

Figure 31:
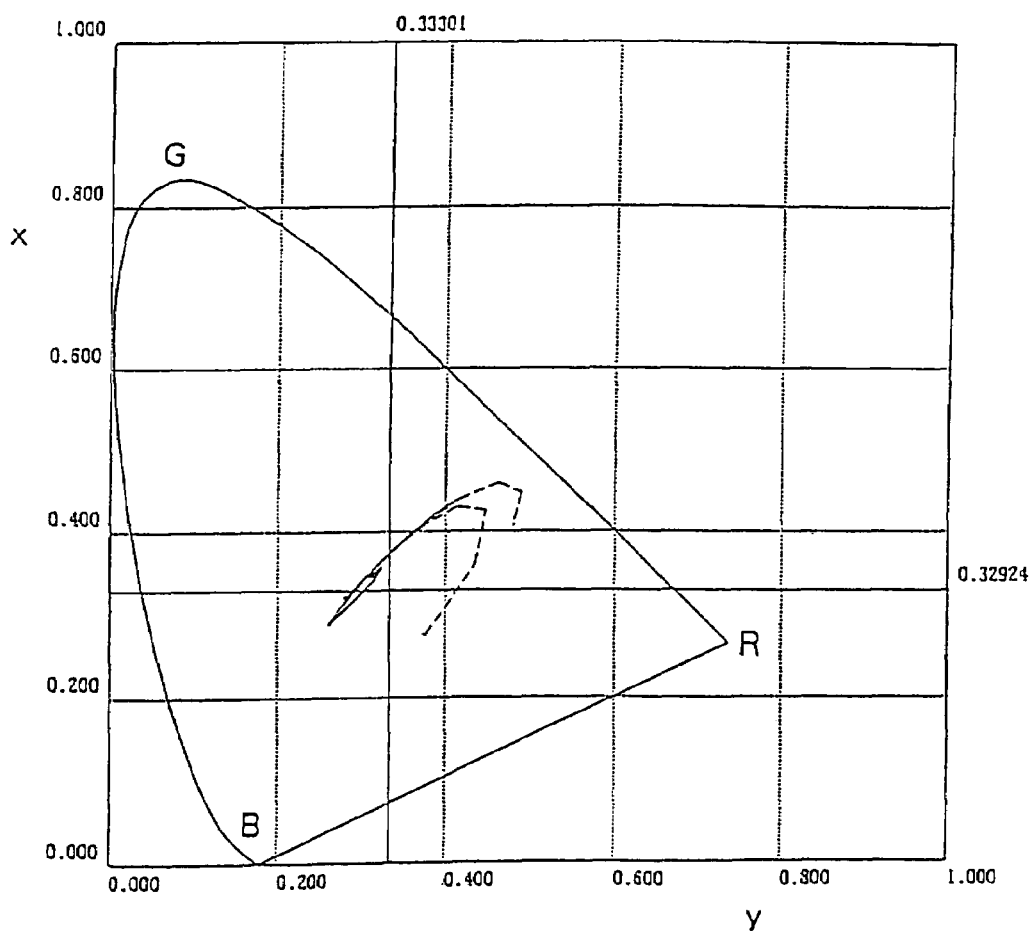

When the thickness d of the liquid crystal layer 12 has exceeded 4 μm (328 nm in terms of the retardation Δn·d of the liquid crystal panel 11) as in the case of FIG. 31, the observed color change becomes more prominent. Further, there appears a difference in the color change between the case in which the azimuth angle is set to 90° and the case in which the azimuth angle is set to 0° or 45°.

Figure 32:
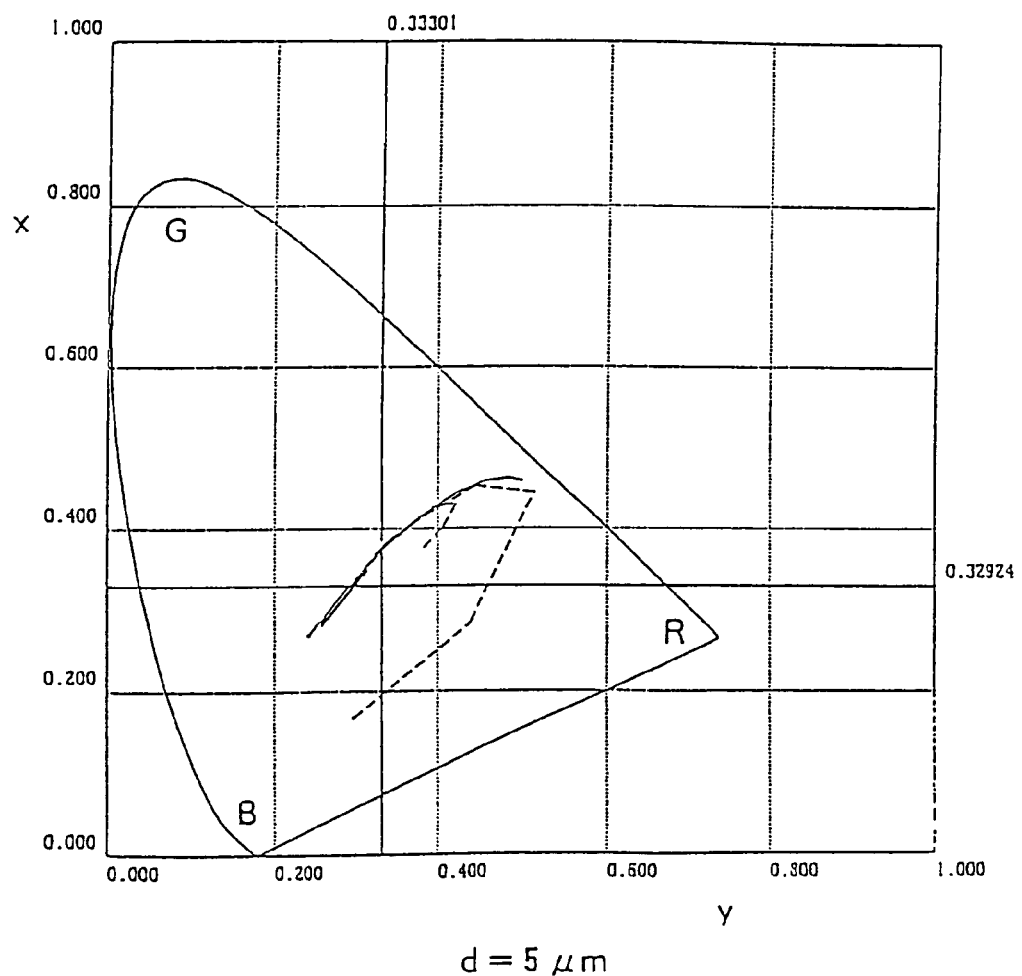
Figure 33:
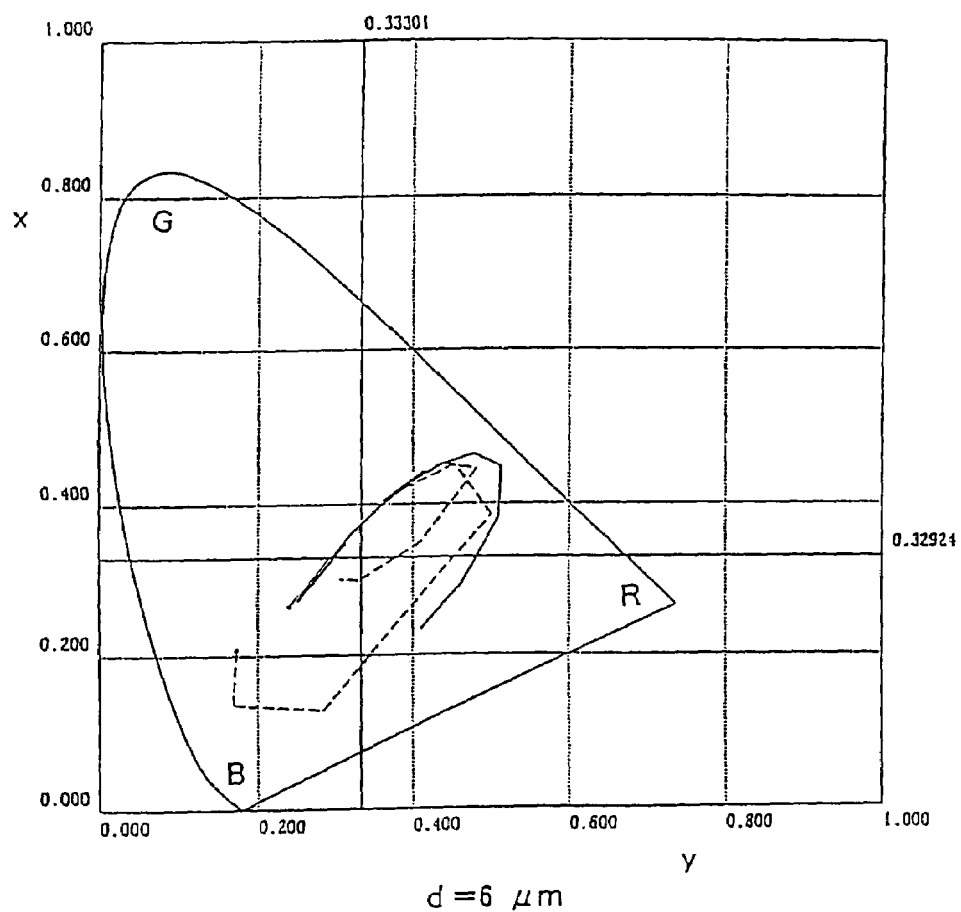

When the thickness d of the liquid crystal layer 12 is set to 5 μm (410 nm in terms of the retardation Δn·d of the liquid crystal panel 11) as in the case of FIG. 32, or when the thickness d is set to 6 μm (492 nm in terms of the retardation Δn·d) as in the case of FIG. 33, a very large color change is observed.

Figure 30:
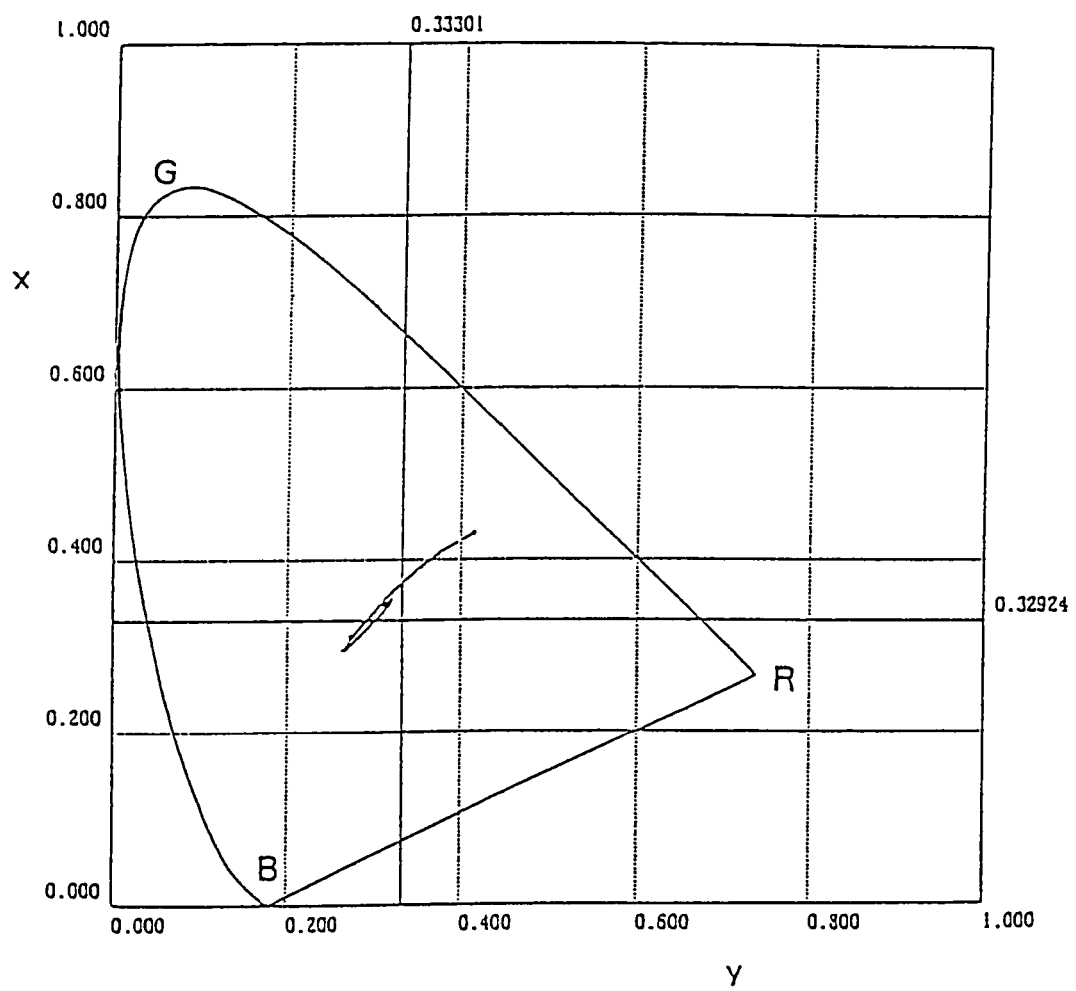

The result of FIGS. 29–33 indicates that it is preferable to set the retardation Δn·d of the liquid crystal layer 12 to be smaller than about 300 nm, preferably smaller than 280 nm, which is an intermediate value between the case of FIG. 30 and the case of FIG. 31, when the VA liquid crystal display device is to be used for a full-color display device of the direct-view type, which is required to have wide viewing-angle characteristics. It should be noted that the foregoing conclusion applies not only to the liquid crystal display device of FIGS. 4A and 4B that uses a liquid crystal of negative dielectric anisotropy but also to the liquid crystal display device of FIGS. 5A and 5B that uses a liquid crystal of positive dielectric anisotropy.

Further, the inventor of the present invention examined the effect of the twist angle of the liquid crystal molecules on the viewing-angle characteristics of the liquid crystal display device 20 of FIG. 6A. In the investigation, the thickness d of the liquid crystal layer 12 is set to 3 μm.

Figure 34:
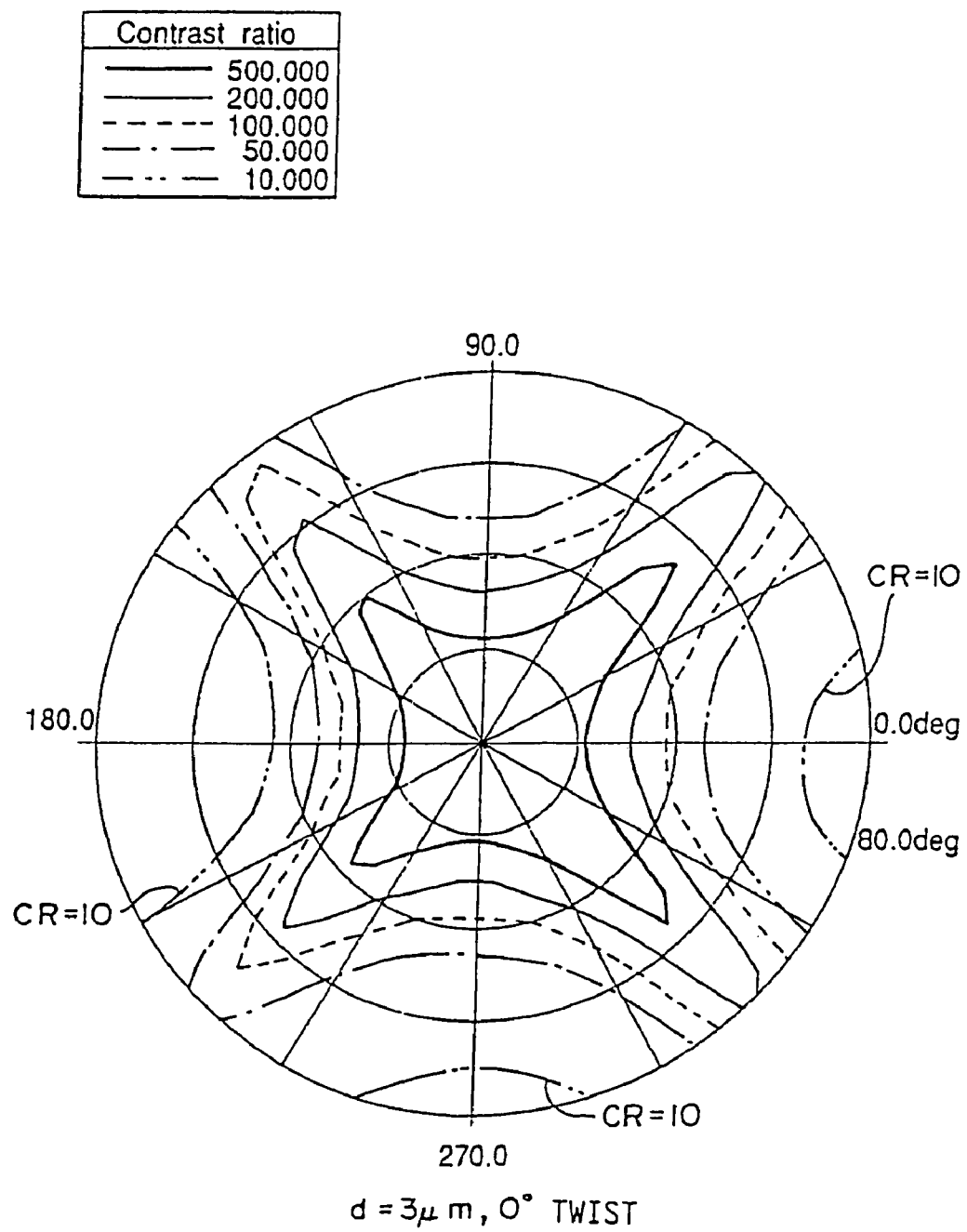
FIGS. 34–36 are diagrams showing the viewing-angle characteristics of the liquid crystal display device of FIG. 6A for various settings of the twist angle of the liquid crystal molecules forming the liquid crystal layer in the device of FIG. 6A.
Figure 35:
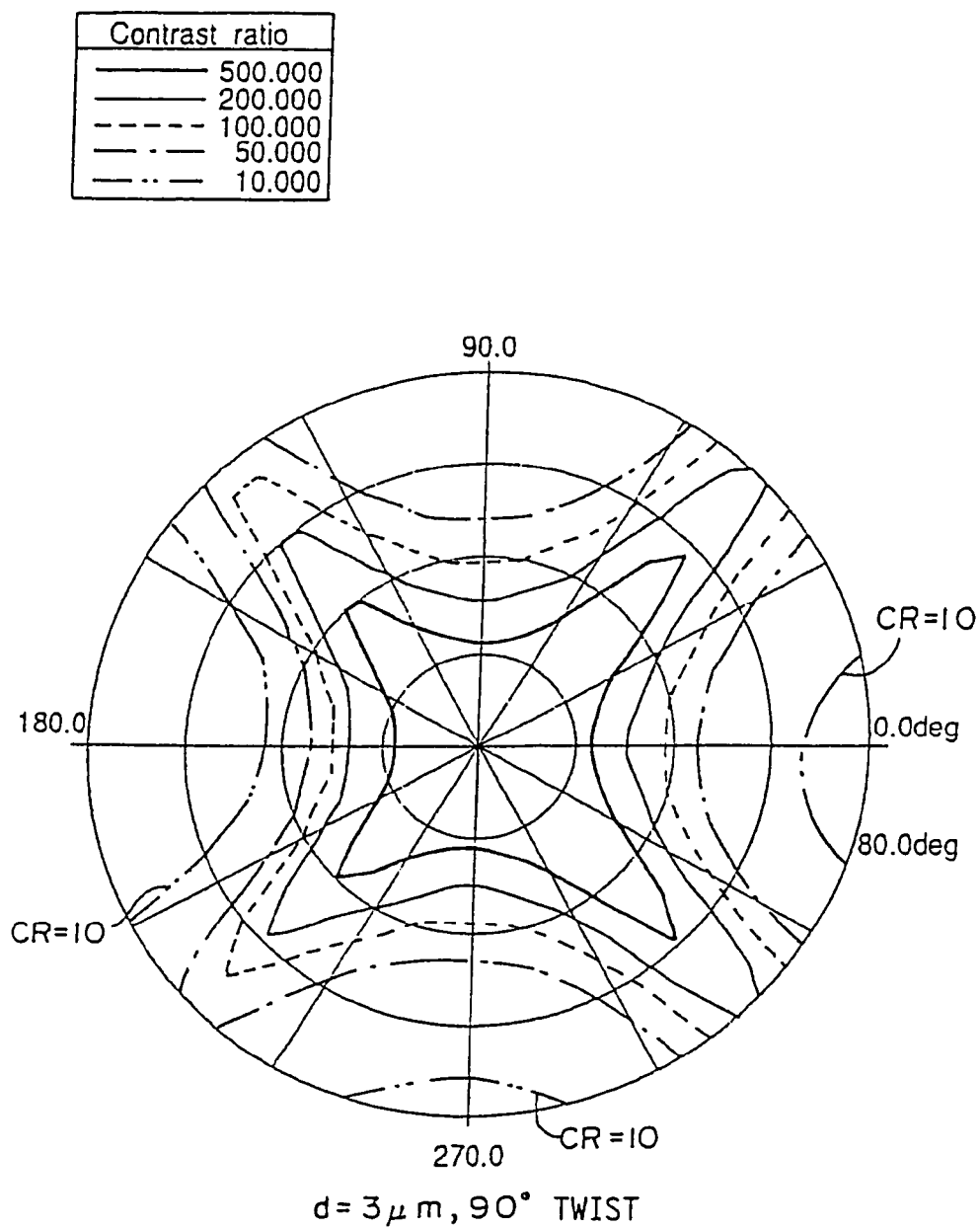
Figure 36:
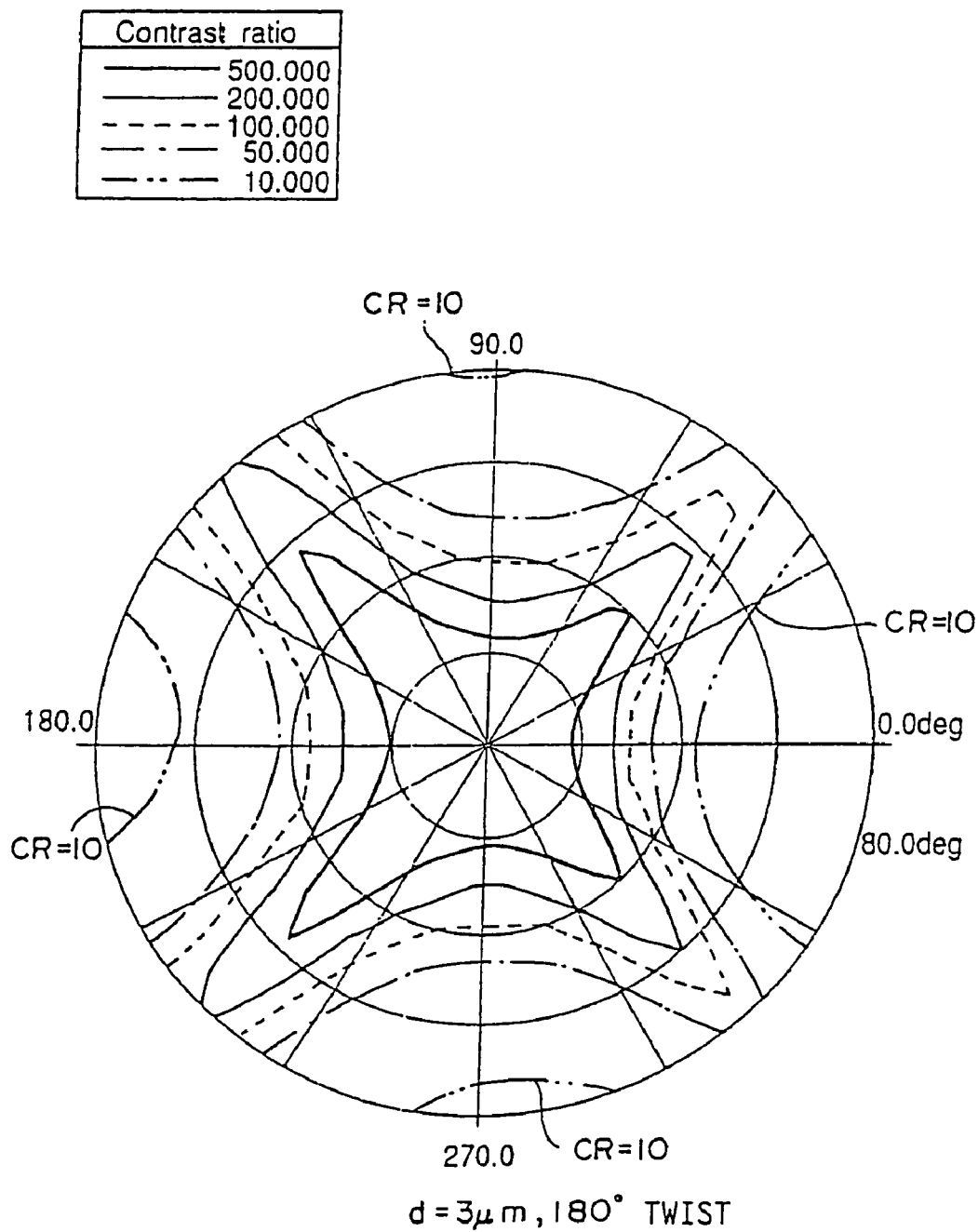

FIGS. 34–36 show the viewing-angle characteristics of the liquid crystal display device respectively for the case in which the twist angle is set to 0°, 90° and 180°. As will be seen from FIGS. 34–36, no substantial dependence of the viewing-angle characteristics on the twist angle is observed. It should be noted that the foregoing conclusion applies not only to the liquid crystal display device of FIG. 4A and 4B that uses a liquid crystal of negative dielectric anisotropy but also to the liquid crystal display device of FIGS. 5A and 5B that uses a liquid crystal of positive dielectric anisotropy.

In the experiments described heretofore about the liquid crystal display device 20 of FIG. 6A, it should be noted that no chiral substance is added to the liquid crystal layer 12, contrary to the practice used in ordinary TN-mode liquid crystal display devices.

Figure 37:
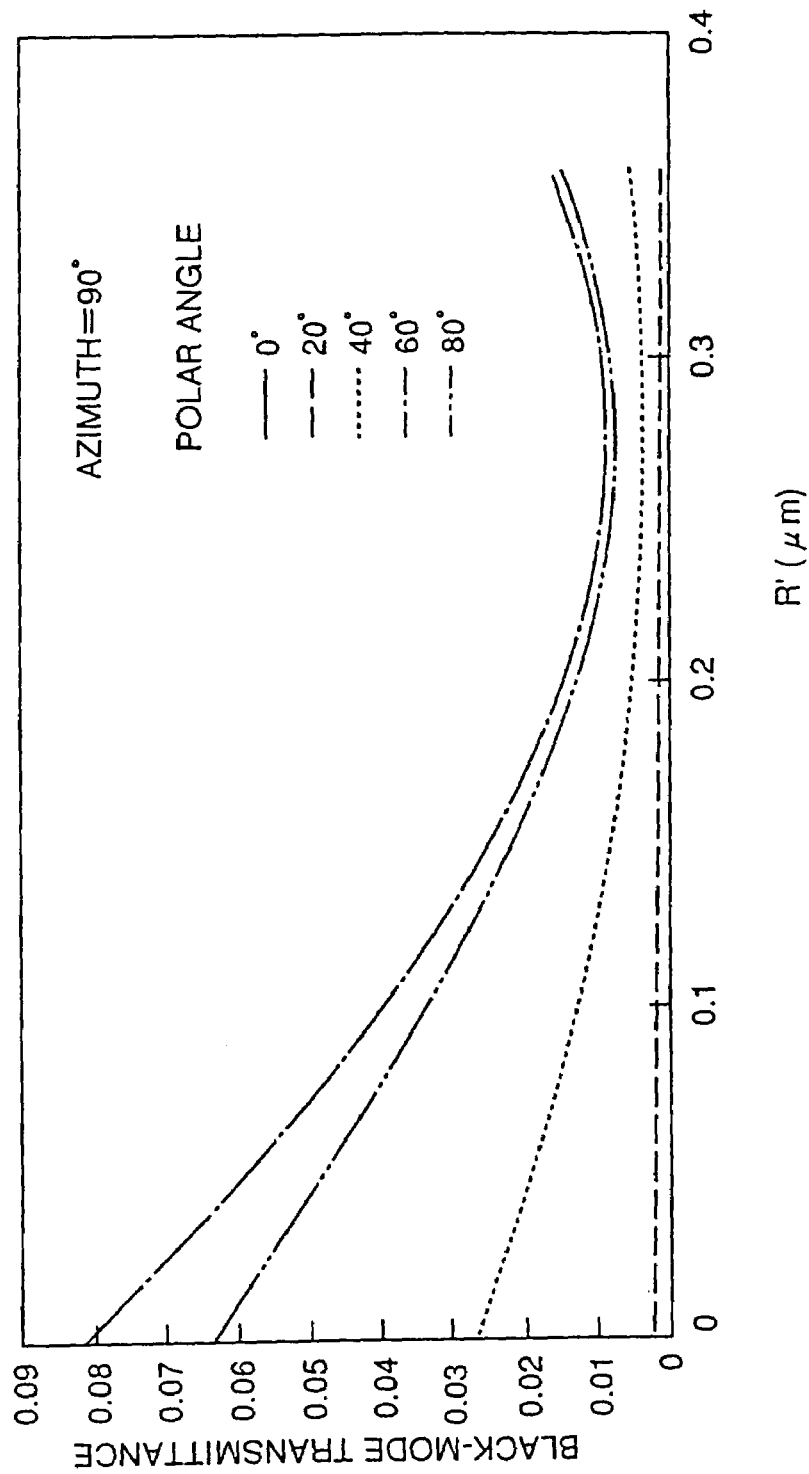
FIG. 37 is a diagram showing the black-mode transmittance of the liquid crystal display device of FIG. 6A.

FIG. 37 shows the black-mode transmittance of the liquid crystal display device of FIG. 6A for a case in which the polar angle is changed from 0° to 80° in the azimuth direction set to 90°. In the investigation of FIG. 37, a liquid crystal of MX941296 ($\Delta n=0.082$, $\Delta \epsilon=-4.6$, Merck Japan) is used for the liquid crystal layer 12 in combination with the polarizer of G1220DU (Nitto Denko). The thickness of the liquid crystal layer is set to 3.5 μm and hence the liquid crystal layer 12 has a retardation $\Delta n \cdot d$ of 287 nm.

As can be seen from FIG. 37, the black-mode transmittance, or the transmittance of the liquid crystal device in the black representation mode, is minimized by setting the retardation R' of the retardation film 14A in the vicinity of 287 nm. It should be noted that the foregoing conclusion applies not only to the liquid crystal display device of FIGS. 4A and 4B that uses a liquid crystal of negative dielectric anisotropy but also to the liquid crystal display device of FIGS. 5A and 5B that uses a liquid crystal of positive dielectric anisotropy.

Further, the inventor of the present invention has undertaken an investigation about the effect of the chiral substance on the viewing-angle characteristics of a VA-mode liquid crystal display device.

Figure 38B:
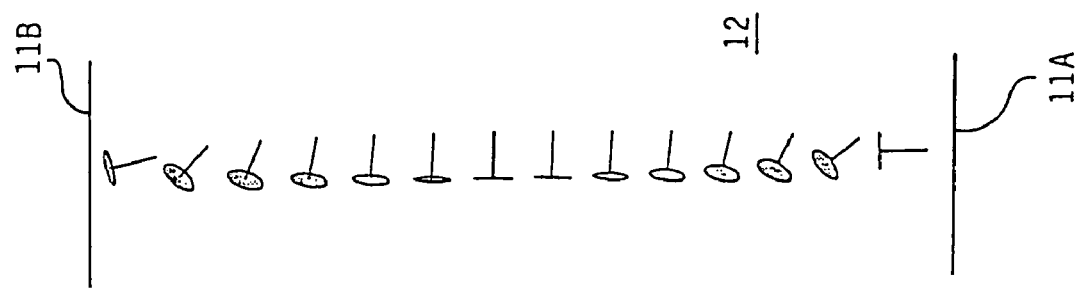
FIGS. 38A and 38B are diagrams showing the orientation of the liquid crystal molecules in the liquid crystal layer of the liquid crystal display device of FIG. 6A for the case in which a chiral substance is added to the liquid crystal layer.
Figure 38A:
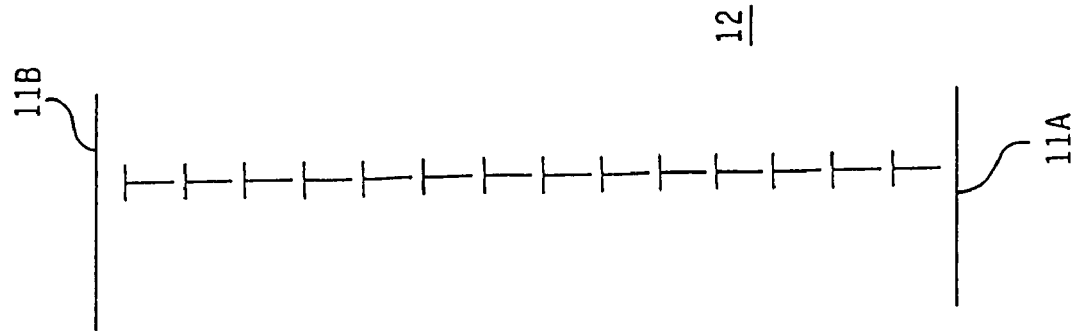

In a VA-mode liquid crystal display device such as the device 20 of FIG. 6A, the liquid crystal molecules are aligned generally perpendicularly to the panel substrate as indicated in FIG. 38A in a non-activated state thereof, in which no drive voltage is applied to the liquid crystal panel. Thus, no substantial effect appears on the viewing-angle characteristics even when a chiral substance is added to the liquid crystal layer 12 forming the liquid crystal panel 11. It should be noted that FIG. 38A shows the non-activated state of the liquid crystal layer 12 with a chiral substance added thereto.

In an activated state shown in FIG. 38B in which the liquid crystal molecules are aligned horizontally, on the other hand, it is expected that the chiral pitch of the chiral substance added to the liquid crystal layer 12 may induce some effect on the optical property of the liquid crystal display device 20. In the state of FIG. 38B, it should be noted that the liquid crystal molecules show a twisting in the thickness direction of the liquid crystal layer 12 with a generally uniform twist angle, which is determined by the chiral pitch p of the chiral substance and the thickness d of the liquid crystal layer.

Figure 39B:
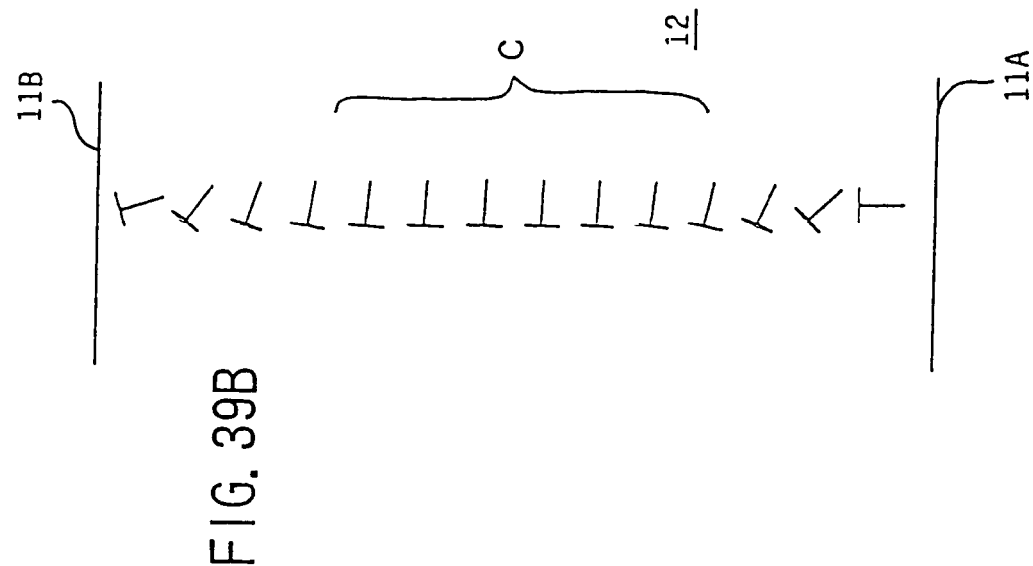
FIGS. 39A and 39B are diagrams showing the orientation of the liquid crystal molecules of the liquid crystal display device of FIG. 6A for the case in which no chiral substance is added to the liquid crystal layer.
Figure 39A:
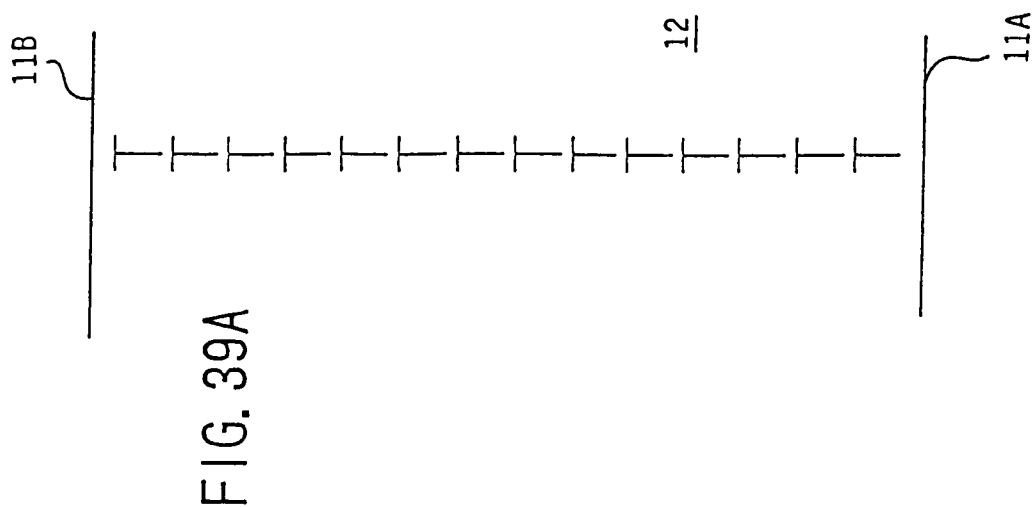

In the case in which the chiral substance is not added to the liquid crystal layer 12, the liquid crystal molecules show a generally vertically oriented state similar to the state of FIG. 38A in the non-activated state of the VA-mode liquid crystal display device 20 as indicated in FIG. 39A. However, the liquid crystal molecules show a somewhat irregularly oriented horizontal state in the activated state of the liquid crystal display device 20 as indicated in FIG. 39B, due to the absence of chiral pitch control by the chiral substance. As indicated in FIG. 39B, the twisting of the liquid crystal molecules appears in the vicinity of the molecular alignment films carried by the lower and upper substrates 11A and 11B, while no substantial twisting occurs in a central region C of the liquid crystal layer 12.

Figure 40:
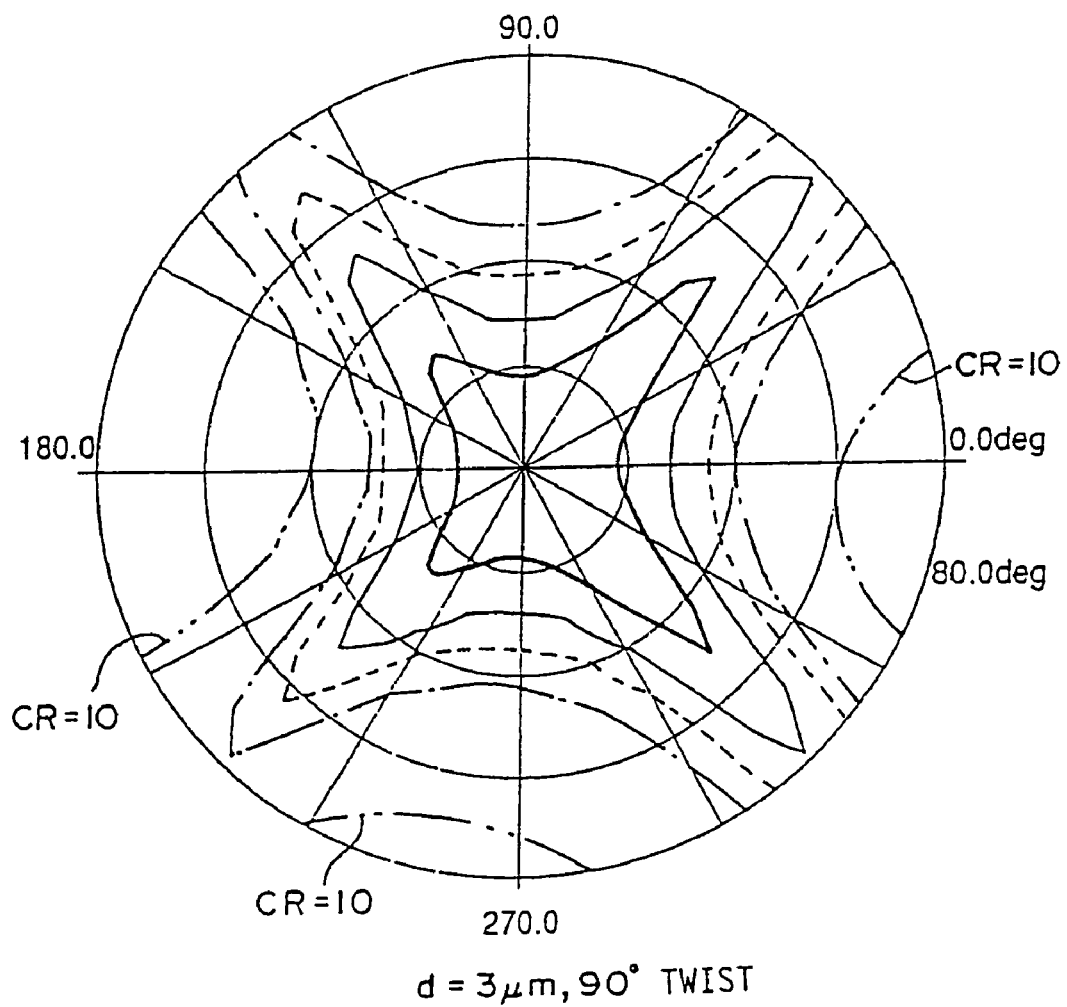
FIG. 40 is a diagram showing the viewing-angle characteristics of the liquid crystal display device of FIG. 6A for the case in which a chiral substance is added to the liquid crystal layer.

FIG. 40 shows the viewing-angle characteristics of the liquid crystal display device 20 of FIG. 6A in which the thickness d of the liquid crystal layer 12 is set to 3 μm and the twist angle of the liquid crystal molecules is set to 90°, for the case in which a chiral substance is added to the liquid crystal layer 12 with a chiral pitch control in which the d/p ratio is set to 0.25, wherein d represents the thickness of the liquid crystal layer 12 as noted already and p represents the chiral pitch of the chiral substance.

Referring to FIG. 40, it should be noted that the region that provides a contrast ratio CR of 10 or more is decreased as compared with the viewing-angle characteristics of FIG. 35 for a comparable construction of the liquid crystal display device 20 except that no chiral substance is added to the liquid crystal layer 12. The result of FIG. 40 indicates that the use of chiral substance in a VA-mode liquid crystal display device is not preferable from a viewpoint of improving the viewing-angle characteristics.

Figure 41:
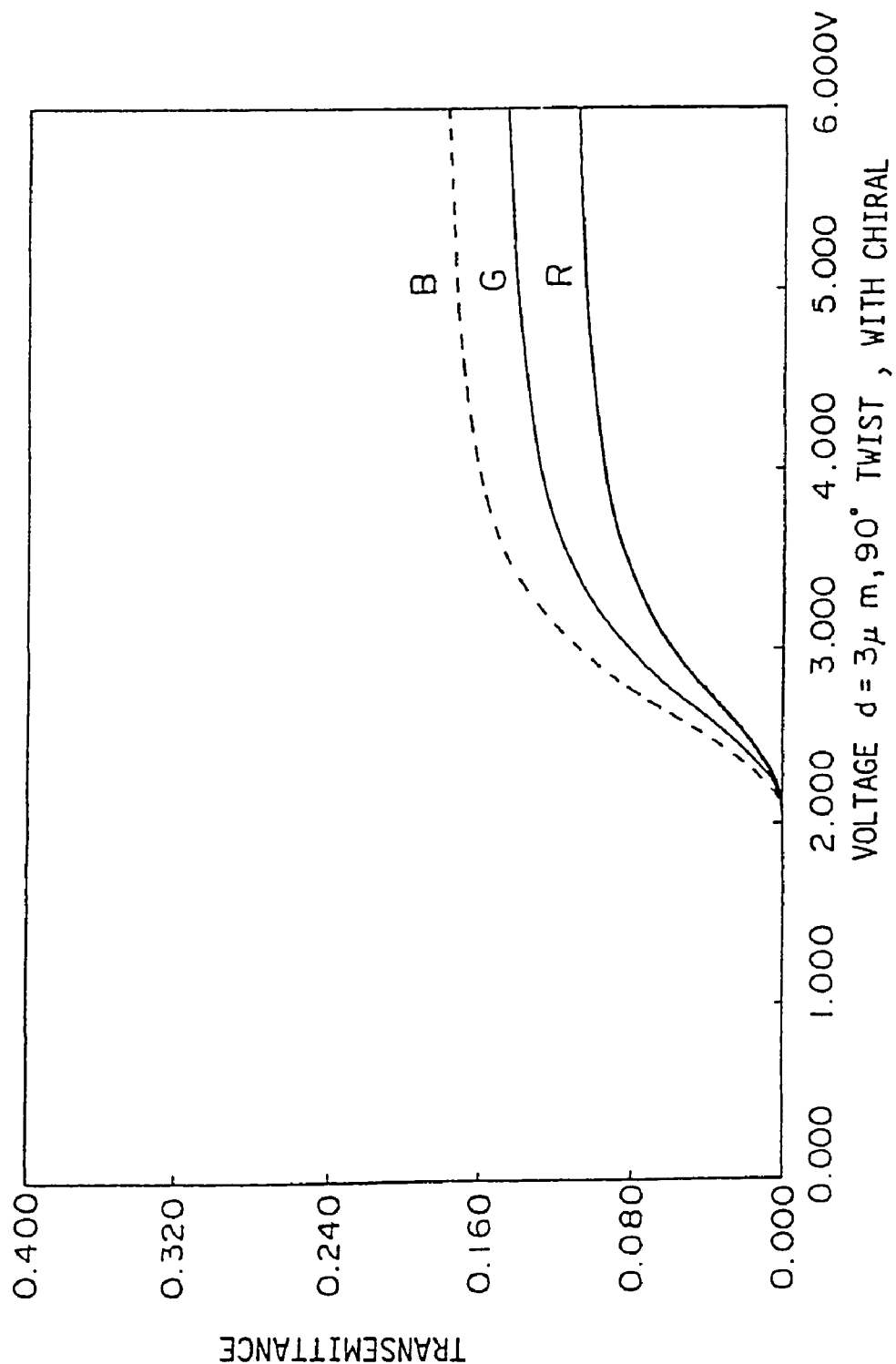
FIG. 41 is a diagram showing a transmittance of the liquid crystal display device of FIG. 6A for the case in which a chiral substance is added to the liquid crystal layer.
Figure 42:
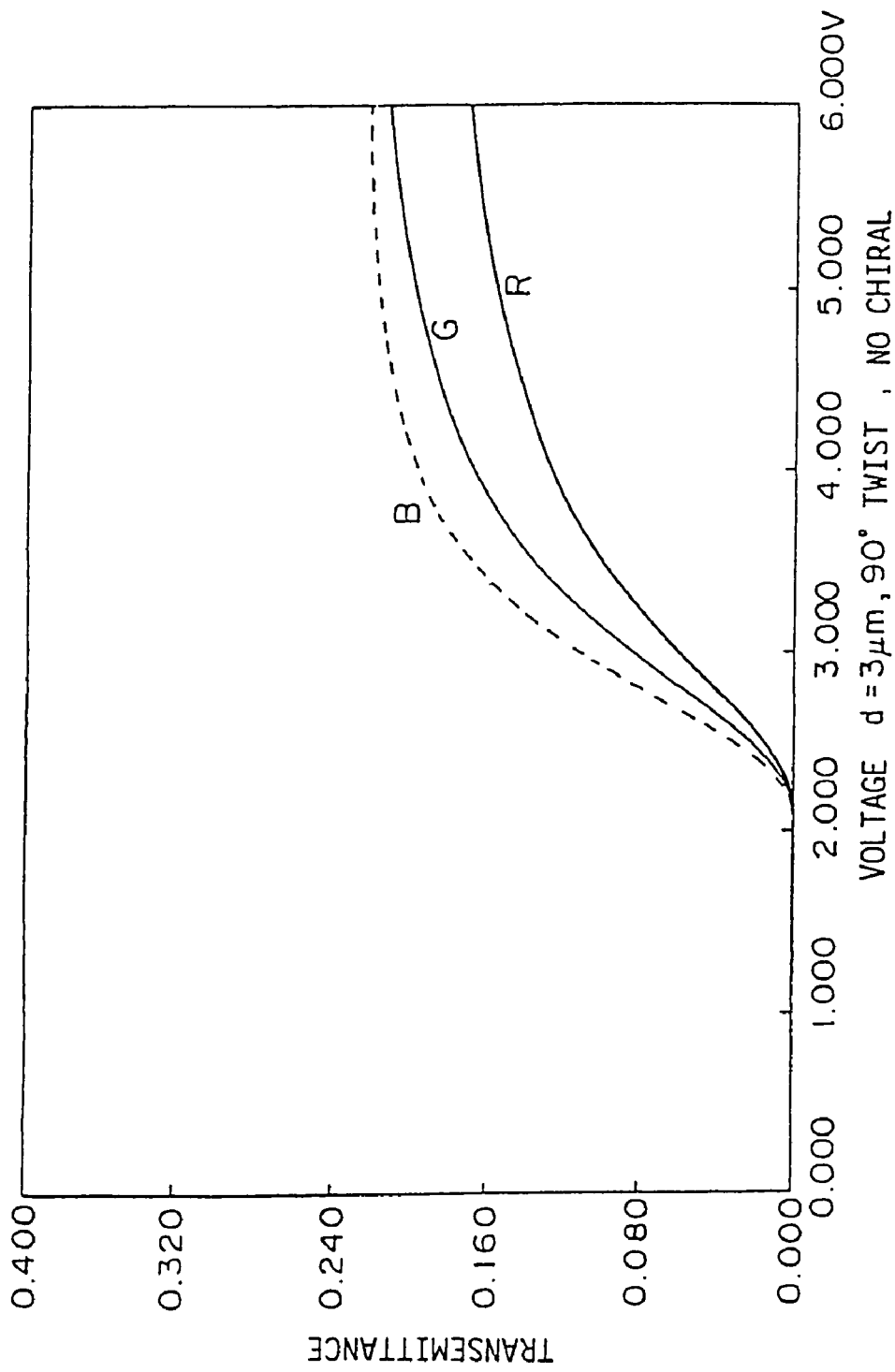
FIG. 42 is a diagram showing a transmittance of the liquid crystal display device of FIG. 6A for the case in which no chiral substance is added to the liquid crystal layer.

FIGS. 41 and 42 show the transmittance of the liquid crystal display device 20 for each of the three primary colors R, G and B in the front direction of the display device for a case in which the thickness d is set to 3 μm and the twist angle of the liquid crystal molecules is set to 90°, wherein FIG. 41 shows the case in which a chiral substance is added while FIG. 42 shows the case in which no chiral substance is added.

The result of FIGS. 41 and 42 indicates that the addition of the chiral substance causes a decrease of the transmittance and hence the brightness of the liquid crystal display device 20. It is believed that the region C of FIG. 39B, in which the liquid crystal molecules are not twisted, causes an efficient rotation of the optical plane for the optical beam passing therethrough, while no such a region is formed in the state of FIG. 38B.

From FIGS. 41 and 42, it is concluded that it is preferable not to add a chiral substance to the liquid crystal layer in a VA-mode liquid crystal display device from a viewpoint of improving the brightness and hence the contrast ratio. It should be noted that the foregoing conclusion applies not only to the liquid crystal display device of FIGS. 4A and 4B that uses a liquid crystal of negative dielectric anisotropy but also to the liquid crystal display device of FIGS. 5A and 5B that uses a liquid crystal of positive dielectric anisotropy.

Figure 43:
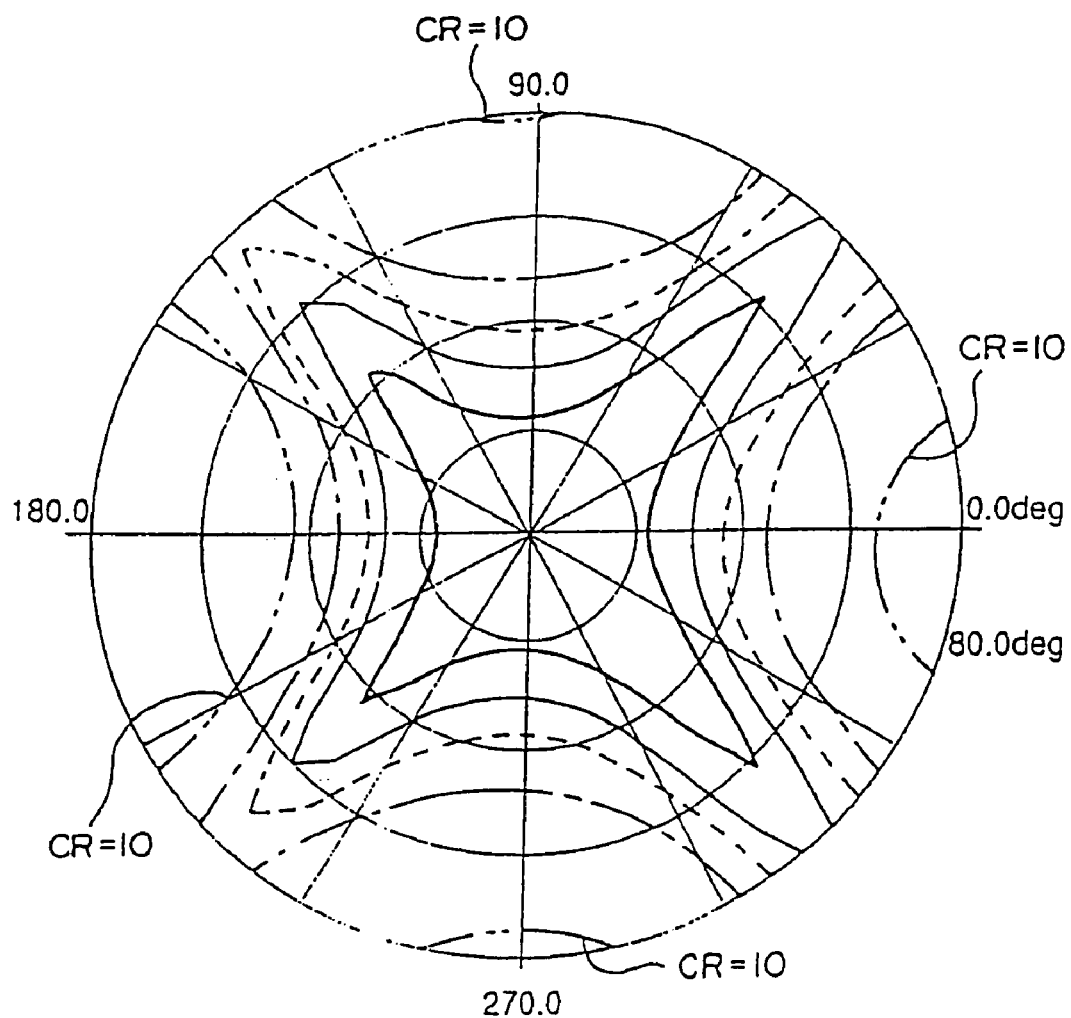
FIGS. 43–46 are diagrams showing the viewing-angle characteristics of the liquid crystal display device of FIG. 6A for various pretilt angles of the liquid crystal molecules.
Figure 44:
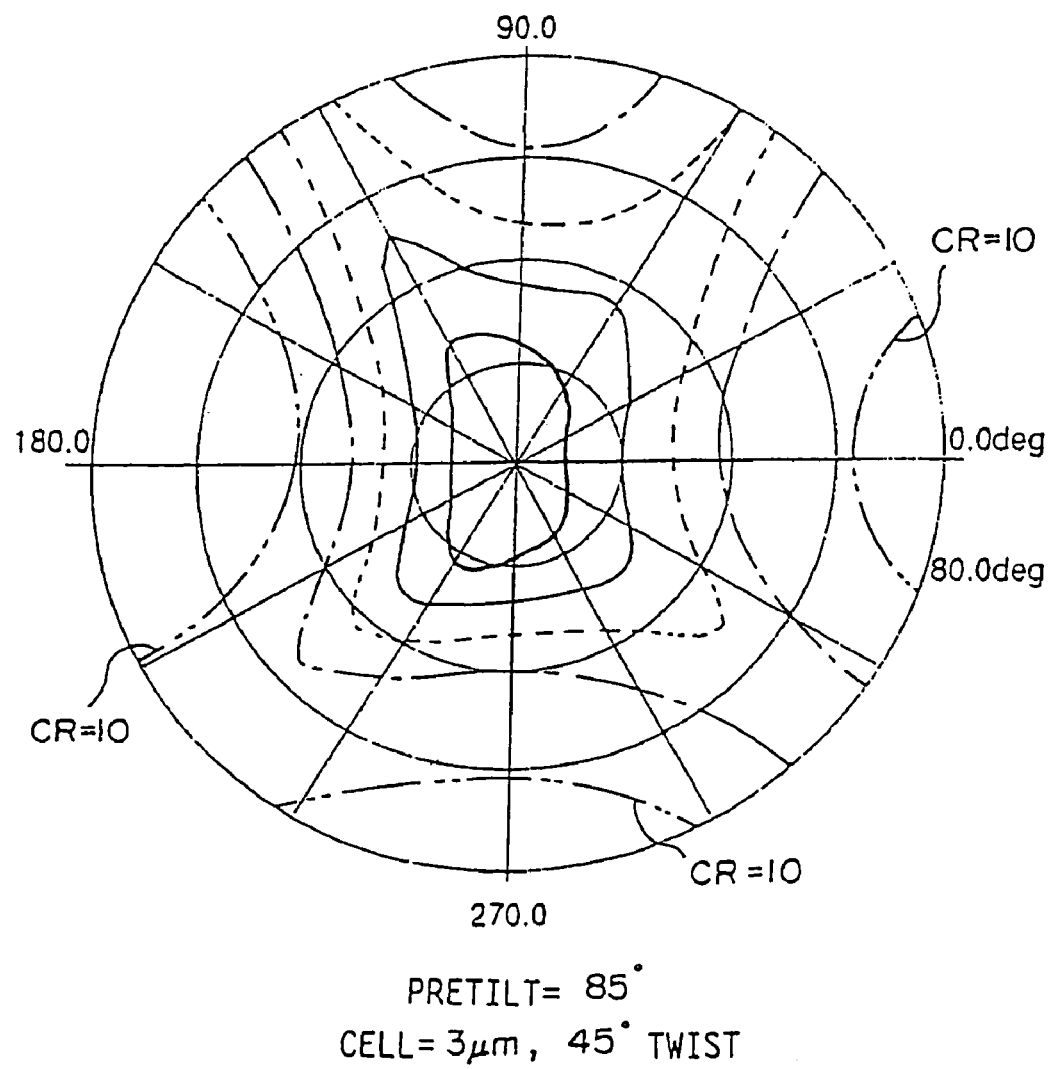
Figure 45:
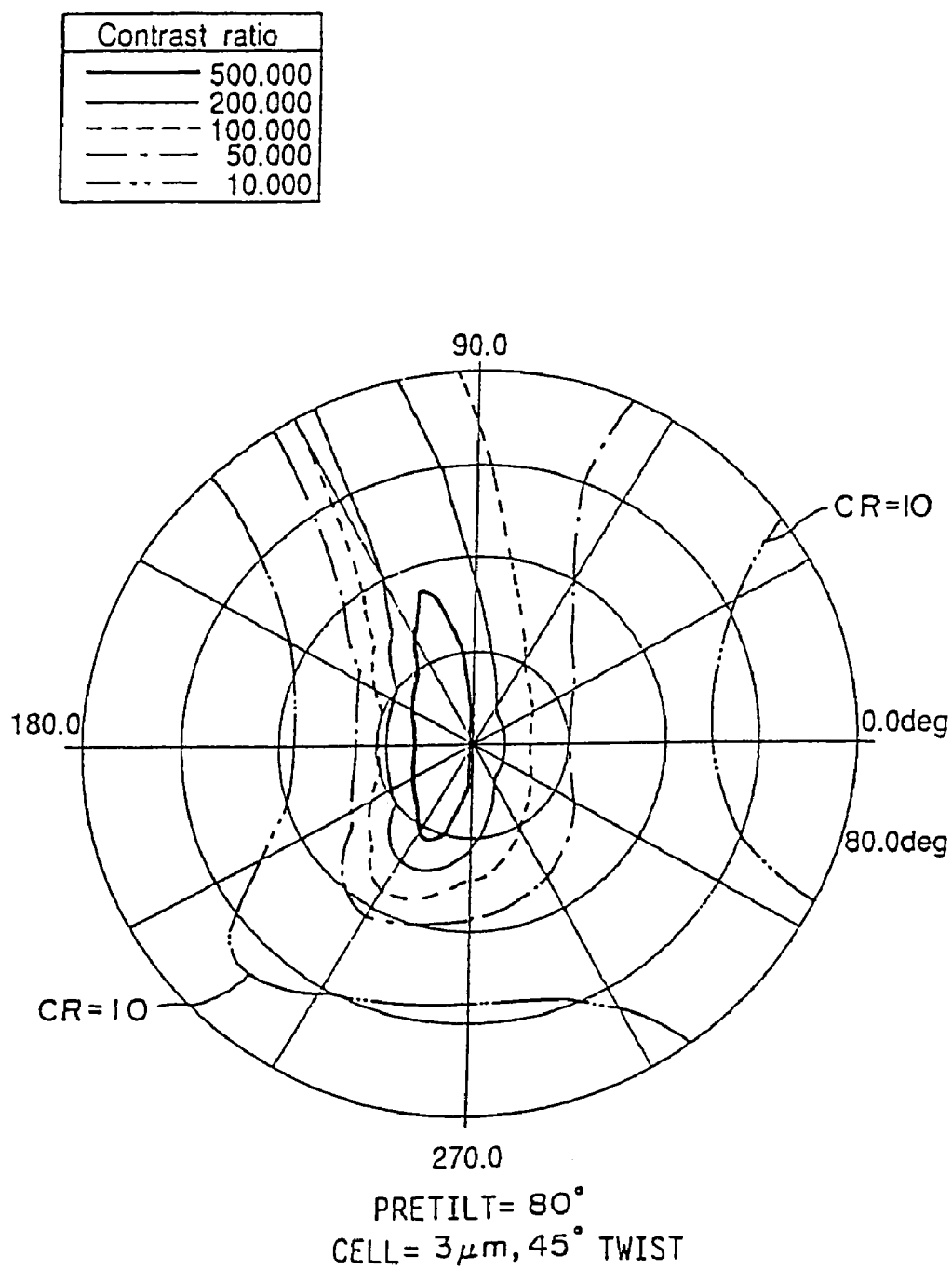
Figure 46:
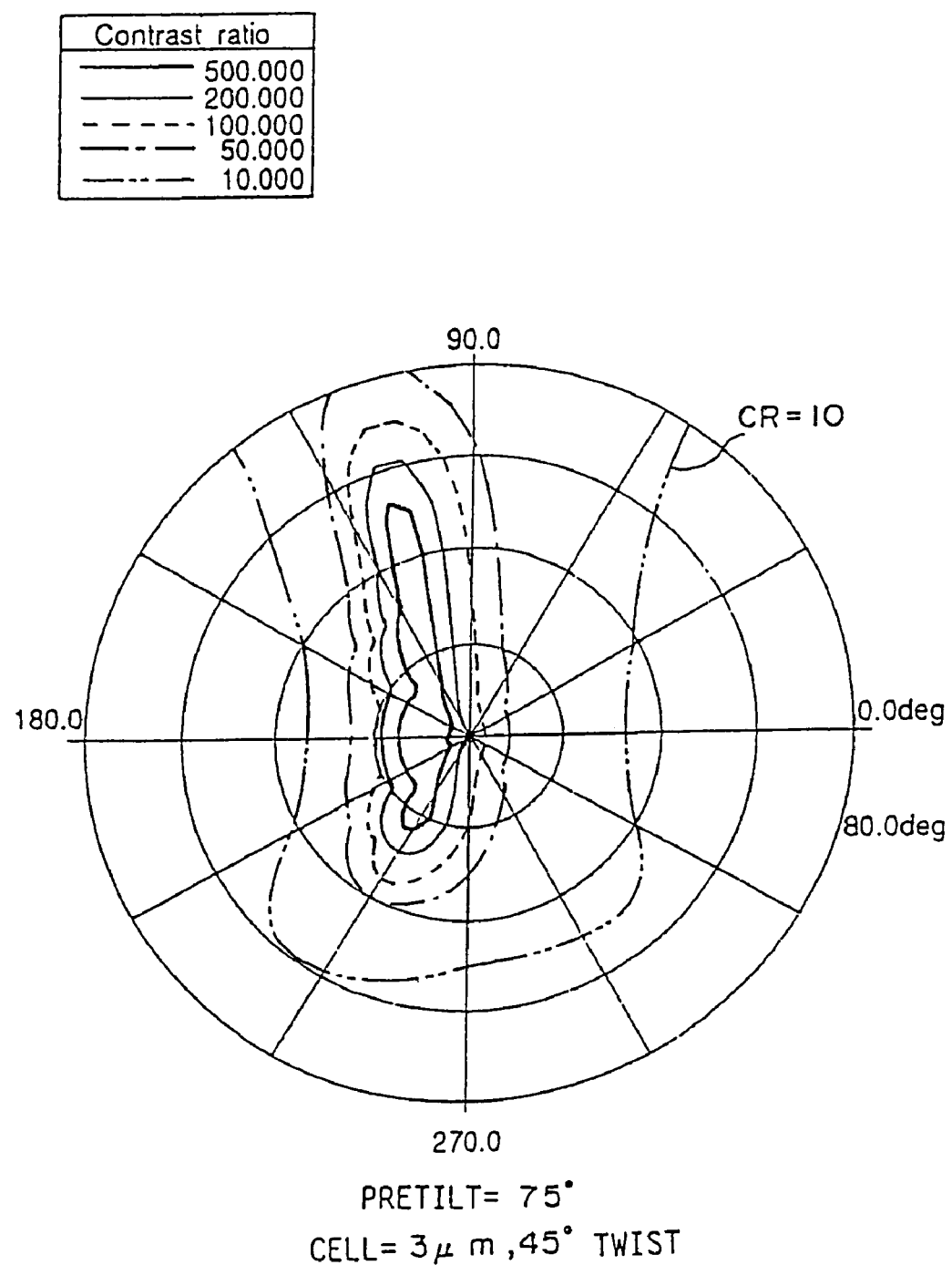
Figure 47:
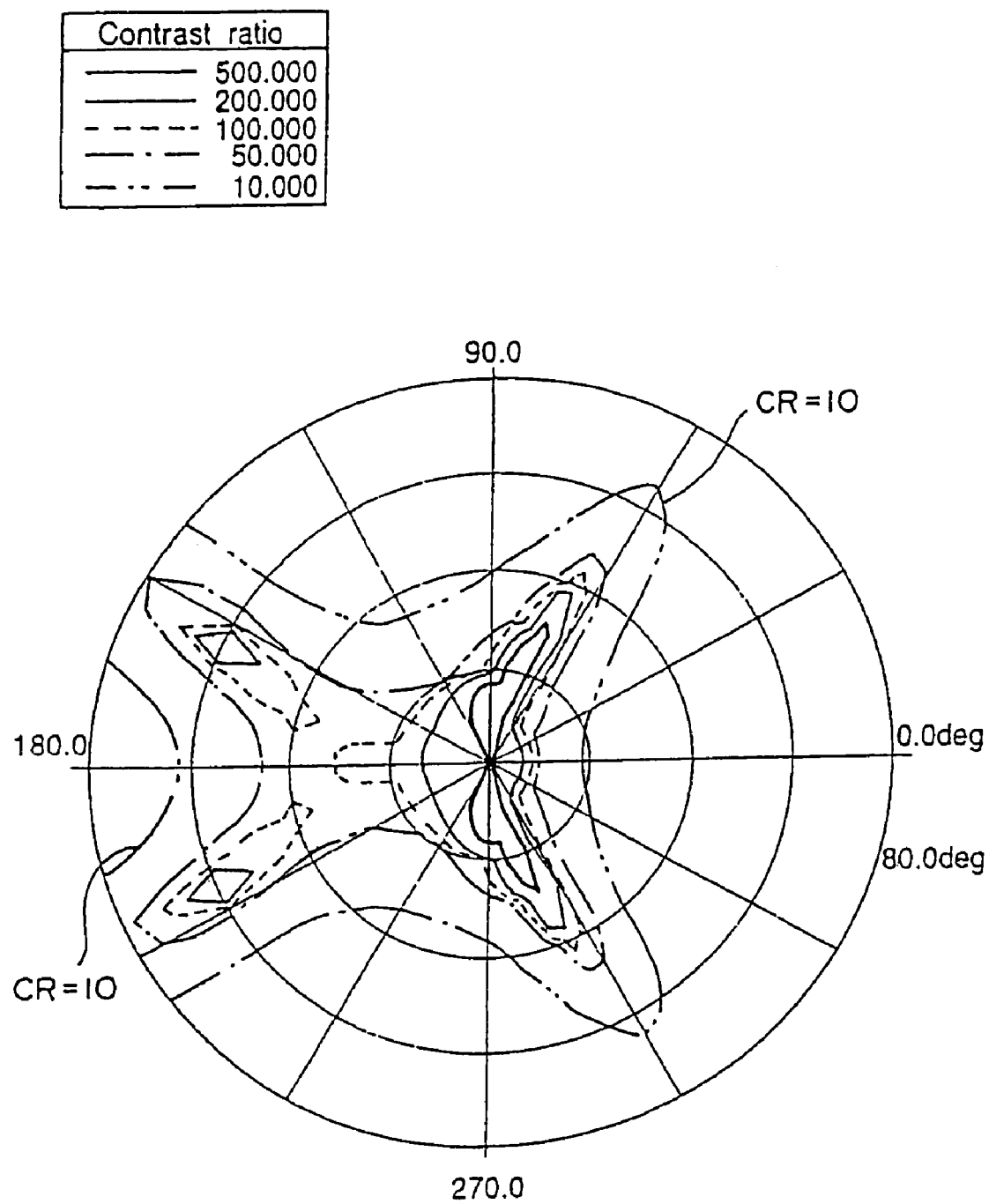
FIG. 47 is a diagram showing the viewing-angle characteristics of a typical twist-nematic liquid crystal display device.

Further, the inventor of the present invention has conducted an investigation on the effect of the pretilt angle of the liquid crystal molecules on the viewing-angle characteristics of the liquid crystal display device 20 of FIG. 6A. The result is represented in FIGS. 43–47, wherein FIG. 43 shows the case in which the pretilt angle is set to 89.99°, FIG. 44 shows the case in which the pretilt angle is set to 85°, FIG. 45 shows the case in which the pretilt angle is set to 80°, and FIG. 46 shows the case in which the pretilt angle is set to 75°. Further, FIG. 47 shows the viewing-angle characteristics of a standard TN-mode liquid crystal display device as a reference.

Referring to FIGS. 43–47, it should be noted that the case of FIG. 43, in which the pretilt angle is set substantially to 90°, provides the widest viewing-angle characteristics and that the viewing-angle characteristics become narrower with decreasing pretilt angle. When the pretilt angle is set to 75° as in the case of FIG. 46, the obtained viewing-angle characteristics are more or less equal to that of a typical TN-mode liquid crystal display device shown in FIG. 47.

The foregoing results indicate that it is preferable to set the pretilt angle of the liquid crystal molecules to be larger than 75°, preferably larger than 87°, more preferably larger than 89°. It should be noted that the foregoing conclusion applies not only to the liquid crystal display device of FIGS. 4A and 4B that uses a liquid crystal of negative dielectric anisotropy but also to the liquid crystal display device of FIGS. 5A and 5B that uses a liquid crystal of positive dielectric anisotropy.

First Embodiment

Figure 48:
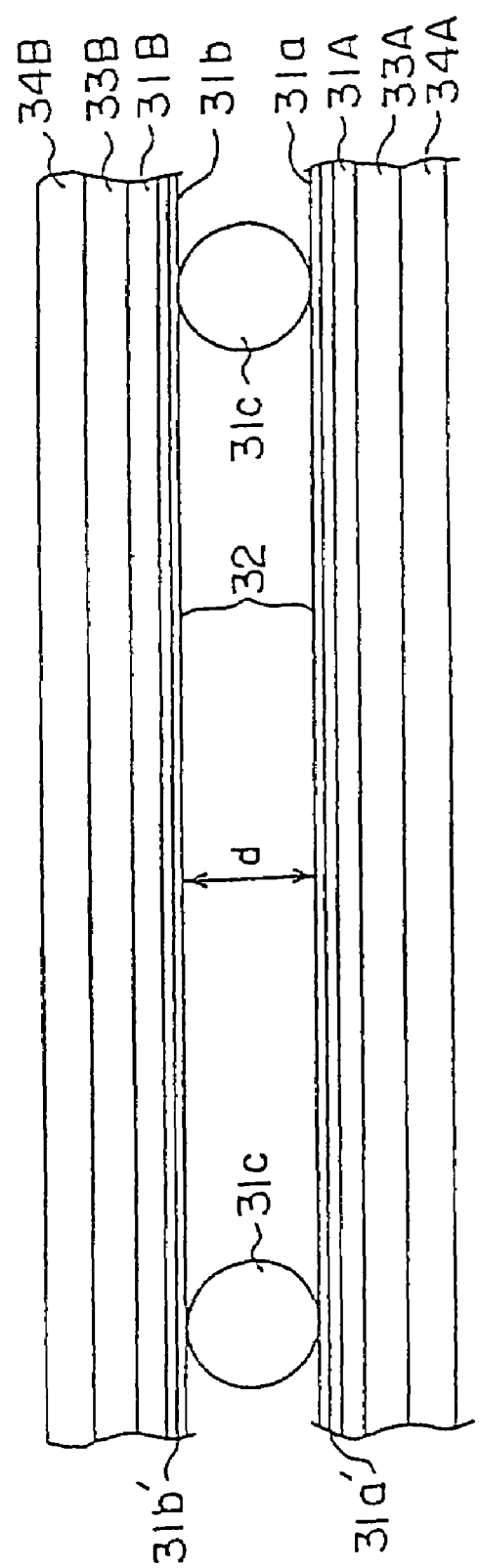
FIG. 48 is a diagram showing a construction of a liquid crystal display device according to a first embodiment of the present invention.

FIG. 48 shows a construction of a liquid crystal display device 30 according to a first embodiment of the present invention in a cross-sectional view.

Referring to FIG. 48, the liquid crystal display device 30 includes a glass substrate 31A and a glass substrate 31B, wherein the glass substrate 31A carries, on an upper major surface thereof, a transparent electrode 31a' of ITO and a molecular alignment film 31a covering the electrode 31a' as usual in a liquid crystal display device. Similarly, the glass substrate 31B carries, on a lower major surface thereof, a transparent electrode 31b' of ITO and a molecular alignment film 31b covering the electrode 31b', wherein the substrate 31A and the substrate 31B are disposed such that the molecular alignment film 31a and the molecular alignment film 31b face with each other with polymer spacer balls 31c intervening therebetween.

Further, the space thus formed between the substrates 31A and 31B is sealed by providing a seal member (not illustrated), and a liquid crystal having a negative dielectric anisotropy such as MJ941296 of E. Merck, Inc. ($\Delta n$=0.0804, $\Delta \epsilon$=−4) is injected to the foregoing space by a vacuum injection process. Thereby, a liquid crystal layer 32 is formed. In such a liquid crystal panel, the thickness d of the liquid crystal layer 32d is determined by the diameter of the polymer spacer balls 31c.

On the outer sides of the liquid crystal panel thus formed, retardation films 33A and 33B are disposed. Further, polarizers 34A and 34B are disposed on the outer sides of the retardation films 33A and 33B with respective orientations with respect to the center of twist, as explained already with reference to FIG. 1 or FIG. 6A. In other words, the liquid crystal display device 30 of FIG. 48 corresponds to the case of the liquid crystal display device 20 of FIG. 6A in which the retardation film 14B is provided.

TABLE I below summarizes the result of an evaluation test conducted on the liquid crystal display device 30 for the response and viewing-angle characteristics at 25° C. for various thicknesses d of the liquid crystal layer 32 while setting the twist angle to 45°. In this experiment, RN783 of Nissan Chemicals KK was used for the molecular alignment t films 31a and 31b. Further, G1220DU of Nitto Denko KK or SK-1832A of Sumitomo Chemicals KK was used for the polarizers 34A and 34B. In the tested device 30, the retardation films 33A and 33B were omitted. However, the compensation of the retardation of the liquid crystal panel was achieved, to some extent, by protective films covering the polarizers. The protective film is known as TAC film (TAC=triacetate cellulose) and has a very small, but finite birefringence. For example, the G1220DU polarizer carries a protective film that shows a retardation of about 44 nm. The TAC film of the SK-1832AP7 polarizer exhibits a retardation of about 50 nm. No chiral substance was added to the liquid crystal layer 32.

TABLE I

| PANEL # | d(μm) | $T_{on}$ (ms) | $T_{off}$ (ms) | CR ≧ 10° at 25° C. | | | | |
|---|---|---|---|---|---|---|---|---|
| | | | | 0° | 90° | 180° | −90° | av. |
| OM480 | 3.75 | 13.56 | 9.04 | 41 | 54 | 48 | 54 | 49.25 |
| OM482 | 3.00 | 8.79 | 5.71 | 42 | 58 | 52 | 58 | 52.50 |
| OM484 | 2.60 | 7.81 | 4.45 | 42 | 60 | 52 | 60 | 53.50 |

Referring to TABLE I, it should be noted that the turn-on transient time $T_{on}$ as well as the turn-off transient time $T_{off}$ of the liquid crystal display device 30 decreases with decreasing thickness d of the liquid crystal layer 32. In other words, the response of the liquid crystal display device 30 improved by decreasing the thickness d of the liquid crystal layer 32. Further, the range of the viewing-angle in which the contrast ratio R exceeds 10° (CR≧10°) expands with decreasing thickness d of the liquid crystal layer 32. On the other hand, excessive decrease of the thickness d results in a decrease of the brightness as already noted. Thus, it is preferred to set the thickness d of the liquid crystal layer 32 such that the retardation $\Delta n \cdot d$ of the liquid crystal layer 32 falls in a range between about 80 nm and about 400 nm.

It should be noted that the foregoing TAC film is used extensively as a protective film of polarizer or analyzer in conventional TN or STN liquid crystal display devices due to the very small retardation value. A typical TAC film has a positive retardation R' of 5–15 nm in the in-plane direction and a negative retardation of 38–50 nm in the thickness direction. The value of the retardation R or R' can be changed by changing the thickness of the film.

On the other hand, the inventor of the present invention has discovered that the VA-mode liquid crystal display device of the present invention is susceptible to such a very small retardation with regard to the viewing-angle and contrast and that an optimization is necessary also for the TAC film. Further, it was discovered that such an optimization of the TAC film can lead to a further improvement of the viewing-angle characteristics of the liquid crystal display device. The TAC film on the outer surface of the polarizer does not affect the optical properties of the liquid crystal display device.

In conventional TN or STN liquid crystal display devices, the TAC film is provided with an orientation such that the retardation thereof axis extends in a direction parallel to the absorption axis of the polarizer or analyzer adjacent to the TAC film. On the other hand, the inventor of the present invention has discovered, as will be described later in detail, that it is preferable to dispose the TAC film such that the retardation axis thereof intersects generally perpendicularly to the absorption axis of the adjacent polarizer or analyzer. By doing so, the effective retardation of the retardation film is given as a difference between the positive retardation of the retardation film and the positive retardation of the TAC film.

Thus, in the case in which a standard polarizer carrying a TAC film thereon is to be used, it is necessary to set the retardation of the retardation film larger than the desired retardation by an amount corresponding to the retardation of the TAC films disposed on both sides of the liquid crystal panel. On the other hand, when a polarizer that carries a TAC film thereon with such an orientation that the retardation axis of the TAC film extends parallel to the absorption axis of the polarizer, the effective retardation of the polarizer increases, and it is necessary to set the retardation of the retardation film to be smaller than the desired retardation by an amount corresponding to the retardation of the TAC films disposed on both sides of the liquid crystal panel.

Figure 49A:
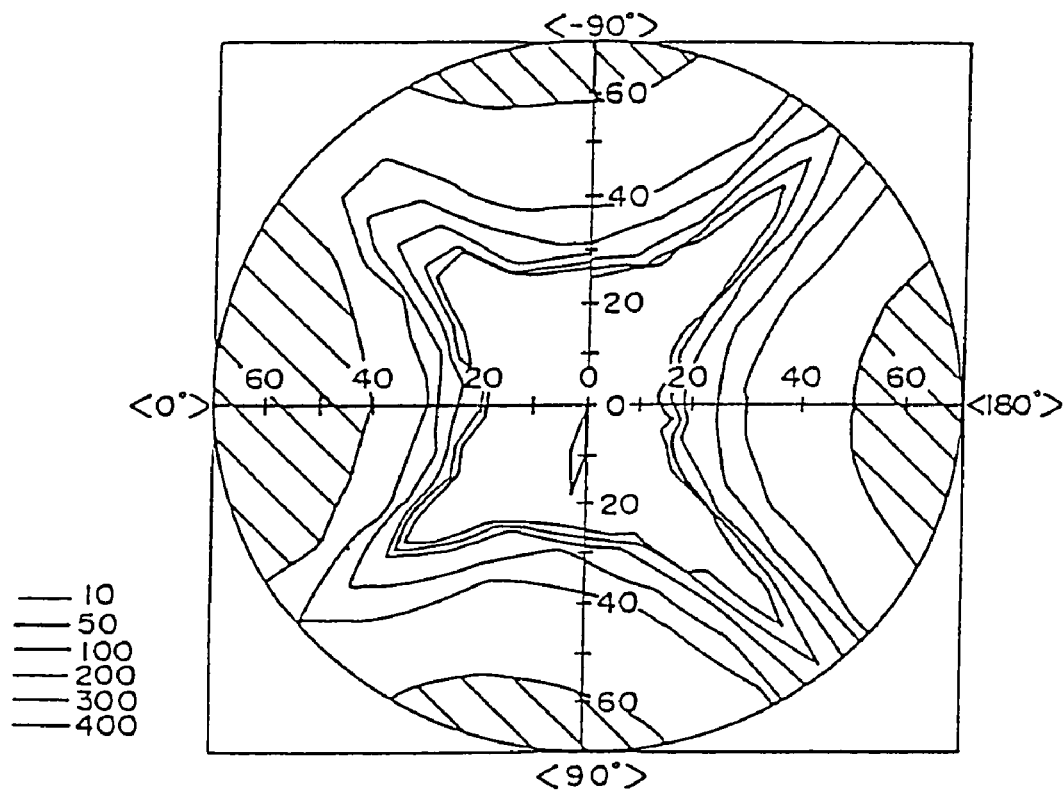
FIGS. 49A and 49B are diagrams showing the viewing-angle characteristics of the liquid crystal display device of FIG. 48.
Figure 49B:
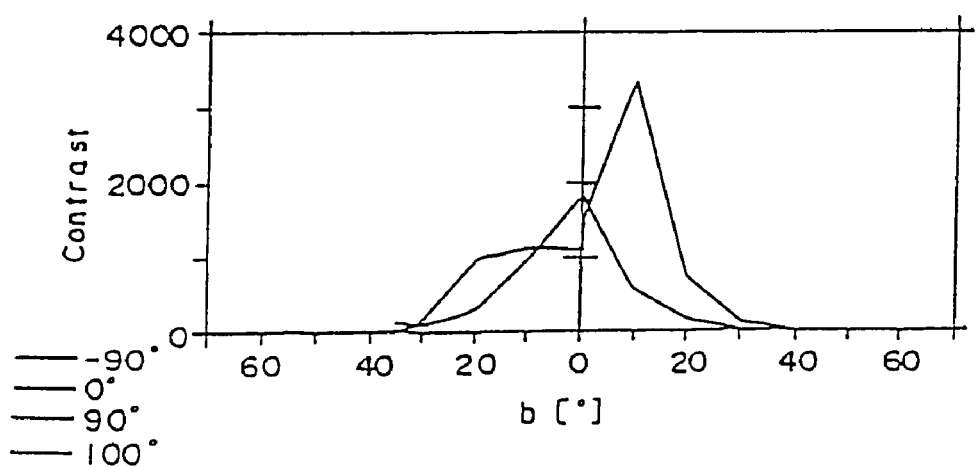

FIGS. 49A and 49B show the viewing-angle characteristics of the liquid crystal display device 30 of FIG. 48 for the case in which the thickness d is set to 3 μm and the twist angle is set to 45°. In the example of FIGS. 49A and 49B, no chiral substance was added to the liquid crystal layer 32. Further, the TAC films covering the polarizers 34A and 34B were used for the retardation films 33B and 34B. In other words, no separate retardation films were used. In the experiment, the G1220DU polarizer marketed by Nitto Denko KK was used for the polarizers 34A and 34B as already noted, in combination with the MJ941296 liquid crystal of Merck Japan, LTD.

In FIG. 49A, it should be noted that a region indicated by white represents the viewing-angle characteristics that provide a contrast ratio equal to 10 or more (CR≧10). It will be noted that a very large area is represented white in FIG. 49A, indicating that the tested liquid crystal display 30 device provides an excellent viewing-angle characteristics. Further, FIG. 49B indicates that a contrast ratio of near 2000 is obtained in the front direction of the liquid crystal display device.

Figure 50A:
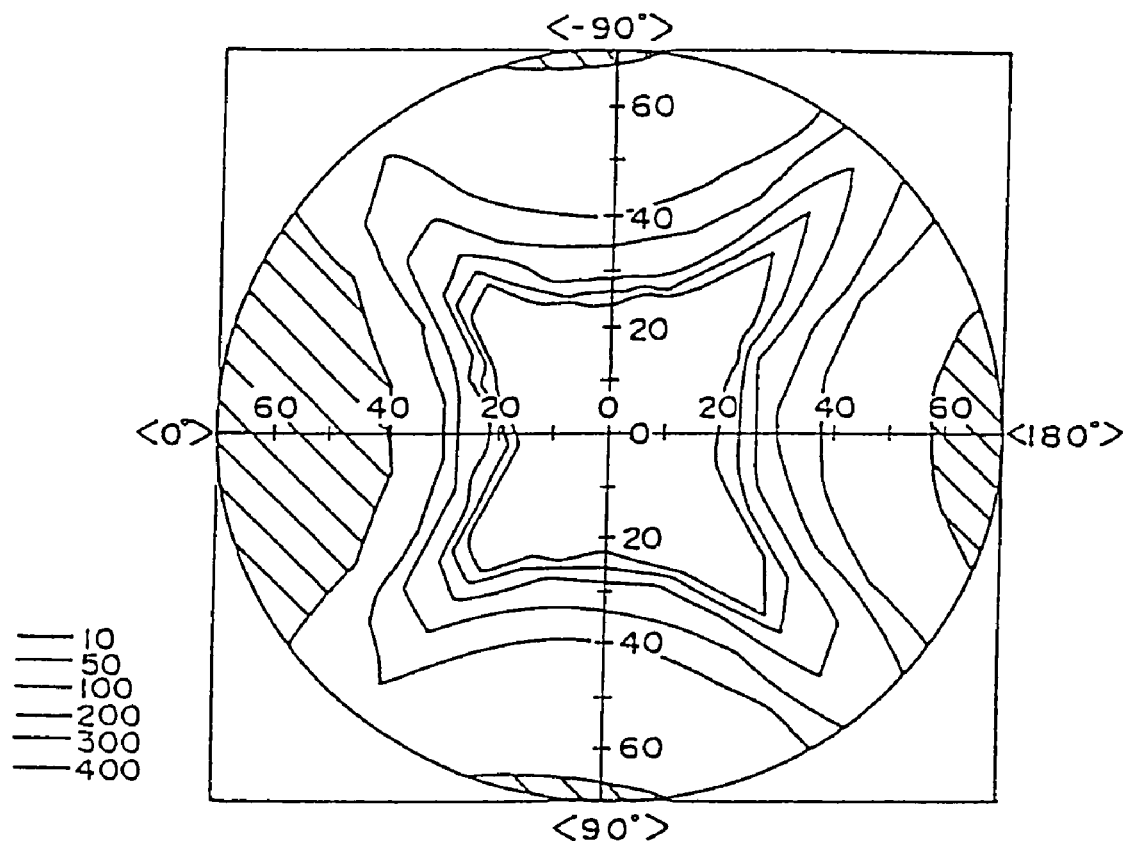
FIGS. 50A and 50B are diagrams showing the viewing-angle characteristics of the liquid crystal display device of FIG. 48 for a case in which a retardation film is added.
Figure 50B:
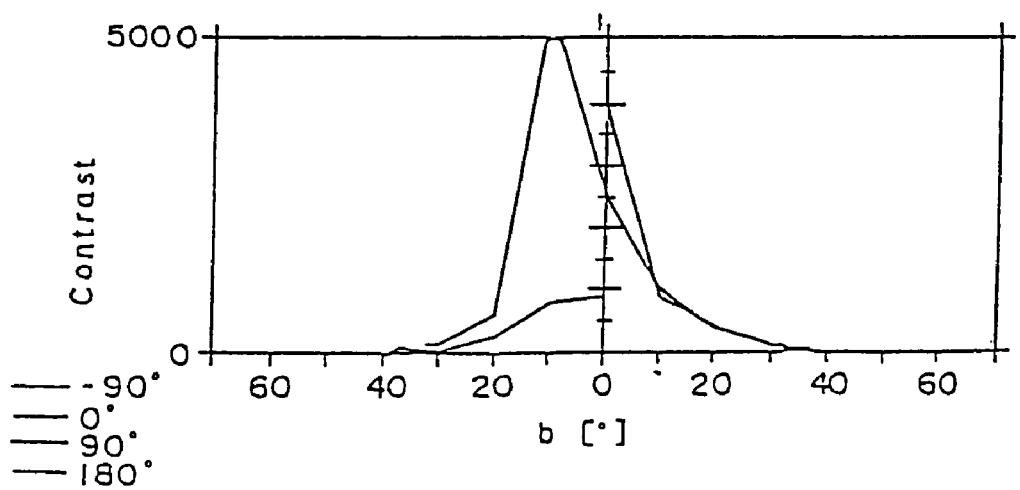

FIGS. 50A and 50B show the viewing-angle characteristics of the liquid crystal display device 30 of FIG. 48 for the case in which a commercially available retardation film (VACO of Sumitomo Chemicals KK) is used for the retardation films 33A and 33B, wherein it should be noted that the retardation films 33A and 33B are set such that a total retardation R' including also the contribution from the TAC films of the polarizers 34A and 34B, takes a value of 218 nm, which value is selected close to the retardation Δn·d of 241 nm of the liquid crystal layer 12 and hence the liquid crystal panel 11.

As will be seen from FIG. 50A, the area of the viewing-angle that provides a contrast ratio of 10 or more increases further as compared with the case of FIG. 49A. Further, the contrast achieved in the front direction of the panel reaches 4000 as indicated in FIG. 50B.

Figure 51:
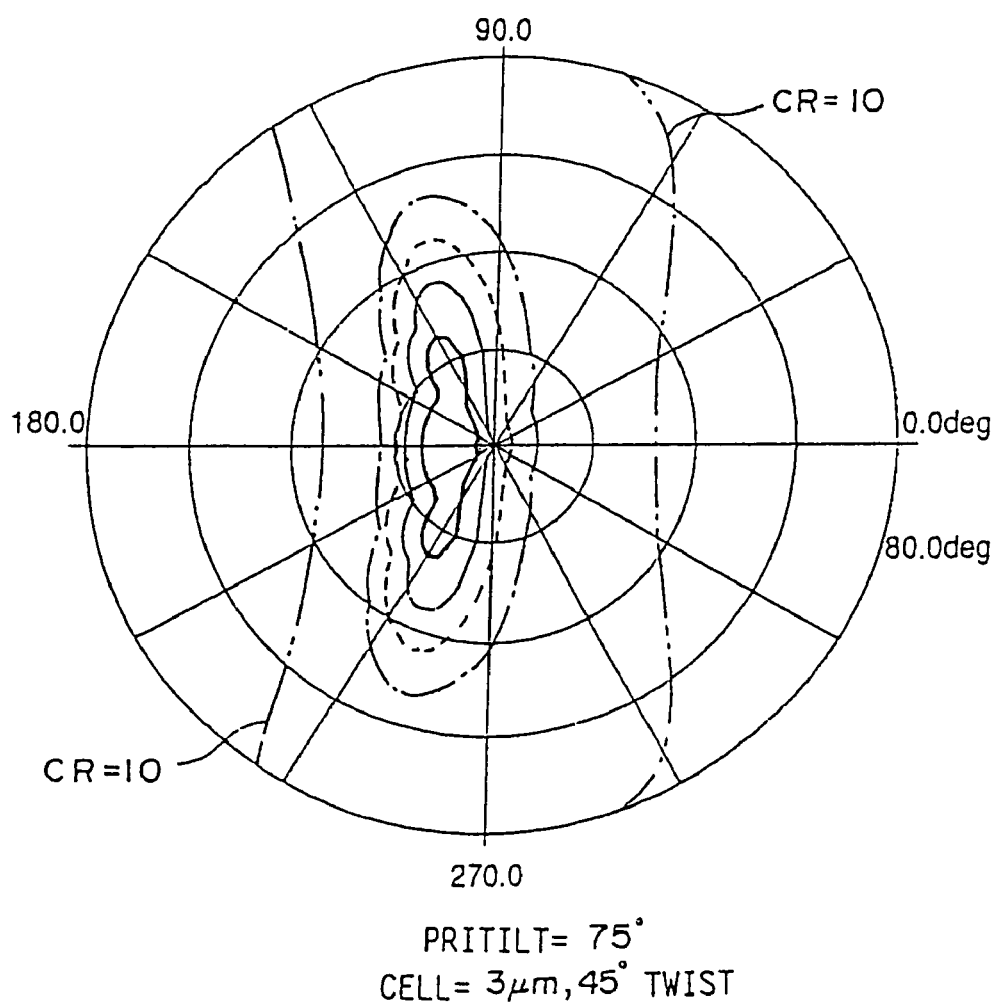
FIG. 51 is a diagram showing the viewing-angle characteristics of the liquid crystal display device of FIG. 48 for a case in which a pair of retardation films are added and the pretilt angle of the liquid crystal molecules is set to 75°.

It has been described previously with reference to FIGS. 43–47 that the viewing-angle characteristics of a VA-mode liquid crystal display device are deteriorated to the degree of an ordinary TN-mode liquid crystal display device when the pretilt angle is set to 75°. In the construction of FIG. 48 that includes the retardation films 33A and 33B above and below the liquid crystal layer 32, however, the area of the viewing-angle in which the contrast ratio CR of 10 or more is achieved is increased to a satisfactory level for a liquid crystal display device as indicated in FIG. 51. It should be noted that the result of FIG. 51 is for the case in which the liquid crystal layer 32 has a thickness of 3 μm and the pretilt angle is set to 75°.

Second Embodiment

Next, a second embodiment of the present invention will be described.

In the second embodiment, another liquid crystal, MX95785 of Merck Japan, Ltd., is used in the liquid crystal display device 30 of FIG. 48 for the liquid crystal layer 32, in place of the foregoing MJ941296 liquid crystal. The MX95785 liquid crystal has a birefringence Δn of 0.813 and a negative dielectric anisotropy Δε of −4.6. As the rest of the construction is identical to the liquid crystal display device 30 of FIG. 45, further description about the construction of the liquid crystal display device will be omitted.

Figure 52:
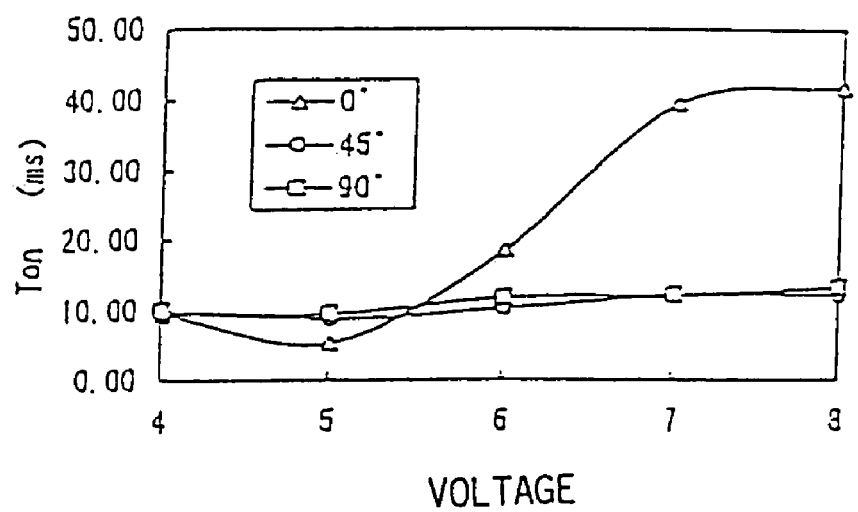
FIGS. 52 and 53 are diagrams showing a response of the liquid crystal display device according to a second embodiment of the present invention.

FIG. 52 shows turn-on transient characteristics of the liquid crystal display device for the case in which the thickness d of the liquid crystal layer 32 is set to 3 μm, wherein FIG. 52 shows a turn-on transient time Ton for each of the twist angles of 0°, 45° and 90°. No chiral substance is added to the liquid crystal layer 32. As will be seen clearly from FIG. 49, the turn-on transient time Ton is about 10 ms except for the case where the twist angle is 0°, as long as the drive voltage is in the range of 4–8 V. In other words, the liquid crystal display device 30 shows an excellent turn-on response as compared with conventional TN-mode liquid crystal display devices that typically show a turn-on time $T_{on}$ of 20 ms or more.

Figure 53:
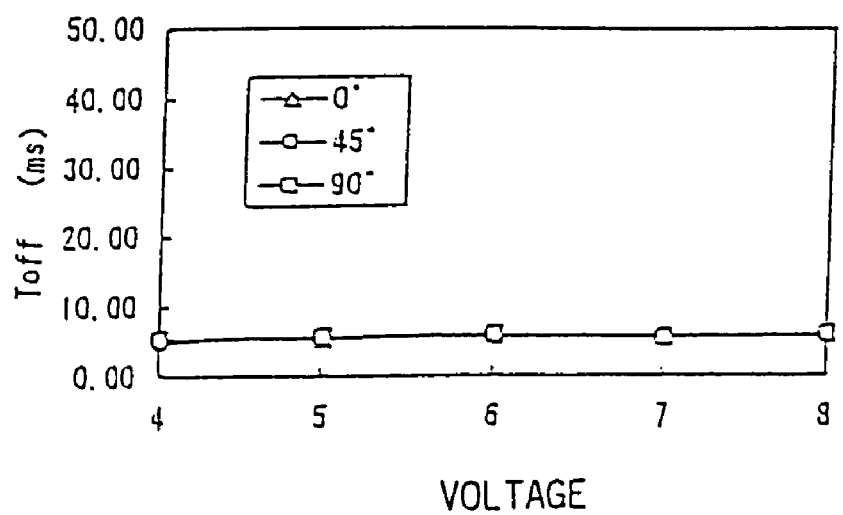

FIG. 53 shows the turn-off transient characteristics of the liquid crystal display device 30 for the case where the thickness d of the liquid crystal layer 32 is set to 3 μm, wherein FIG. 53 shows a turn-of transient time $T_{off}$ for each of the twist angles of 0°, 45° and 90°. In this example, as well, no chiral substance is added to the liquid crystal layer 32. As will be seen clearly from FIG. 53, the turn-off transient time $T_{off}$ is about 5 ms irrespective of the twist angle of the liquid crystal molecules. In other words, the liquid crystal display device 30 shows an excellent turn-off response as compared with conventional TN-mode liquid crystal display devices that typically show a turn-off time $T_{off}$ of 40 ms or more.

TABLE II

| R' (nm) VAC + TAC | CR ≧ 10 at 25° C. | | | | | inversion of gradation | | | | | |
|---|---|---|---|---|---|---|---|---|---|---|---|
| | 0° | 90° | 180° | −90° | av. | 0° | 45° | 90° | 135° | 180° | av. |
| 88 | 43 | 60 | 52 | 61 | 54 | 40 | 40 | 50 | 60 | 38 | 46 |
| 185 | 42 | 70 | 57 | 66 | 59 | 30 | 40 | 70 | 66 | 36 | 49 |
| 282 | 38 | 58 | 52 | 58 | 52 | 26 | 44 | 70 | 70 | 38 | 50 |

Δn·d=246 nm

TABLE II shows, in the left column, the viewing-angle of the liquid crystal display device 30 of the present embodiment for various values of the negative retardation R' caused by the polarizers 34A and 34B as well as by the retardation films 33A and 33B. Further, TABLE II shows, in the right column, the viewing-angle in which an inversion occurs in a half-tone image displayed with an eleven-step gradation in the front direction of the liquid crystal panel. With increasing polar angle from the front direction, there occurs an inversion in the gradation, while such an inversion of gradation deteriorates the quality of the displayed image seriously. In the experiment of TABLE II, it should be noted that the liquid crystal layer 32 has a positive retardation with a magnitude of 246 nm. From TABLE II, it should be noted that the area of the satisfactory viewing-angle increases for all of the azimuth angles of 90°, −90° and 180°, by setting the retardation caused by the retardation films 33A and 33B as well as by the TAC films of the polarizers 34A and 34B to be generally equal to the retardation Δn·d of the liquid crystal layer 32.

TABLE III

| twist (°) | CR ≧ 10 at 25° C. | | | | | inversion of gradation | | | | | |
|---|---|---|---|---|---|---|---|---|---|---|---|
| | 0° | 90° | 180° | −90° | av. | 0° | 45° | 90° | 135° | 180° | av. |
| 0 | 44 | 60 | 49 | 60 | 53 | 40 | 40 | 52 | 60 | 38 | 46 |
| 45 | 43 | 60 | 52 | 61 | 54 | 40 | 40 | 50 | 60 | 38 | 46 |
| 90 | 41 | 59 | 50 | 60 | 53 | 40 | 40 | 54 | 64 | 32 | 46 | no VAC films, use G1220DU polarizer (R'=88 nm)

TABLE III shows, in the left column, the viewing-angle of the liquid crystal display device of the present embodiment for various twist angles of the liquid crystal molecules in the liquid crystal layer 32. Further, the right column of TABLE III represents the viewing-angle in which an inversion occurs in a half-tone image displayed with an eleven-step gradation in the front direction of the liquid crystal panel, similarly to the case of TABLE II. TABLE III indicates that there is no substantial effect caused in the viewing-angle characteristics of the liquid crystal display device 30 by the twist angle of the liquid crystal molecules. It should be noted that the result of TABLE III is for the case in which the retardation films 33A and 33B are omitted and the phase compensation of the optical beam is achieved only by the retardation R' of 88 nm, which is caused by the TAC films covering the polarizers 34A and 34B.

Third Embodiment

FIG. 54 shows a construction of a liquid crystal display device 40 according to a third embodiment of the present invention, wherein those parts described previously are designated by the same reference numerals and the description thereof will be omitted.

Referring to FIG. 54, the liquid crystal display device 40 has a construction similar to that of the liquid crystal display device 30 of FIG. 48, except that the retardation film 33B of FIG. 48 having a negative retardation is replaced by a first retardation film $(33B)_1$ having a positive retardation and a second retardation film $(33B)_2$ having a negative retardation, wherein the first retardation film $(33B)_1$ of the positive retardation is disposed closer to the liquid crystal panel 31 with respect to the second retardation film $(33B)_2$ of the negative retardation. Thereby, it should be noted that the second retardation film $(33B)_2$ has an optical axis extending perpendicularly to the principal surface of the liquid crystal panel 31, while the first retardation film $(33B)_1$ has an optical axis parallel to the principal surface of the liquid crystal panel 31.

Figure 55:
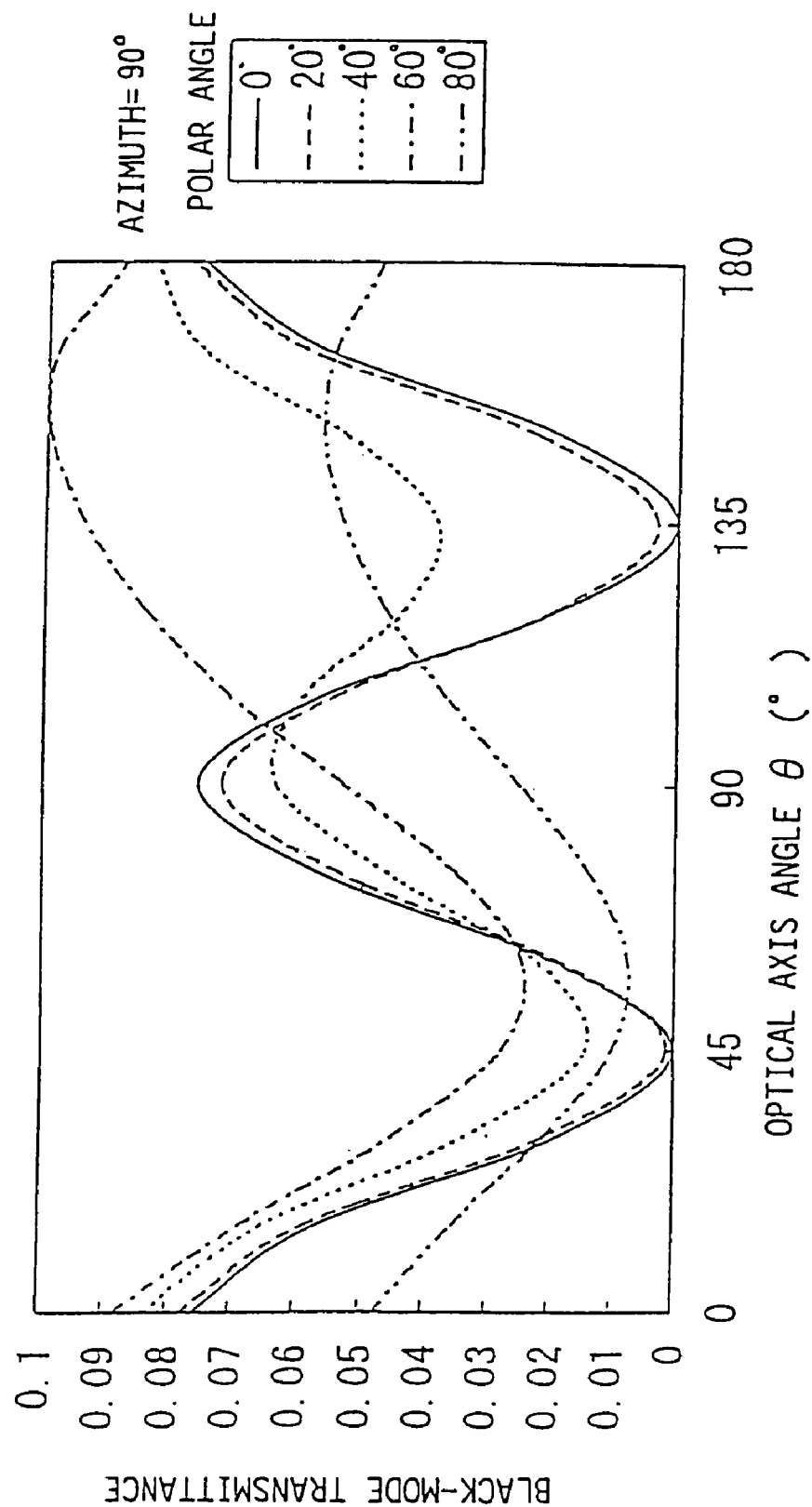
FIG. 55 is a diagram showing a black-mode transmittance of the liquid crystal display device of FIG. 54.

FIG. 55 shows a black-mode transmittance representing the transmittance of the liquid crystal display device 40 of FIG. 54 for the non-activated state thereof in which no drive voltage is applied to the liquid crystal cell, wherein FIG. 55 shows the black-mode transmittance as viewed in the direction where the azimuth angle is 90° for the case in which the thickness d of the liquid crystal layer 32 is set to 3.5 µm and the twist angle is set to 45°. In the example of FIG. 55, the negative retardation of the retardation film $(33B)_2$ is set generally equal to the retardation Δn·d of the liquid crystal panel 31 and the positive retardation of the retardation film $(33B)_1$ is fixed at 100 nm. Thereby, FIG. 55 shows the change of the black-mode transmittance as a function of the optical-axis angle θ, wherein the optical-axis angle θ indicates the angle that the optical axis of the retardation film $(33B)_1$ forms with respect to the center of twist of the liquid crystal molecules as indicated in FIG. 54.

Referring to FIG. 55, it should be noted that the black-mode transmittance becomes minimum for all of the polar angles when the optical-axis angle θ is set to about 45°. In other words, it is possible to improve the viewing-angle characteristics for all of the polar angles by setting the optical-axis angle θ to be about 45°. Further, the contrast ratio CR is maximized as a result of minimization of the black-mode transmittance.

In FIG. 55, it should be noted further that a minimum of the black-mode transmittance is achieved also for the polar angle of 0° or 20° when the optical-axis angle e is set to about 135°. However, this state is not a true optimum, as the black-mode transmittance is not minimized for the polar angles of 40° or more in this state.

Figure 56:
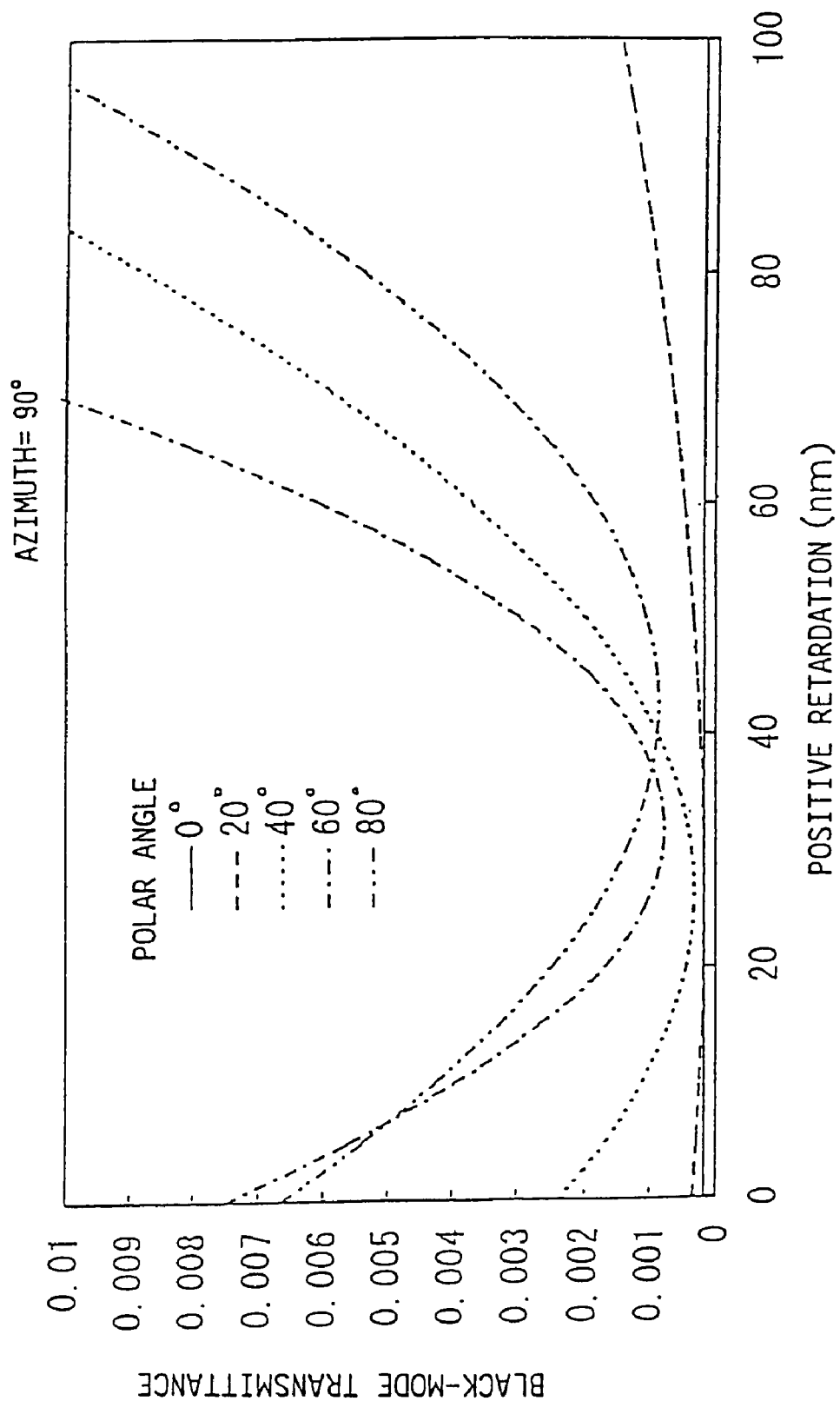
FIG. 56 is another diagram showing a black-mode transmittance of the liquid crystal display device of FIG. 54.

FIG. 56 is a diagram showing the black-mode transmittance of the liquid crystal display device 40 of FIG. 54 for various polar angles as a function of the positive retardation R of the retardation film $(33B)_1$. In FIG. 56, as well, the azimuth angle is set to 90°.

Referring to FIG. 56, it should be noted that the black-mode transmittance is minimized for all of the polar angles by setting the retardation R of the retardation film $(33B)_1$ to fall in a range between 20 nm and 60 nm. By optimizing the retardation R of the retardation film $(33B)_1$ as such, the black-mode transmittance can be reduced to 0.002 or less.

Figure 57:
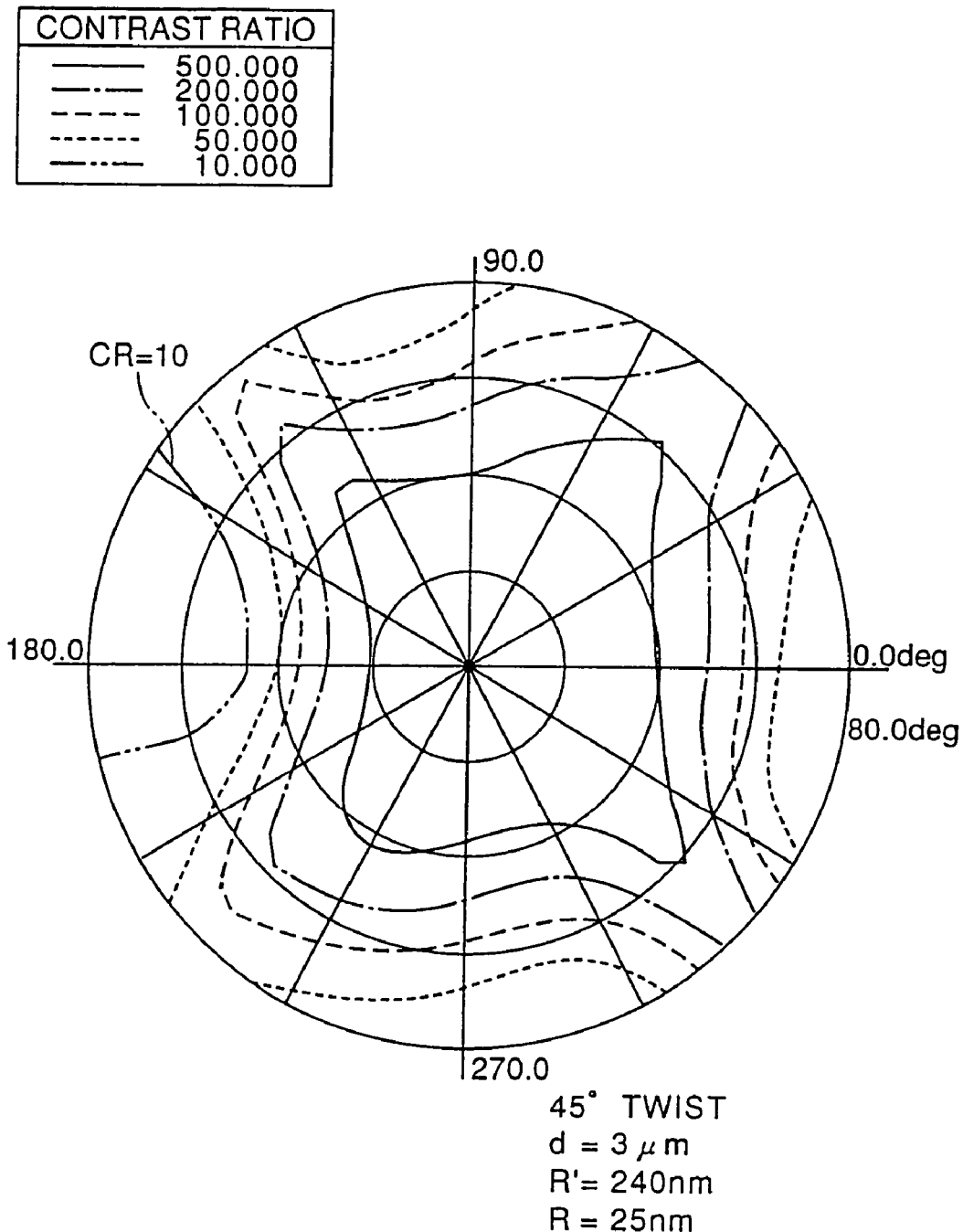
FIG. 57 is a diagram showing the viewing-angle characteristics of the liquid crystal display device of FIG. 54.

FIG. 57 shows the viewing-angle characteristics of the liquid crystal display device 40 of FIG. 54 for a case in which the retardation R of the positive retardation film $(33B)_1$ is set to 25 nm and the retardation R' of the negative retardation film $(33B)_2$ is set to 240 nm. Further, the twist angle of the liquid crystal molecules is set to 45° and the thickness of the liquid crystal layer 32 is set to 3µ.

As will be understood from FIG. 57, a very wide viewing-angle is obtained for the liquid crystal display device 40 by combining the positive and negative retardation films.

Figure 58:
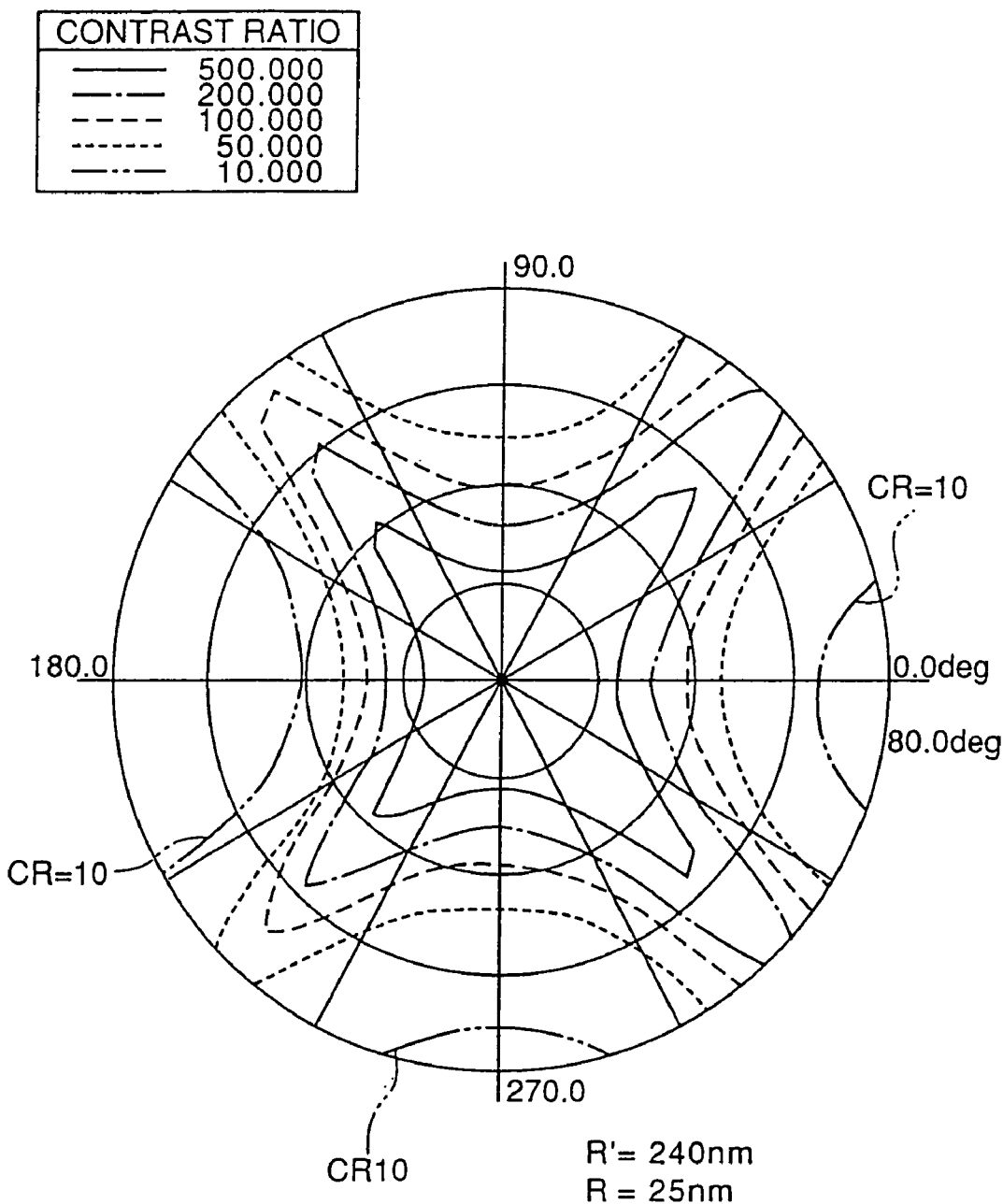
FIG. 58 is a diagram showing the viewing-angle characteristics of the liquid crystal display device of FIG. 54 for a case in which the order of positive and negative retardation films in the construction of FIG. 54 is reversed.

When the same positive and negative retardation films are disposed with a reversed order, on the other hand, it was discovered that the viewing-angle characteristics of the liquid crystal display device 40 is deteriorated substantially as indicated in FIG. 58. The result of FIG. 58 indicates that the order of the positive and negative retardation films is essential for improving the view angle characteristics of the liquid crystal display device.

Figure 59:
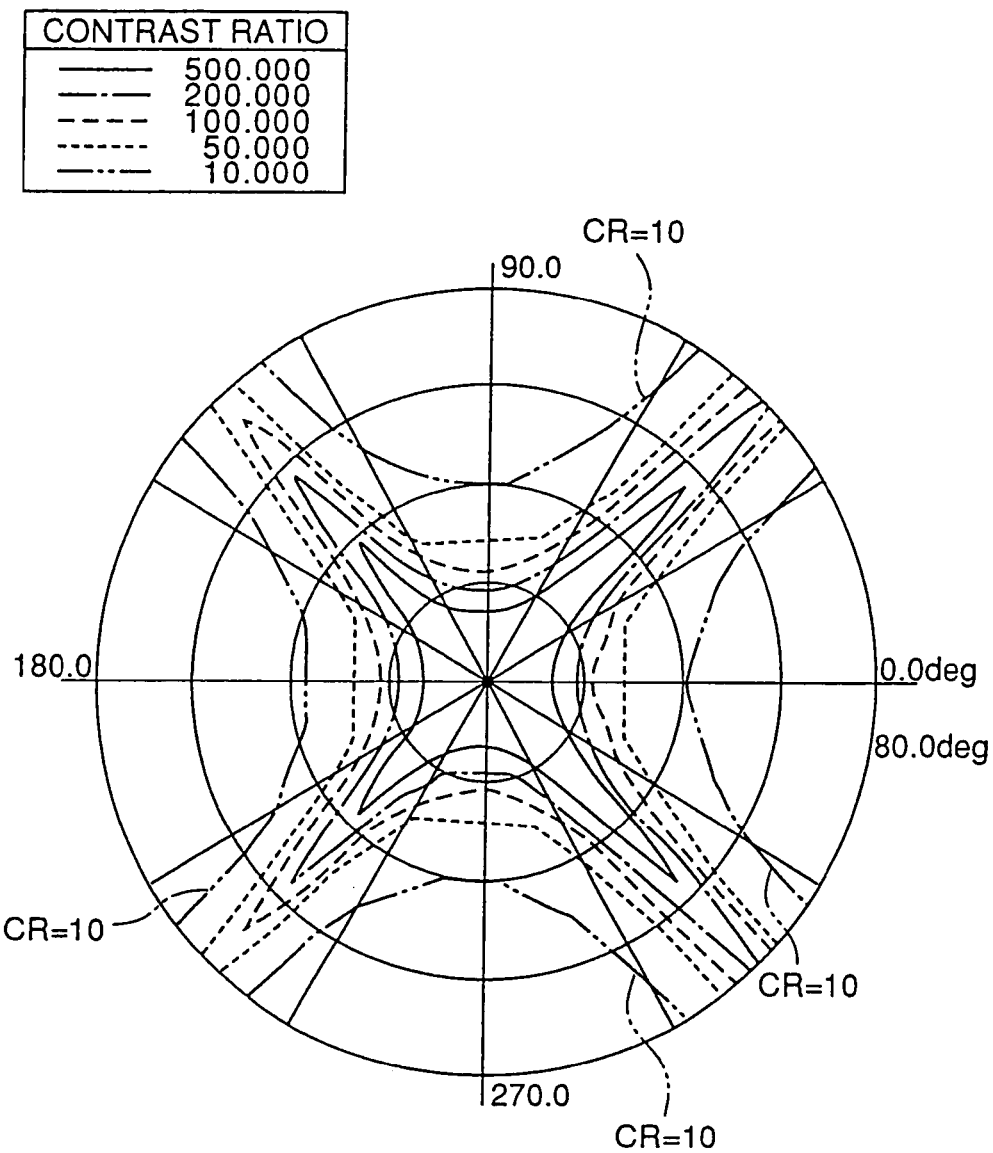
FIG. 59 is a diagram showing the viewing-angle characteristics of the liquid crystal display device of FIG. 54 in which the retardation compensation film is omitted.

FIG. 59 shows the viewing-angle characteristics of the liquid crystal display device 40 of FIG. 54 for the case in which the retardation films are omitted. As can be seen clearly in FIG. 59, the viewing-angle in narrowed substantially when the retardation films are eliminated.

Fourth Embodiment

Figure 60:
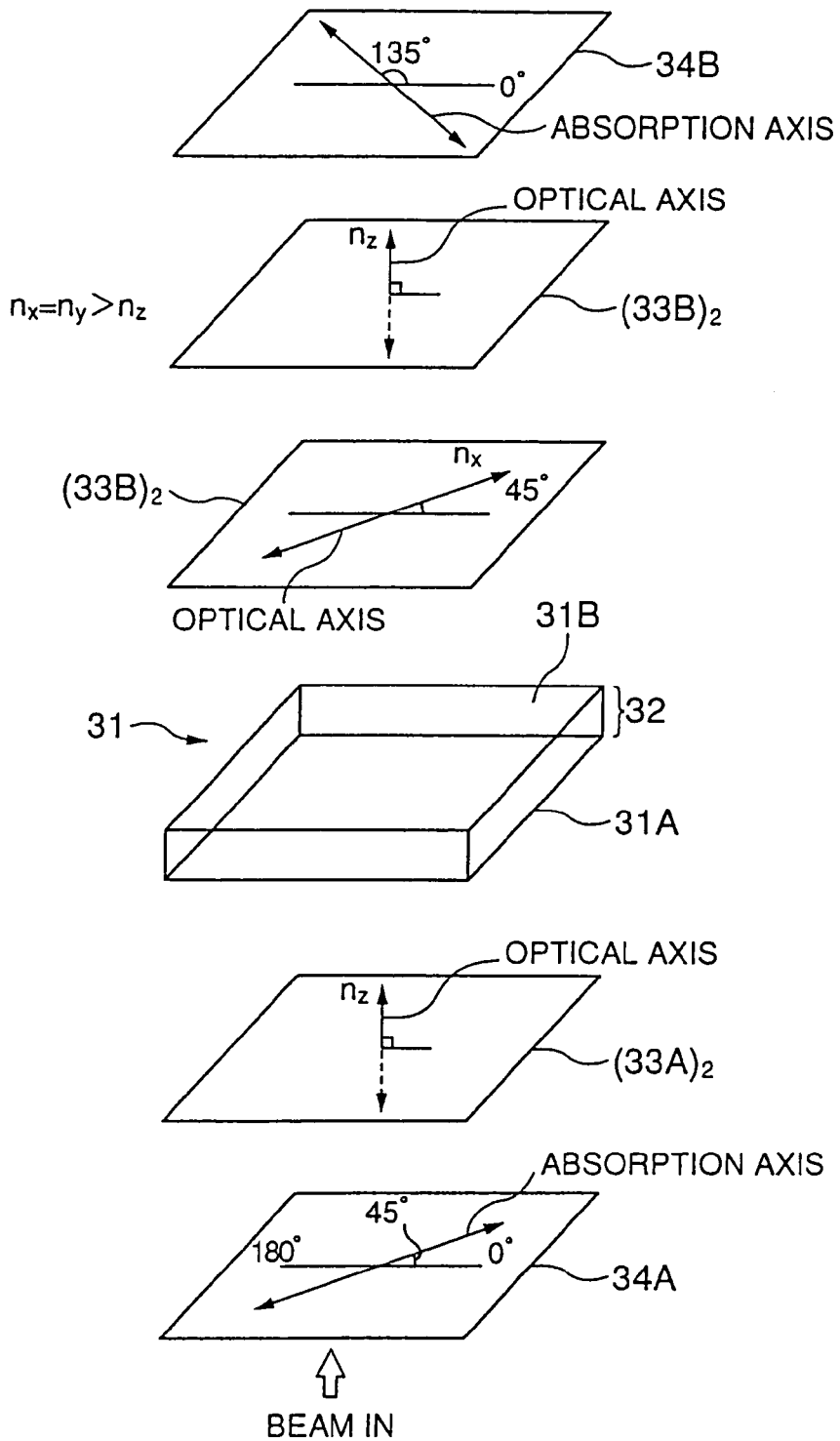
FIG. 60 is a diagram showing the construction of a liquid crystal display device according to a fourth embodiment of the present invention.

FIG. 60 shows a construction of a liquid crystal display device 50 of the fourth embodiment, wherein those parts described previously are designated by the corresponding reference numerals and the description thereof will be omitted.

Referring to FIG. 60, it should be noted that the liquid crystal display device 50 has a construction similar to that of the liquid crystal display device 40 of FIG. 54, except that a retardation film $(33A)_2$ having a negative retardation is provided further in the gap formed between the lower polarizer 34A and the liquid crystal panel 31.

Figure 61:
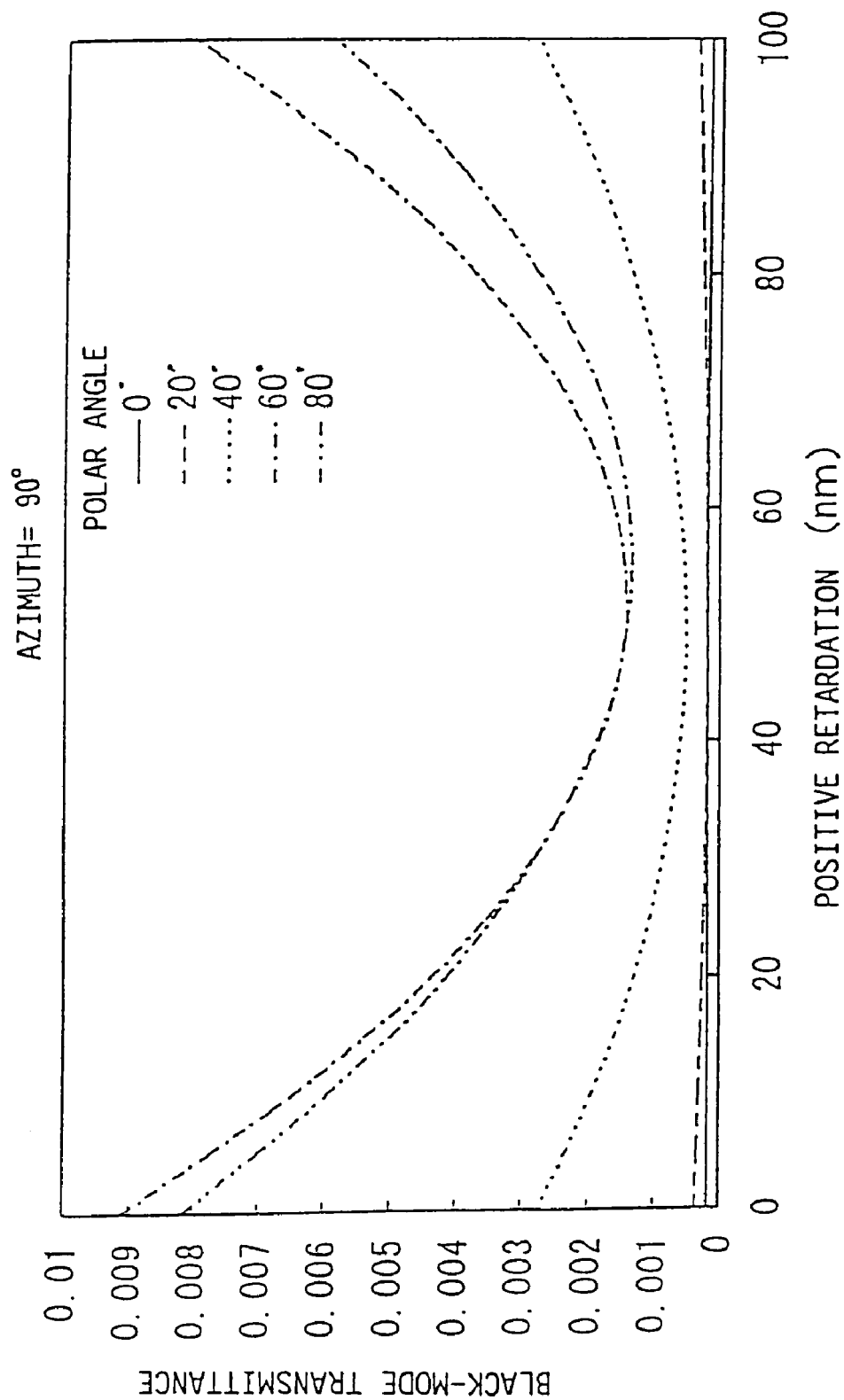
FIG. 61 is another diagram showing a black-mode transmittance of the liquid crystal display device of FIG. 60.

FIG. 61 shows the black-mode transmittance of the liquid crystal display device 40 as a function of the retardation of the retardation film $(33B)_1$ for a case in which the total retardation of the foregoing negative retardation film and the retardation film $(33B)_1$ is set to be generally equal to the retardation of the liquid crystal panel 31.

As will be understood from FIG. 61, the black-mode transmittance becomes minimum when the retardation of the retardation film $(33B)_1$ is in the range of 50–60 nm. Thus, in order that the retardation film $(33B)_1$ is most effective for increasing the contrast ratio, it is necessary to set the retardation of the retardation film $(33B)_1$ to be below about 100 nm.

Figure 62:
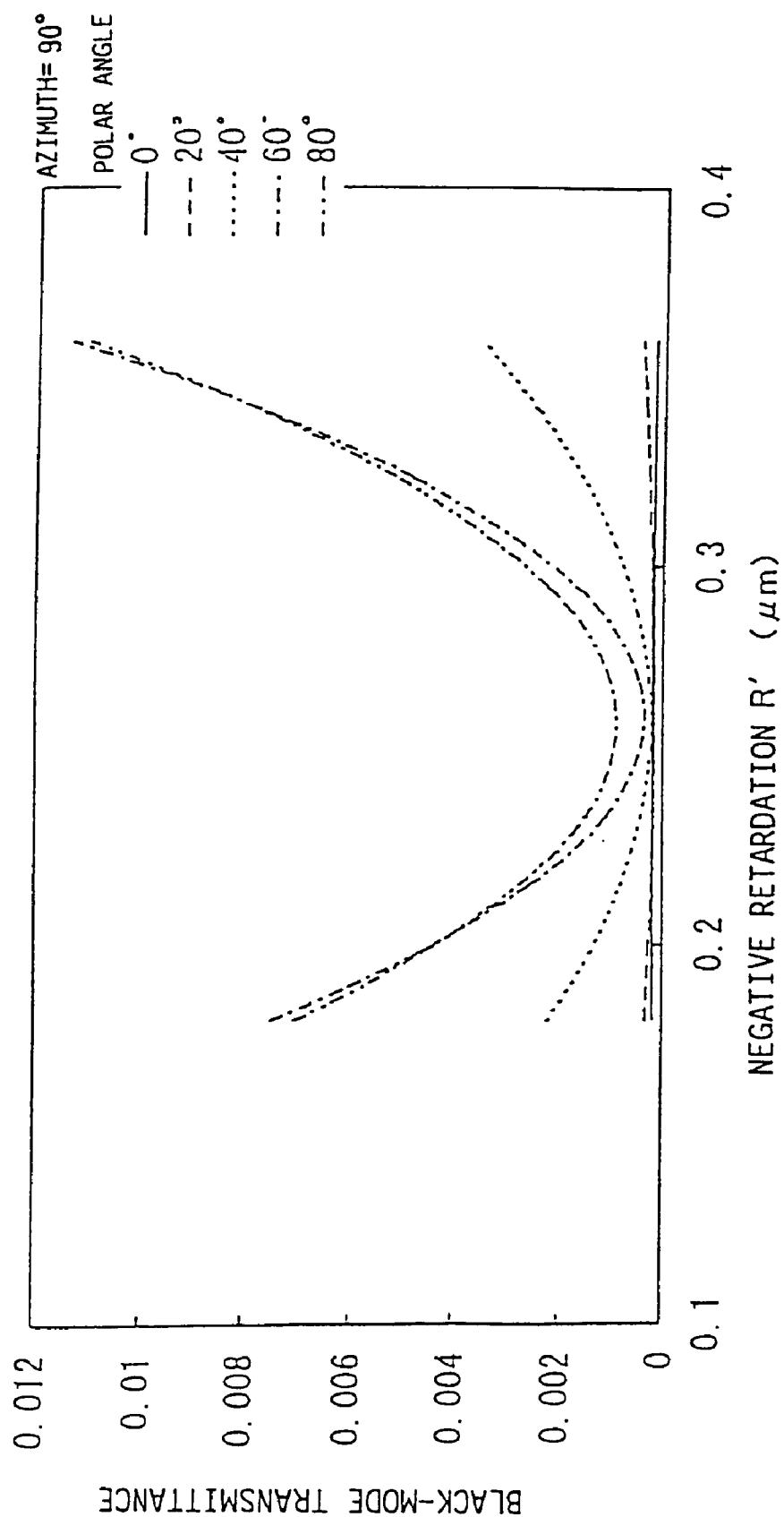
FIG. 62 is a further diagram showing a black-mode transmittance of the liquid crystal display device of FIG. 60.

FIG. 62 shows the black-mode transmittance of the liquid crystal display device 50 of FIG. 60 for a case in which the retardation of the retardation film $(33B)_1$ is set to 30 nm and the retardation R' of the negative retardation films $(33B)_2$ and $(33A)_2$ is changed variously. Similarly as before, the evaluation is made in the direction in which the azimuth angle is 90°, while changing the polar angle variously.

As will be understood from FIG. 62, the minimum of the black-mode transmittance is obtained when the negative retardation R' formed by the retardation film $(33B)_2$ is about 250 nm, while this optimum value is slightly smaller than the retardation Δn·d of the liquid crystal layer 32. As explained previously, the optimum retardation of the retardation film $(33B)_1$ is equal to the retardation $\Delta n \cdot d$ of the liquid crystal layer 32 when the positive retardation film $(33B)_1$ is not provided. Thus, when the positive retardation film $(33B)_1$ is used in addition to the negative retardation films $(33B)_2$ and $(33A)_2$, the optimum value of retardation of the negative retardation film $(33B)_2$ should be set slightly smaller than the retardation $\Delta n \cdot d$ of the liquid crystal layer 32. In any case, it is necessary to set the total retardation R' of the negative retardation film to be smaller than twice the retardation $\Delta n \cdot d$ of the liquid crystal layer 32 when the retardation film $(32B)_2$ alone is used or when another negative retardation film is used.

Figure 63:
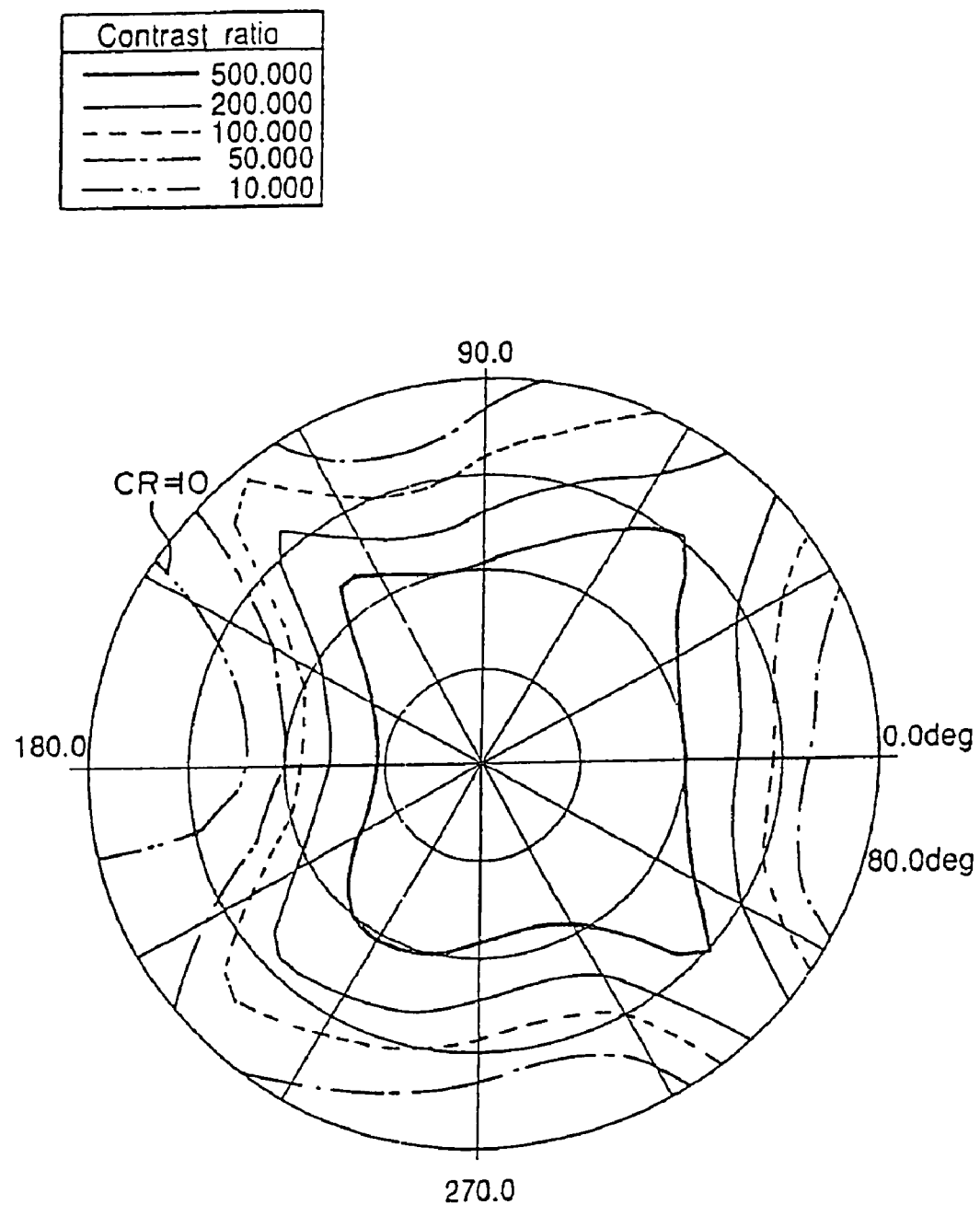
FIG. 63 is a diagram showing viewing-angle characteristics of the liquid crystal display device of FIG. 60.

FIG. 63 shows the viewing-angle characteristics of the liquid crystal display device 50 of FIG. 60.

Figure 19:
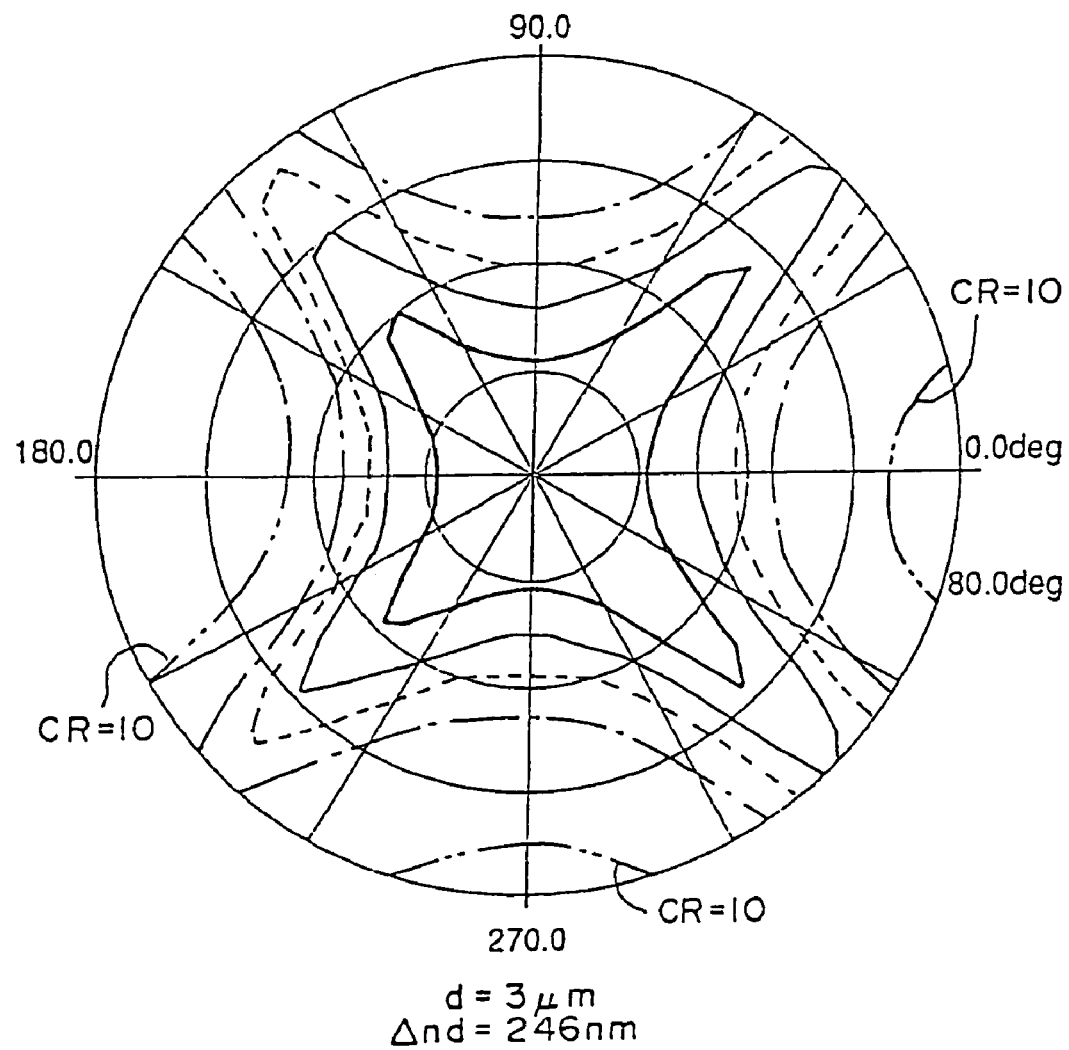
Figure 20:
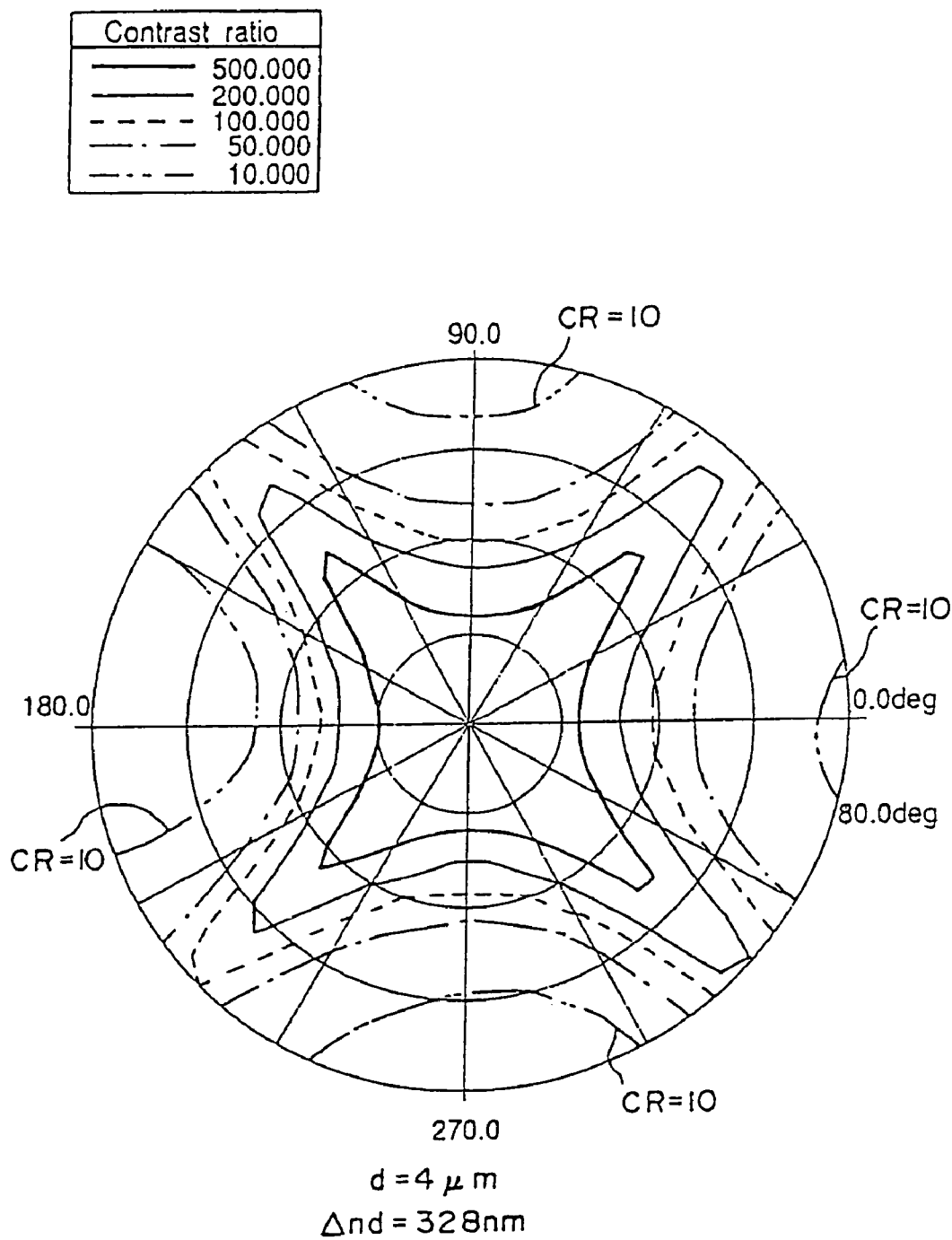
Figure 21:
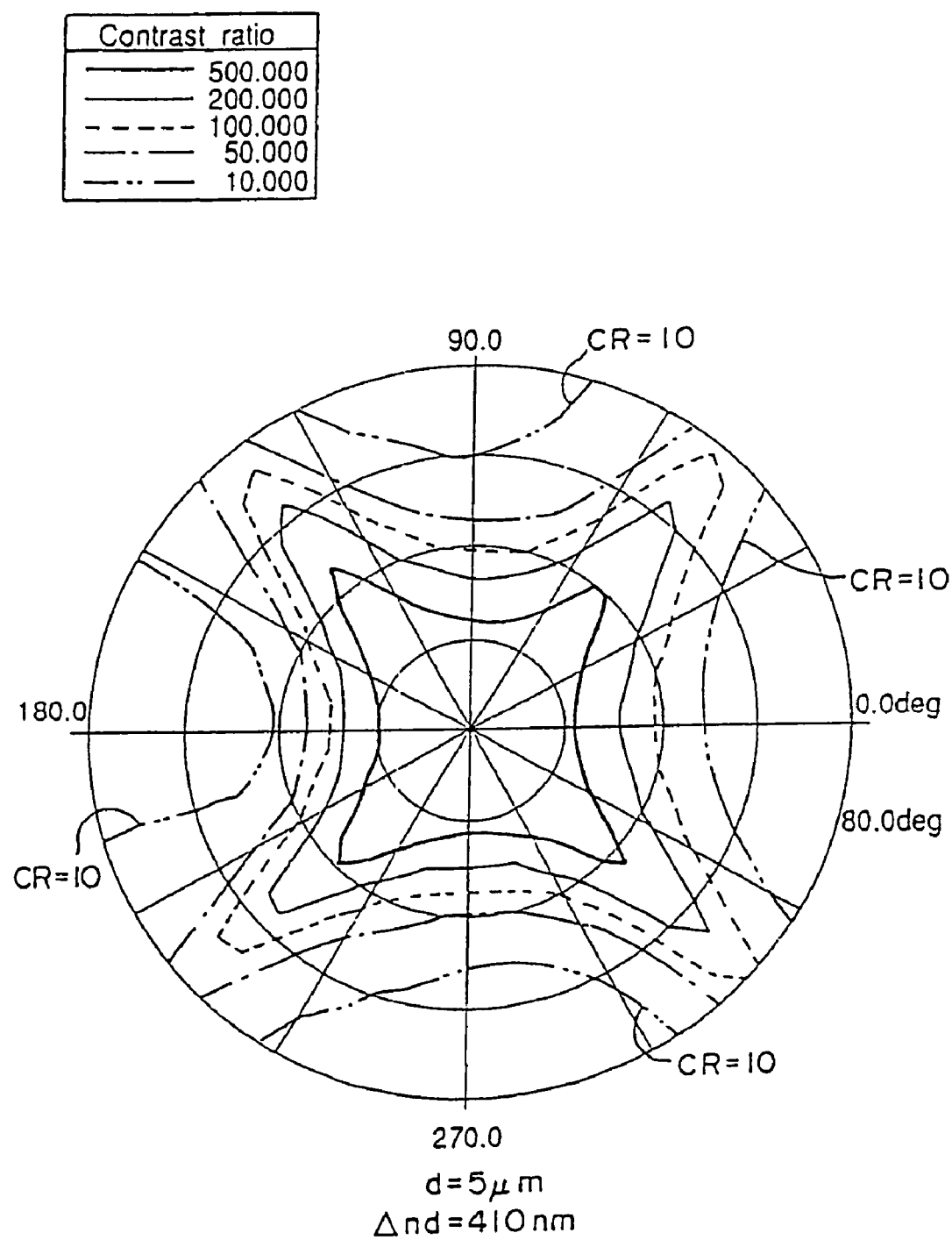
Figure 22:
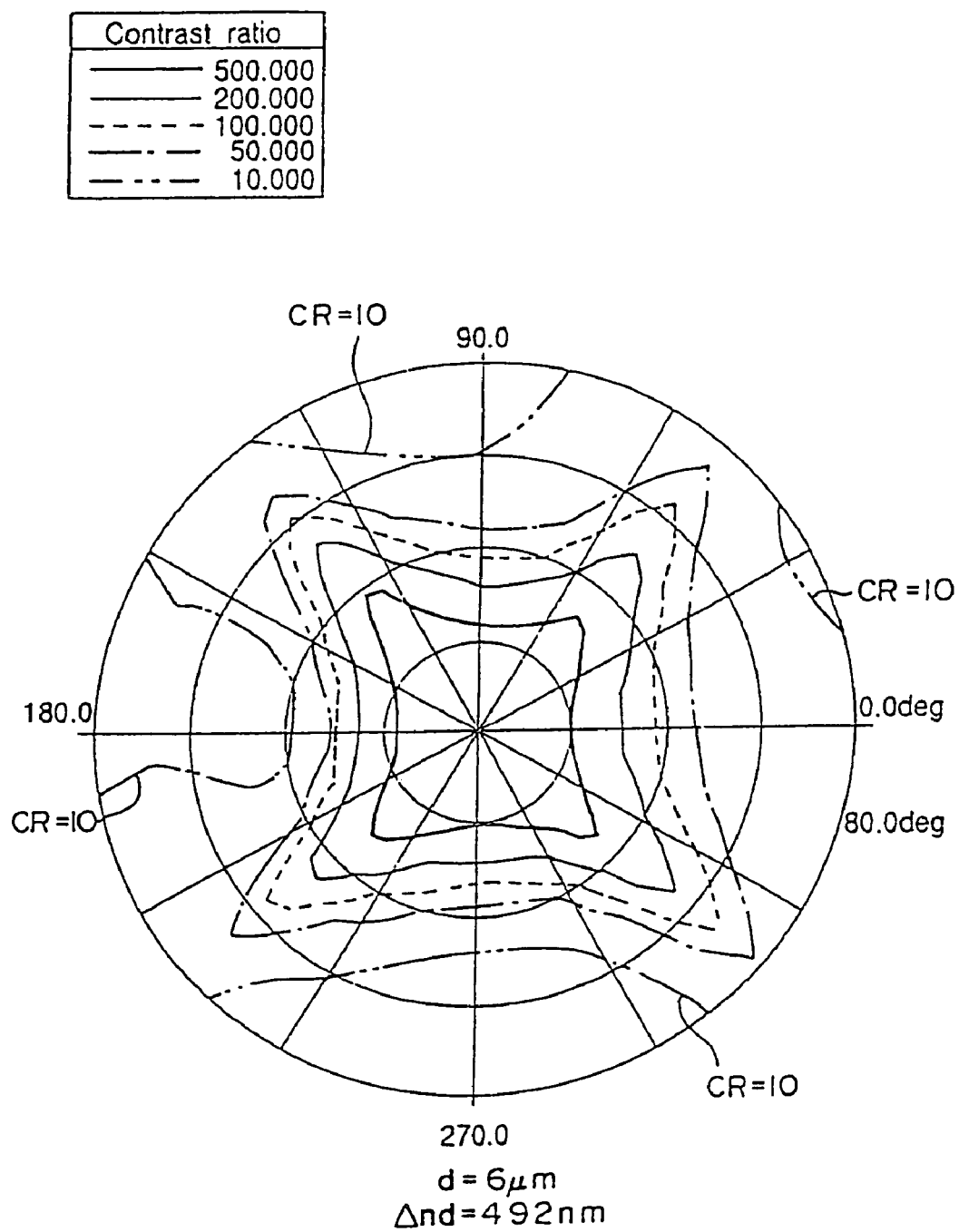
Figure 23:
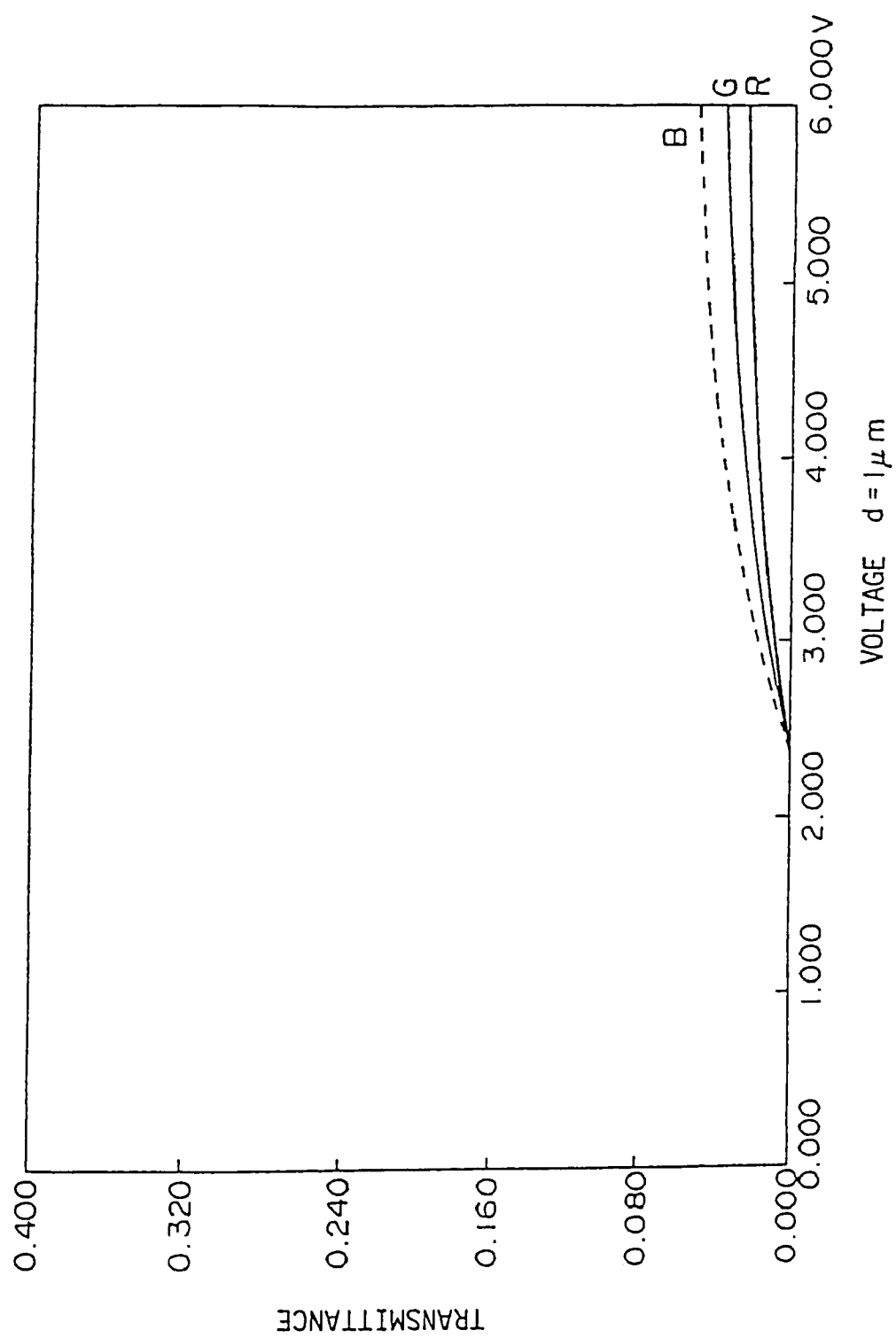
FIGS. 23–28 are diagrams showing a transmittance of the liquid crystal display device of FIG. 6A for various thicknesses of the liquid crystal layer in the liquid crystal panel.
Figure 24:
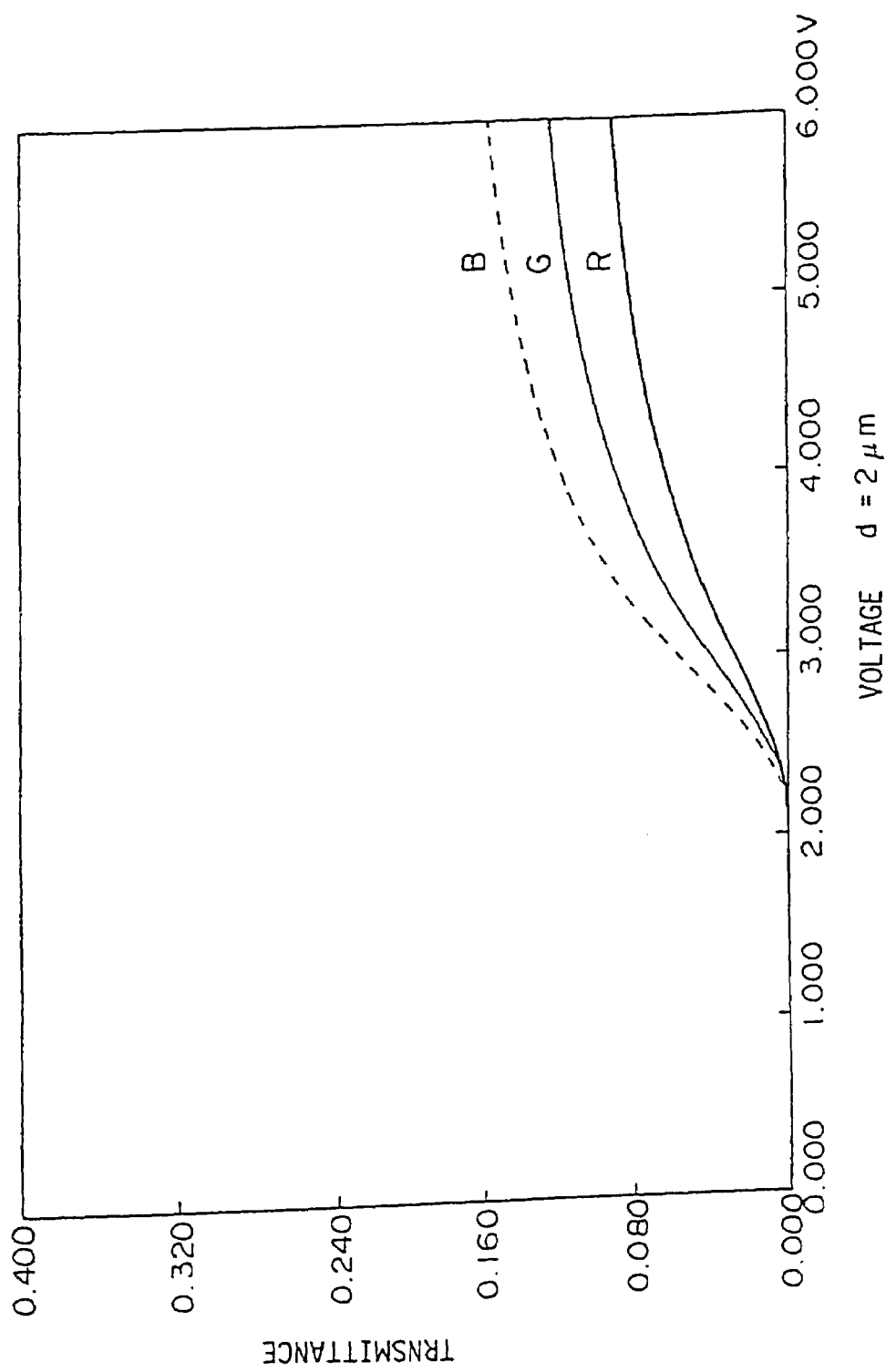
Figure 25:
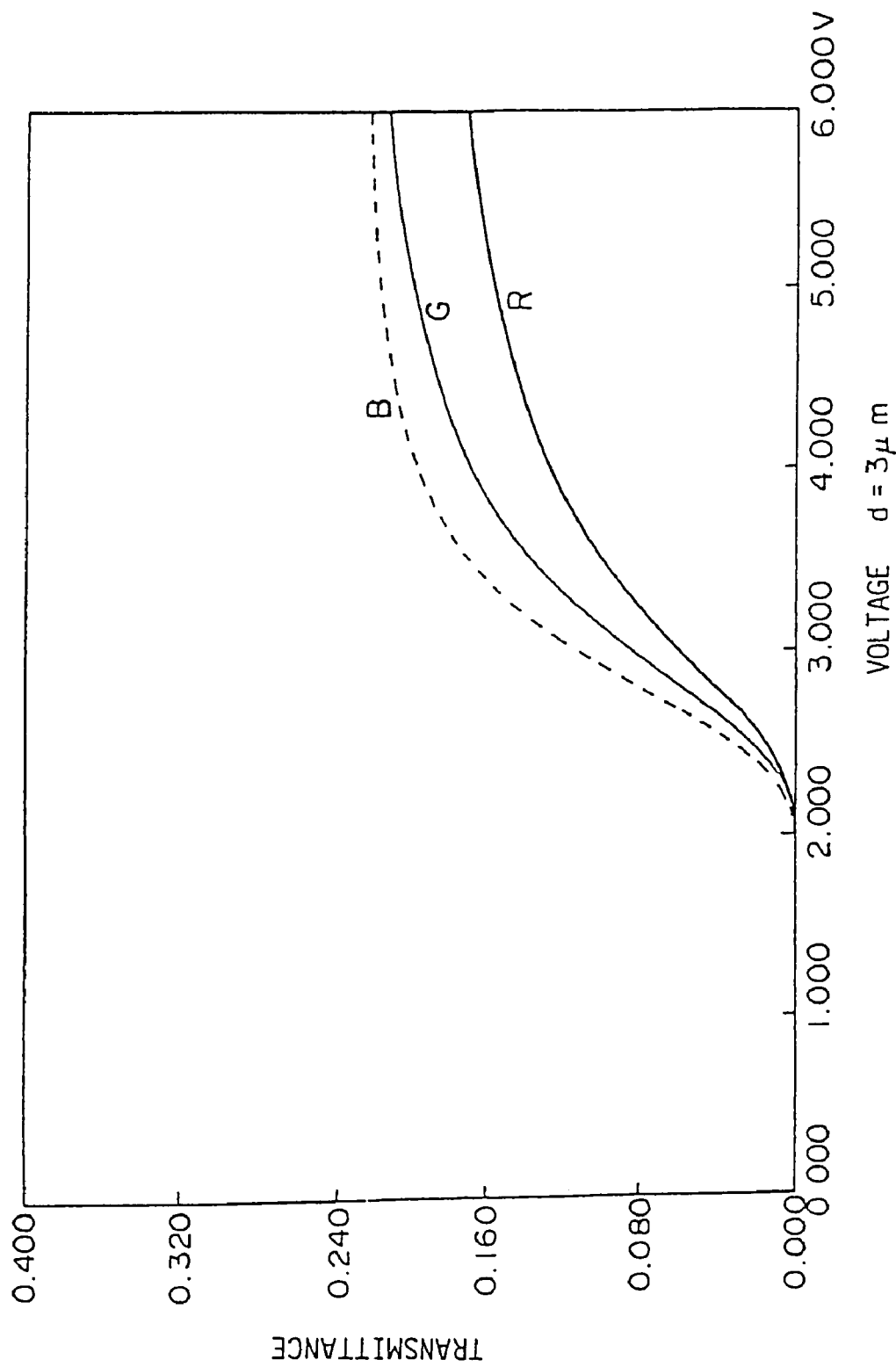
Figure 26:
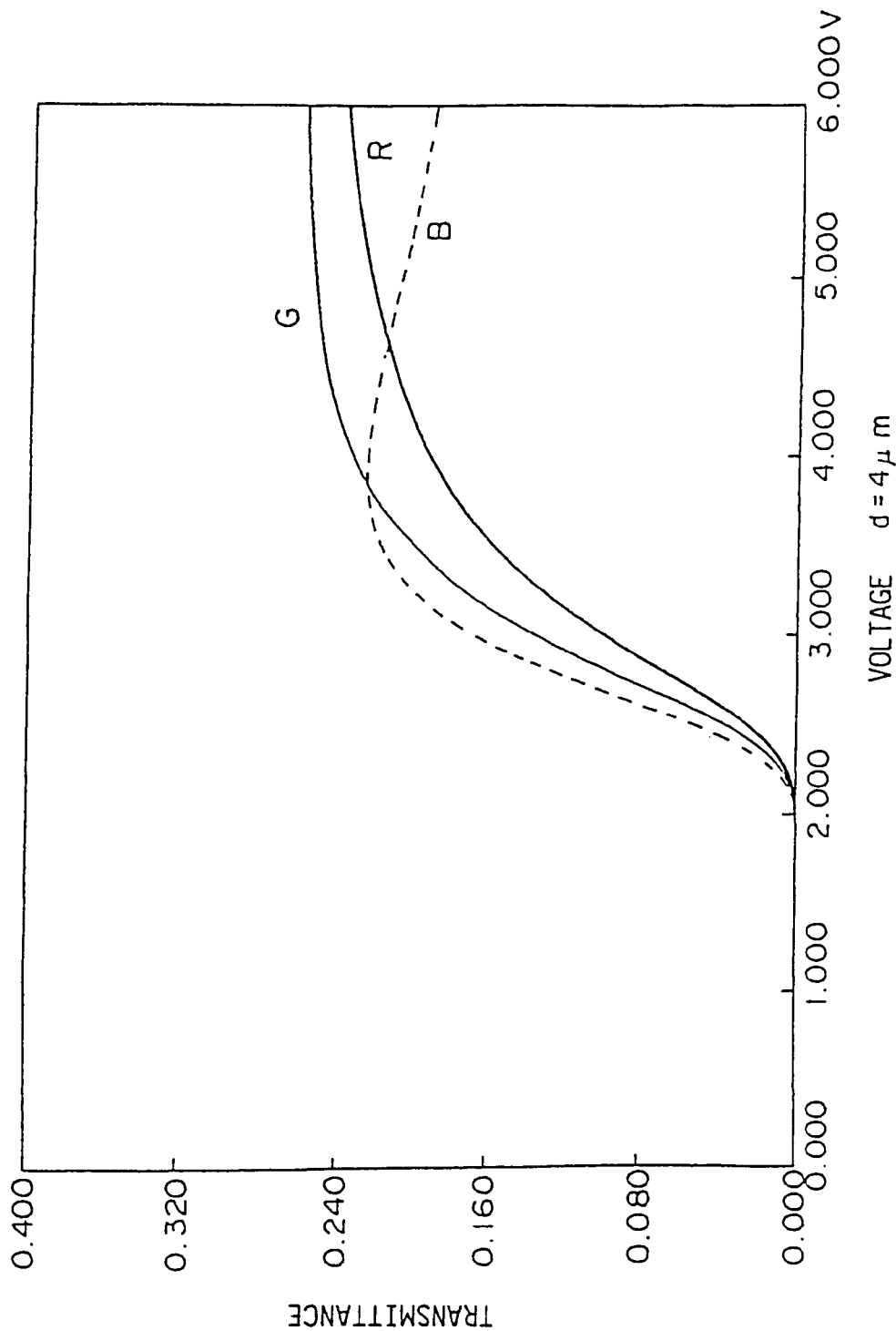
Figure 27:
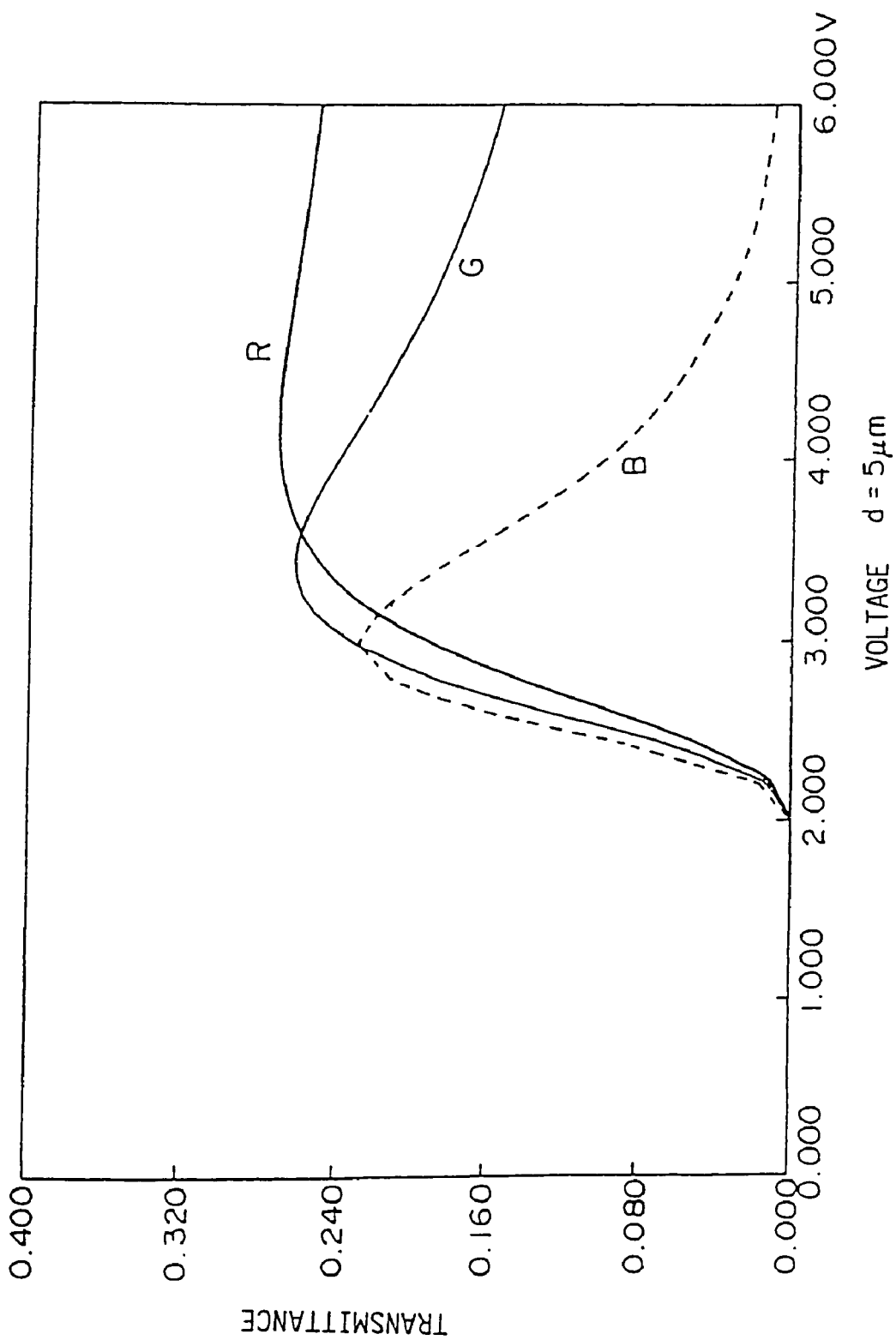

In FIG. 63, it should be noted that the area in which the contrast ratio exceeds 10 is increased as compared with the result of FIG. 19 in which only the negative retardation film is used.

Fifth Embodiment

Figure 64:
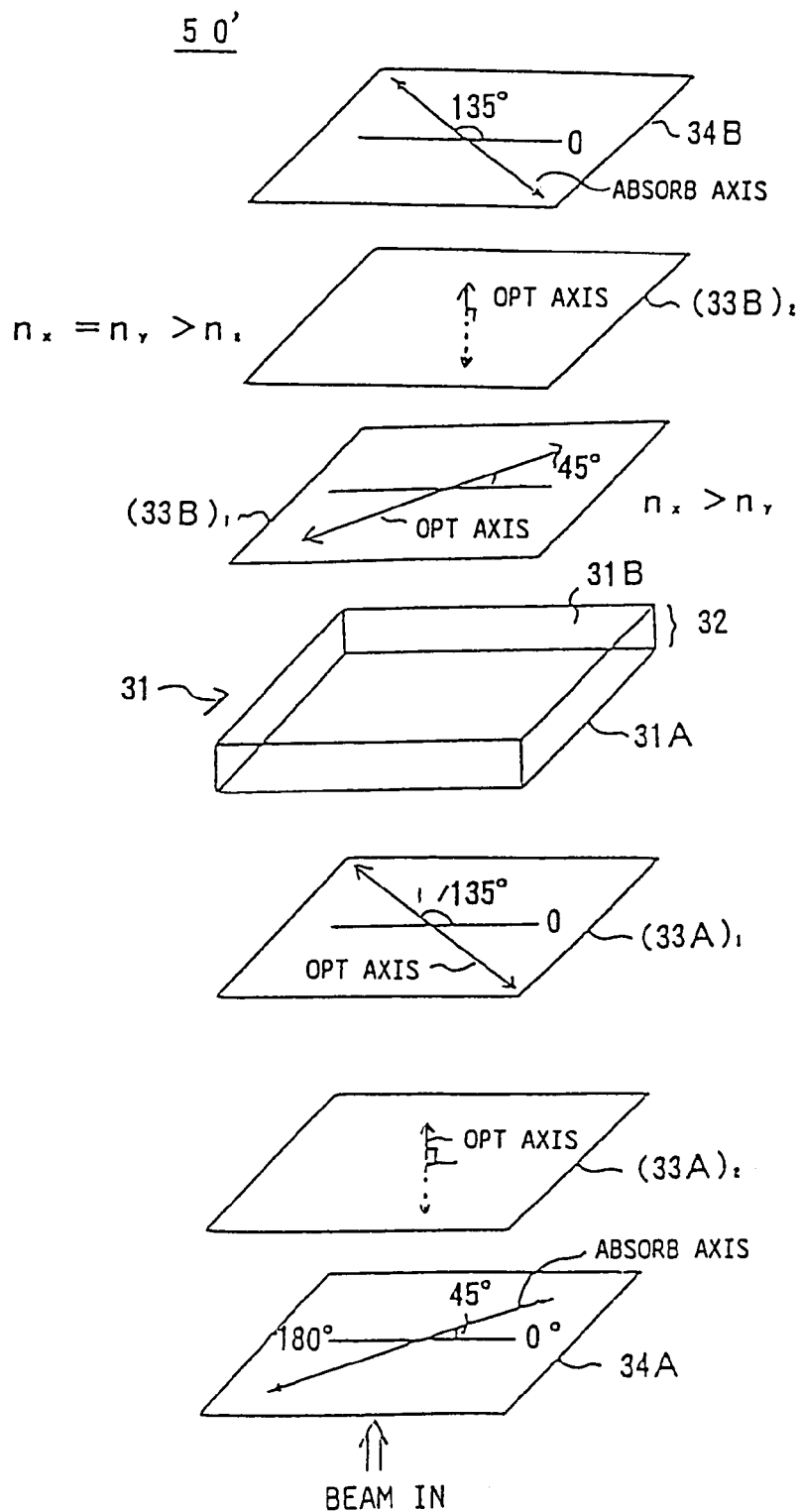
FIG. 64 is a diagram showing the construction of a liquid crystal display device according to a fifth embodiment of the present invention.

FIG. 64 shows the construction of a liquid crystal display device 50' according to a fifth embodiment of the present invention, wherein those parts corresponding to the parts described previously are designated by the same reference numerals and the description thereof will be omitted.

Figure 65:
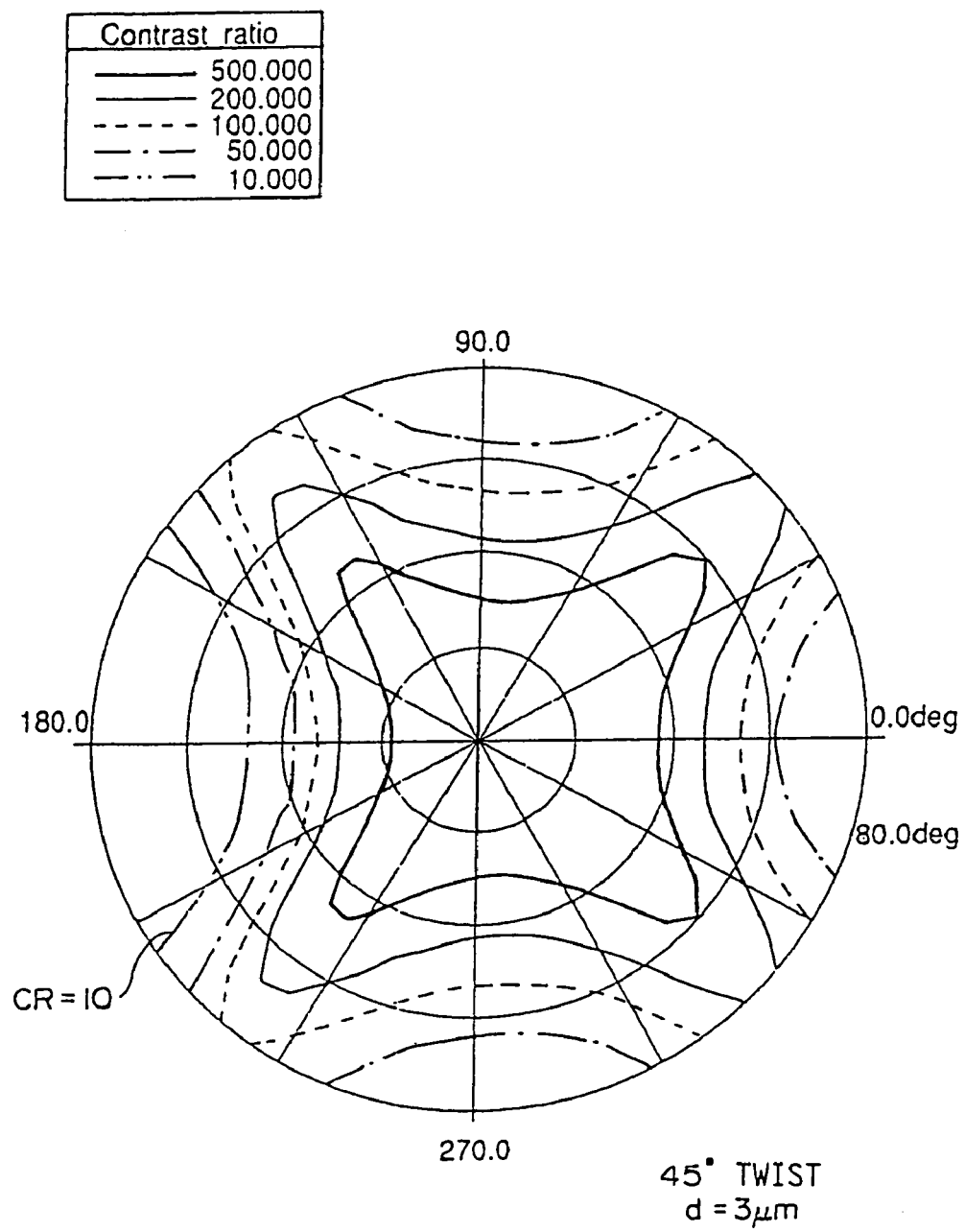
FIG. 65 is a diagram showing viewing-angle characteristics of the liquid crystal display device of FIG. 64.

Referring to FIG. 64, it will be noted that the liquid crystal display device 50' includes a positive retardation film $(33A)_1$ between the liquid crystal panel 31 and the negative retardation film $(33A)_1$ and provides an excellent viewing-angle characteristics as represented in FIG. 65.

Sixth Embodiment

Figure 66:
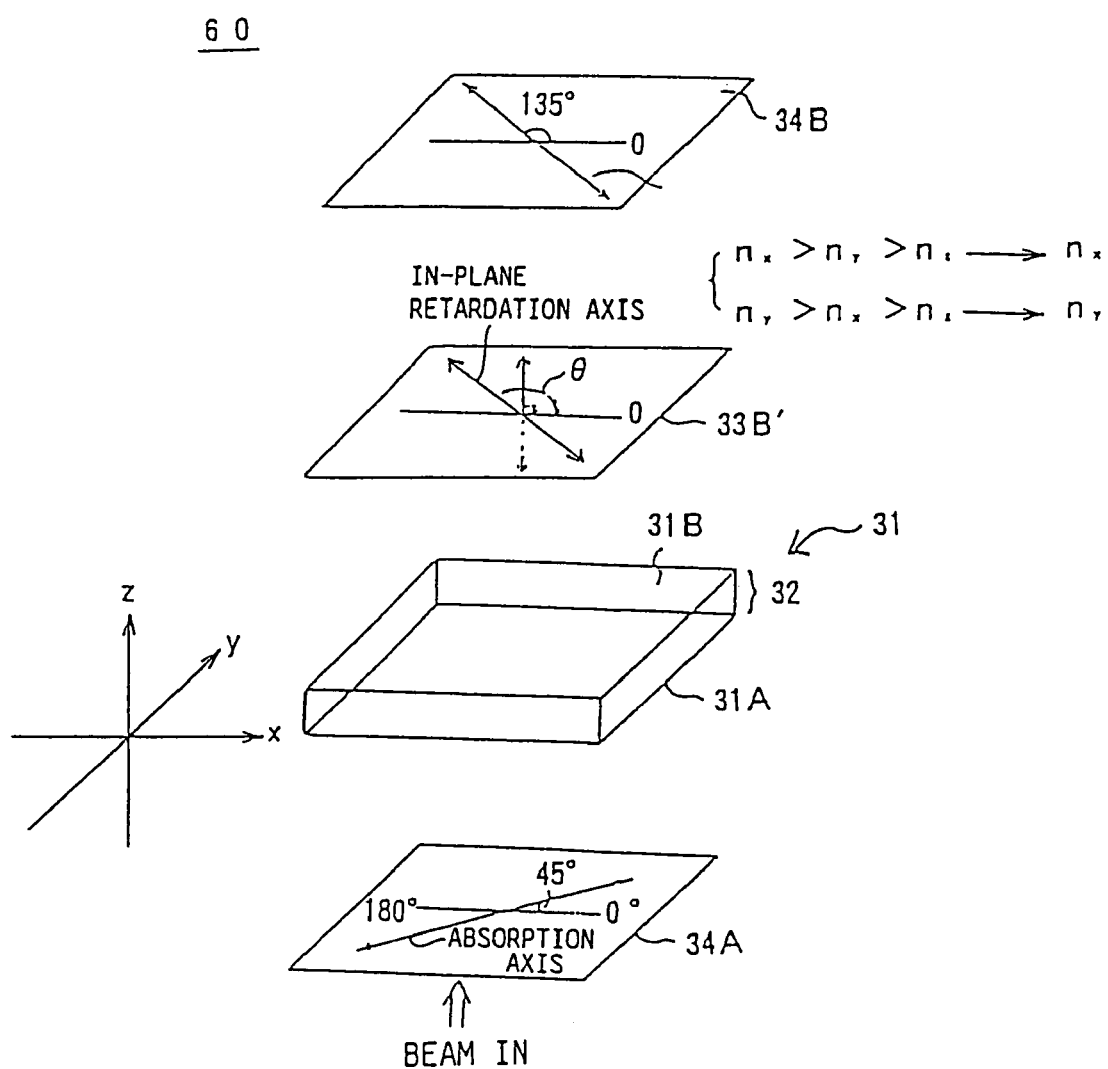
FIG. 66 is a diagram showing a construction of the liquid crystal display device according to a sixth embodiment of the present invention.

FIG. 66 shows a construction a liquid crystal display device 60 according to a fifth embodiment of the present invention, wherein those parts described previously are designated by the same reference numerals and the description thereof will be omitted.

Referring to FIG. 66, the liquid crystal display device 60 has a construction similar to that of the liquid crystal display device 50 OR 50' explained previously, except that the positive retardation film $(33B)_1$ and the negative retardation film $(33B)_2$ are replaced by a single biaxial retardation film 33B' in the liquid crystal display device 60 of the present embodiment.

The biaxial retardation film 33B' has refractive indices $n_x$, $n_y$ and $n_z$ respectively in the x-, y- and z-directions, wherein there holds a relationship $n_x > n_y > n_z$ or $n_y > n_x > n_z$. Such a biaxial retardation film itself is known for example from the Japanese Laid-open Patent Publication 59-189325.

It should be noted that the biaxial retardation film 33B' forms a retardation in the plane of the film 33B' with a magnitude represented by $|n_x - n_y| \cdot d$ and further a retardation in the normal direction or thickness direction of the film 33B' with a magnitude represented by $\{(n_x + n_y)/2 + n_z\} \cdot d$. In the present embodiment, an optimum result is obtained by setting the foregoing in-plane retardation to be 120 nm or less and the retardation in the thickness direction to be generally equal to the retardation $\Delta n \cdot d$ of the liquid crystal layer 32. In the example of FIG. 66, it should be noted that the retardation film 33B' is disposed such that an in-plane retardation axis is generally parallel to the absorption axis of the adjacent polarizer 34B, wherein the in-plane retardation axis represents the direction in which the retardation becomes maximum. In the case where the relationship $n_x > n_y > n_z$ holds, the in-plane retardation axis coincides with the x-axis, while in the case where the relationship $n_y > n_x > n_z$ holds, the in-plane retardation axis coincides with the y-axis.

Figure 67:
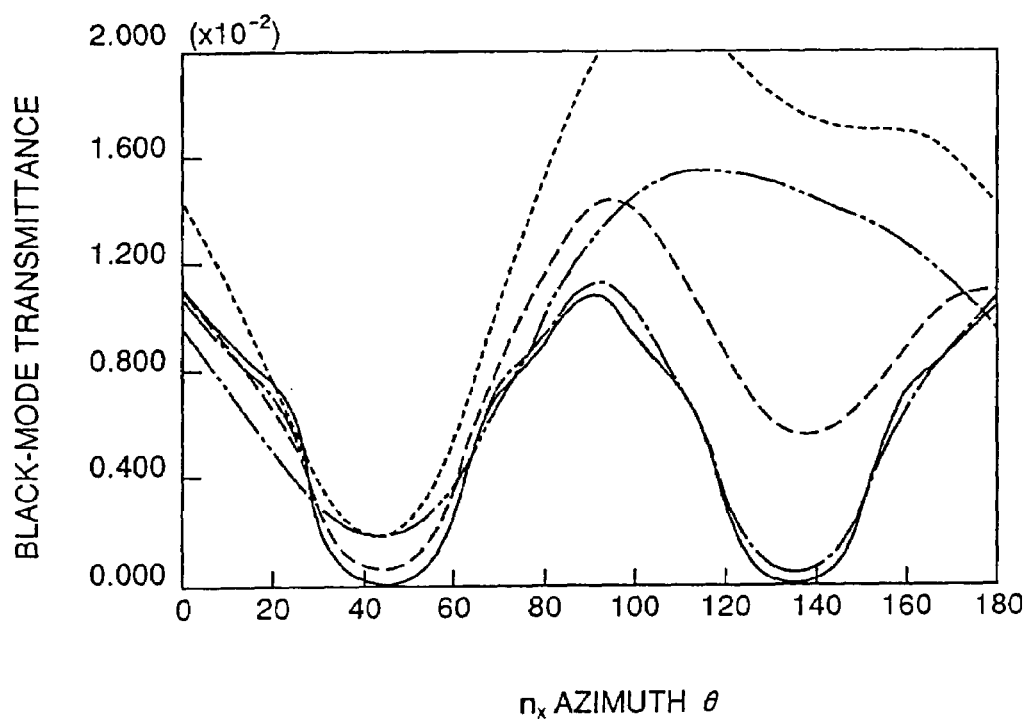
FIG. 67 is a diagram showing the black-mode transmittance of the liquid crystal display device of FIG. 66.

FIG. 67 shows the black-mode transmittance of the liquid crystal display device 60 of FIG. 66 for a case in which the azimuth angle of the in-plane retardation axis $n_x$ of the biaxial retardation film 33B' is changed variously.

As will be noted from FIG. 67, the black-mode transmittance can be minimized by disposing the biaxial retardation film 33B' with such an orientation that the azimuth angle $\theta$ of the in-plane retardation axis $n_x$ is about 45° or about 135°, in other words, the retardation axis $n_x$ extends perpendicularly or parallel to the absorption axis of the adjacent polarizer 34B. Particularly, it should be noted that the black-mode transmittance can be suppressed below about 0.2% or less for the polar angles between 80°–0°, by setting the foregoing azimuth angle $\theta$ to be about 45°.

Figure 68:
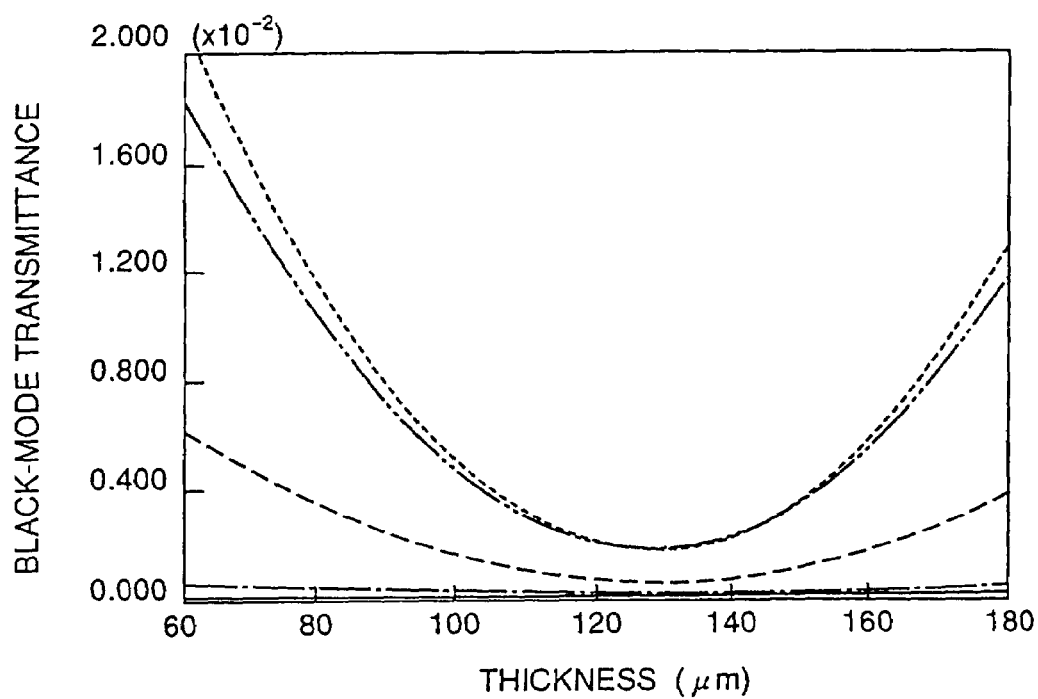
FIG. 68 is another diagram showing the black-mode transmittance of the liquid crystal display device of FIG. 66.

FIG. 68 shows the black-mode transmittance of the liquid crystal display device 60 of FIG. 66 for the case in which the thickness of the biaxial retardation film 33B' is changed.

As can be seen from FIG. 68, the black-mode transmittance becomes minimum when the thickness of the liquid crystal layer is set to about 130 μm, while it should be noted that the biaxial retardation film 33B' having the foregoing thickness of 130 μm forms a retardation R or R' of about 39 nm within the plane of the film 33B' and about 240 nm in the direction perpendicular to the film 33B'.

Generalizing the foregoing, it is concluded that the in-plane retardation R of the liquid crystal display device 60 of FIG. 66 is preferably set to be smaller than about 120 nm, more preferably in the range of 20–60 nm, and that the retardation R' in the thickness direction is set equal to or smaller than about twice the retardation $\Delta n \cdot d$ of the liquid crystal layer 32.

Figure 69:
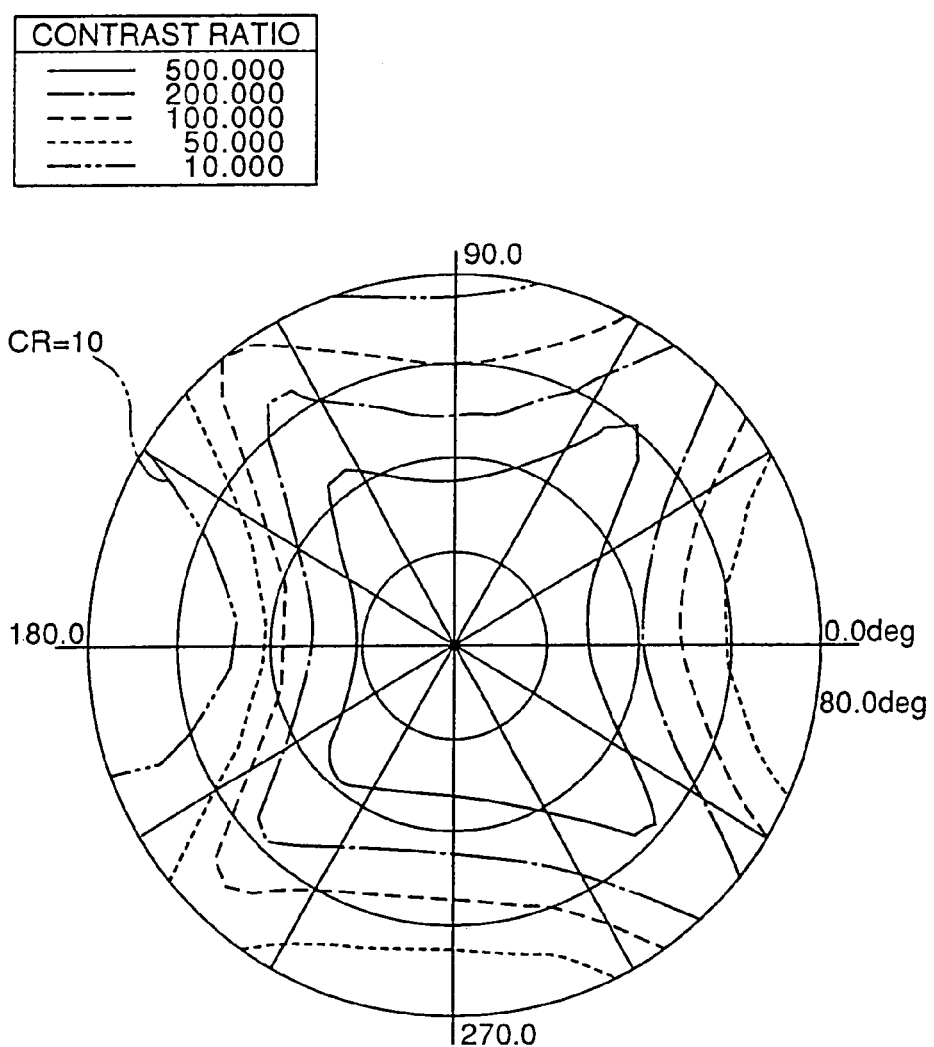
FIG. 69 is a diagram showing the viewing-angle characteristics of the liquid crystal display device of FIG. 66.

FIG. 69 shows the view angle characteristics of the liquid crystal display device 60 of FIG. 66, wherein it is set in FIG. 69 that $n_x = 1.502$, $n_y = 1.5017$, $n_z = 1.5$ and d=120 nm, wherein d represents the thickness of the liquid crystal layer 32. As can be seen from FIG. 69, the liquid crystal display device 60 exhibits an excellent view angle characteristic.

A biaxially tensioned polycarbonate film such as the VAC film supplied from Sumitomo Chemicals or a TAC film used for the protective film of polarizers may be used for the biaxial retardation film.

Seventh Embodiment

FIG. 70 shows the construction of a liquid crystal display device 70 according to a seventh embodiment of the present invention, wherein those parts corresponding to the parts described previously are designated by the same reference numerals and the description thereof will be omitted.

Referring to FIG. 70, the present embodiment uses, in addition to the retardation film 33B', another optically biaxial retardation film 33A' between the liquid crystal panel 31 and the polarizer 34A, wherein the retardation films 33B' and 33A' are disposed such that the retardation axis of the film 33B' intersects substantially perpendicularly to the absorption axis of the adjacent analyzer 34B and such that the retardation axis of the film 33A' intersects substantially perpendicularly to the absorption axis of the adjacent polarizer 34A.

Figure 71:
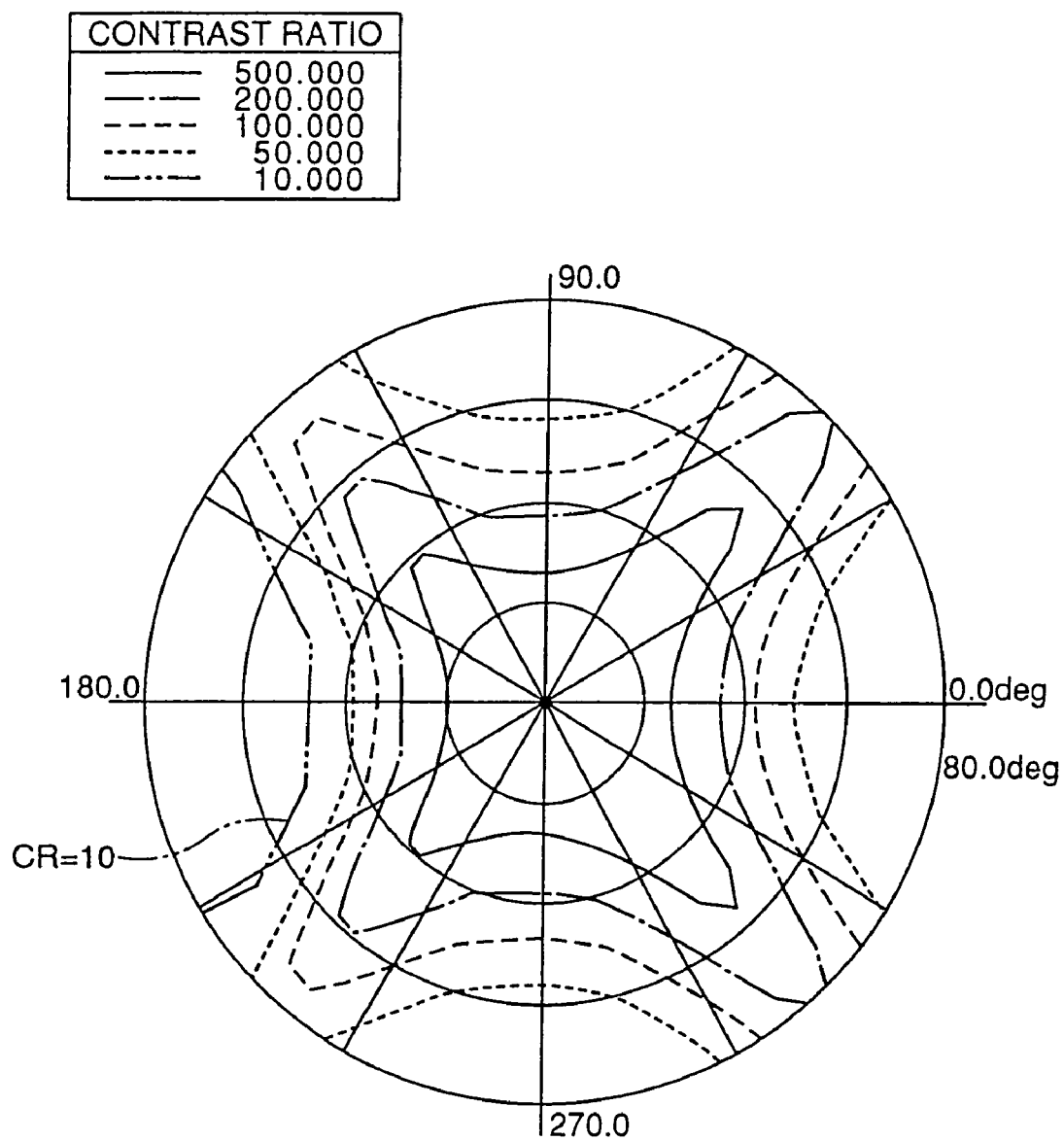
FIG. 71 is a diagram showing the viewing-angle characteristics of the liquid crystal display device of FIG. 70.

FIG. 71 shows the view angle characteristics of the liquid crystal display device 70. As can be seen from FIG. 71, the liquid crystal display device 70 shows an excellent viewing-angle characteristic.

Eighth Embodiment

FIG. 72 shows the construction of a liquid crystal display device 80 according to an eighth embodiment of the present invention, wherein those parts corresponding to the parts described previously are designated by the same reference numerals and the description thereof will be omitted.

Referring to FIG. 72, it will be noted that the liquid crystal display device 80 of the present embodiment has a construction similar to that of the liquid crystal display device 40 of FIG. 54 except that the retardation film $(33B)_2$ is omitted.

Figure 73:
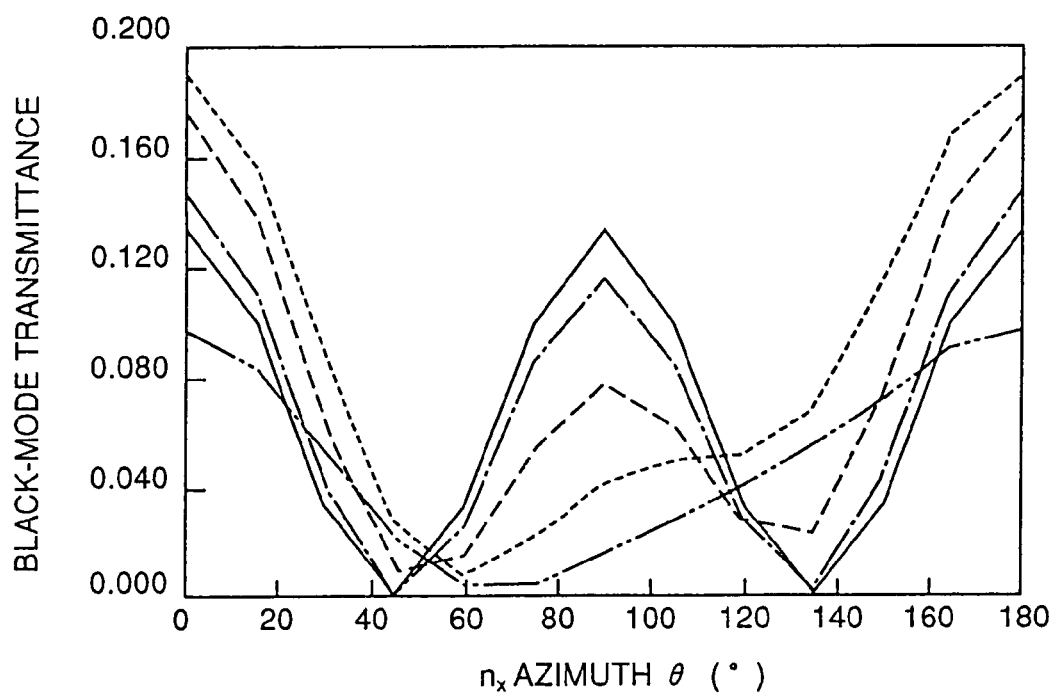
FIG. 73 is a diagram showing the black-mode transmittance of the liquid crystal display device of FIG. 72.

FIG. 73 shows the black-mode transmittance of the liquid crystal display device 80 for various azimuth angles of the positive retardation film (33B), and hence the direction of the retardation axis $n_x$.

As can be seen in FIG. 73, the black-mode transmittance of the liquid crystal display device of the liquid crystal device 80 becomes minimum when the axis $n_x$ intersects the twist central axis with an angle of about 45° or about 135°. Particularly, the angle of 45° is preferable in view point of minimization of the transmittance for the polar angles of 0–80°.

Figure 74:
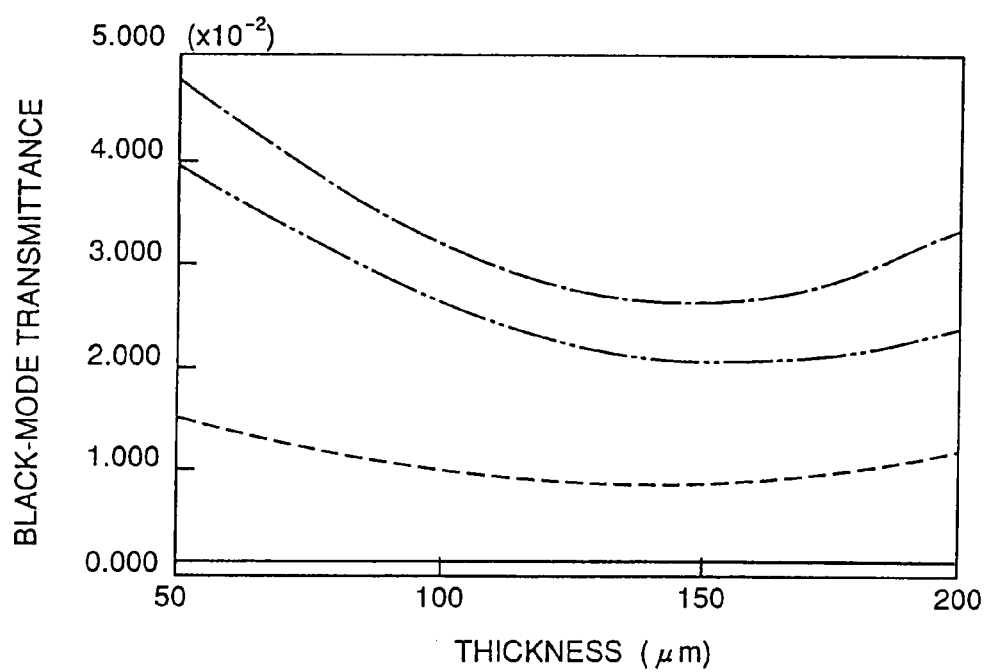
FIG. 74 is a diagram showing the black-mode transmittance of the liquid crystal display device of FIG. 72.

FIG. 74 shows the black-mode transmittance of the liquid crystal display device 80 as a function of the thickness of the positive retardation film $(33B)_1$.

Referring to FIG. 74, the black-mode transmittance of the liquid crystal display device becomes minimum when the retardation film $(33B)_1$ has a thickness of 140–150 nm. Further, the in-plane retardation R of the retardation film $(33B)_1$ falls in the range of 140–160 μm when the thickness of the film $(33)_1$ is in the range of 140–160 μm. Thus, when the positive retardation film $(33B)_1$ alone is to be used in the liquid crystal display device 80, the in-plane retardation of the film $(33B)_1$ is preferably set to 300 nm or less.

Figure 75:
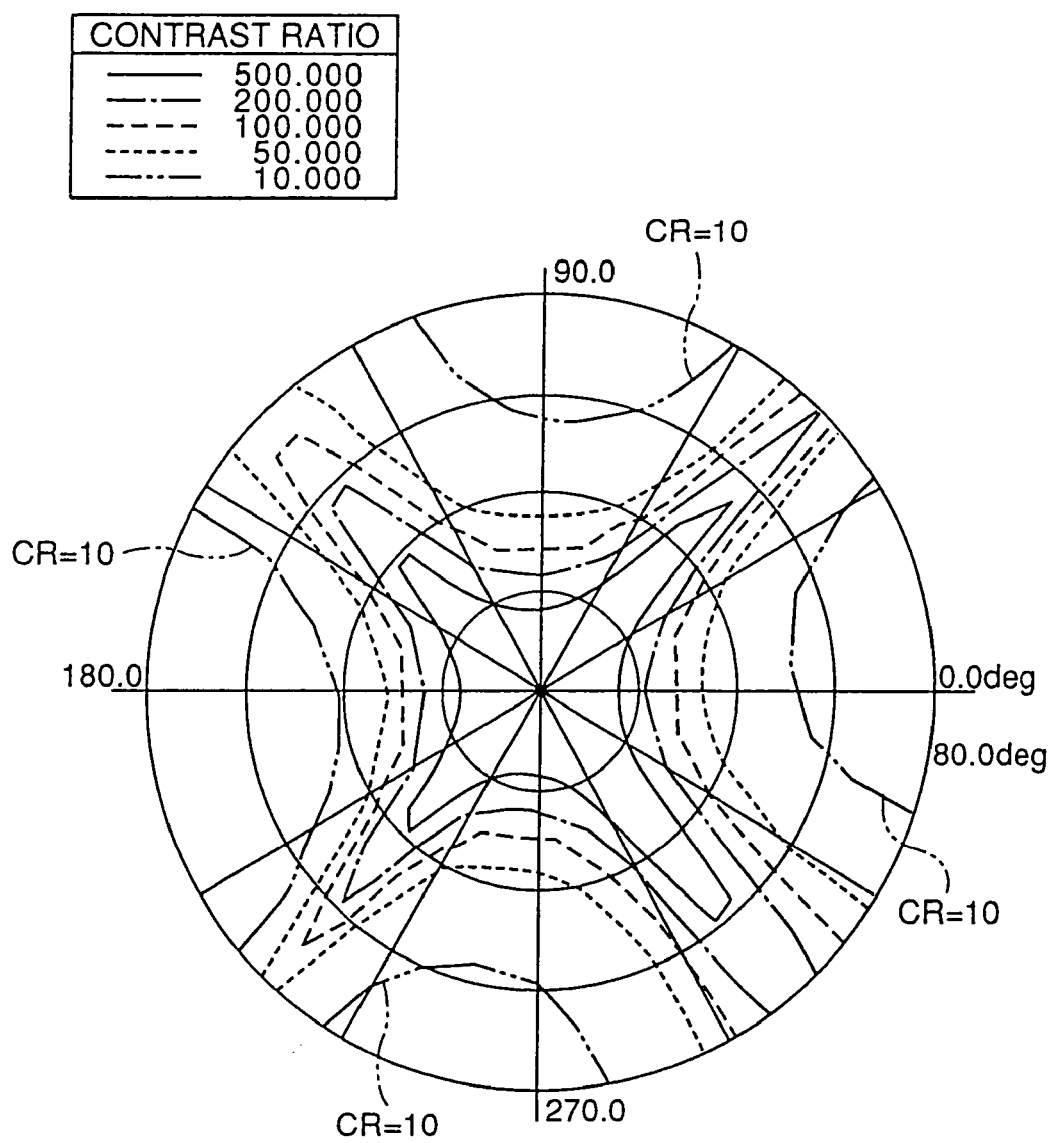
FIG. 75 is a diagram showing the viewing-angle characteristics of the liquid crystal display device of FIG. 72.

FIG. 75 shows the viewing-angle characteristics of the liquid crystal display device 80 optimized according to the teaching of FIGS. 73 and 74.

As can be seen from FIG. 75, the viewing-angle characteristic of the liquid crystal display device 80 is improved substantially as compared with the case of FIG. 59 in which no retardation film is provided.

Ninth Embodiment

Figure 76:
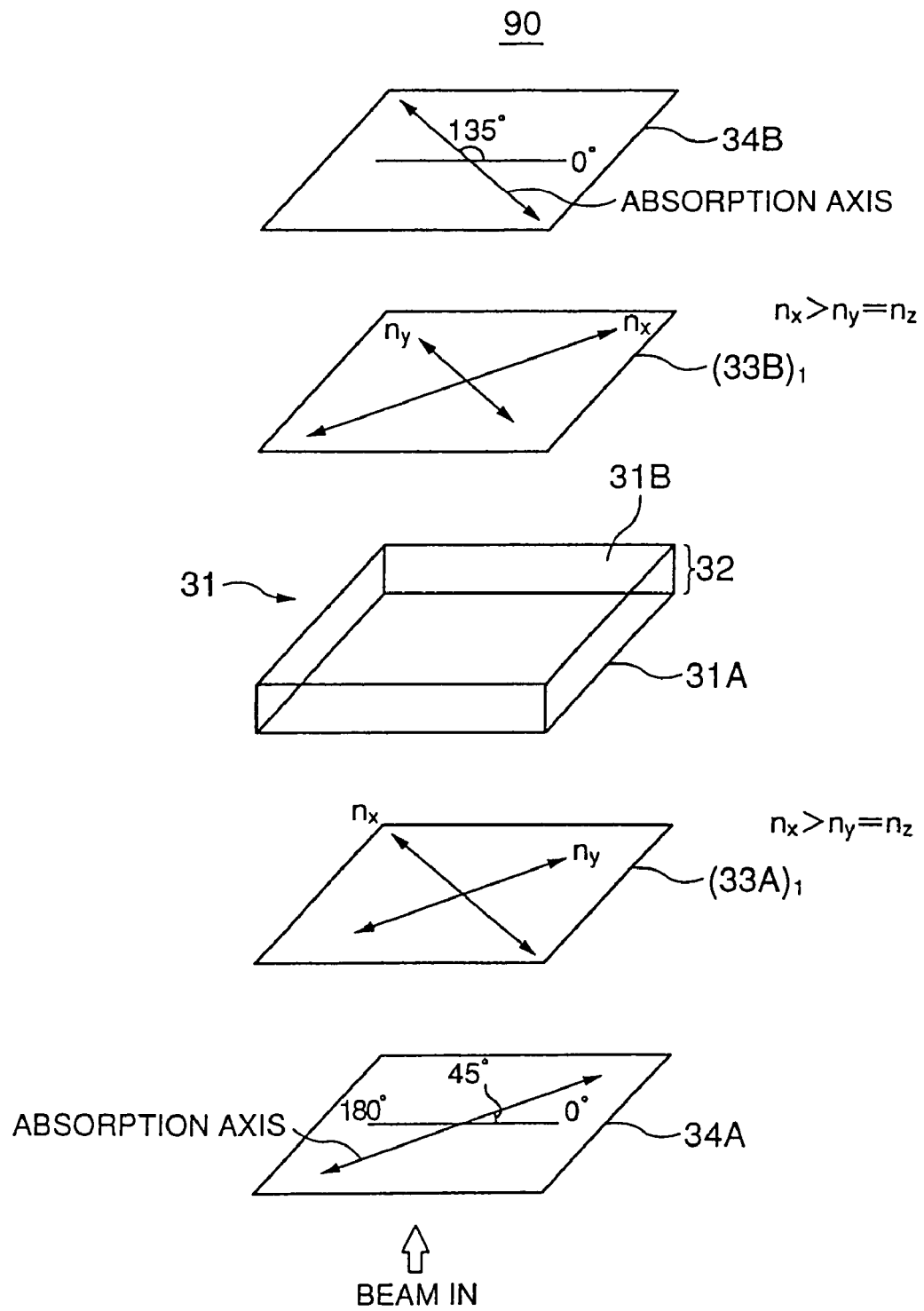
FIG. 76 is a diagram showing the construction of a liquid crystal display device according to a ninth embodiment of the present invention.

FIG. 76 shows the construction of a liquid crystal display device 90 according to a ninth embodiment of the present invention, wherein those parts corresponding to the parts described previously are designated by the same reference numerals and the description thereof will be omitted.

Referring to FIG. 76, the liquid crystal display device 90 has a construction similar to the liquid crystal display device 80 of FIG. 72 except that the positive retardation film $(33A)_1$, used in the liquid crystal display device 50' of FIG. 64, is added. In the construction of FIG. 76, it should be noted that the retardation film $(33B)_1$ is disposed such that the in-plane retardation axis $n_x$ intersects perpendicularly to the absorption axis of the analyzer 34B that is located adjacent to the retardation film $(33B)_1$ and such that the in-plane retardation axis $n_x$ of the retardation film $(33A)_1$ intersects the absorption axis of the adjacent polarizer 34B perpendicularly.

Figure 77:
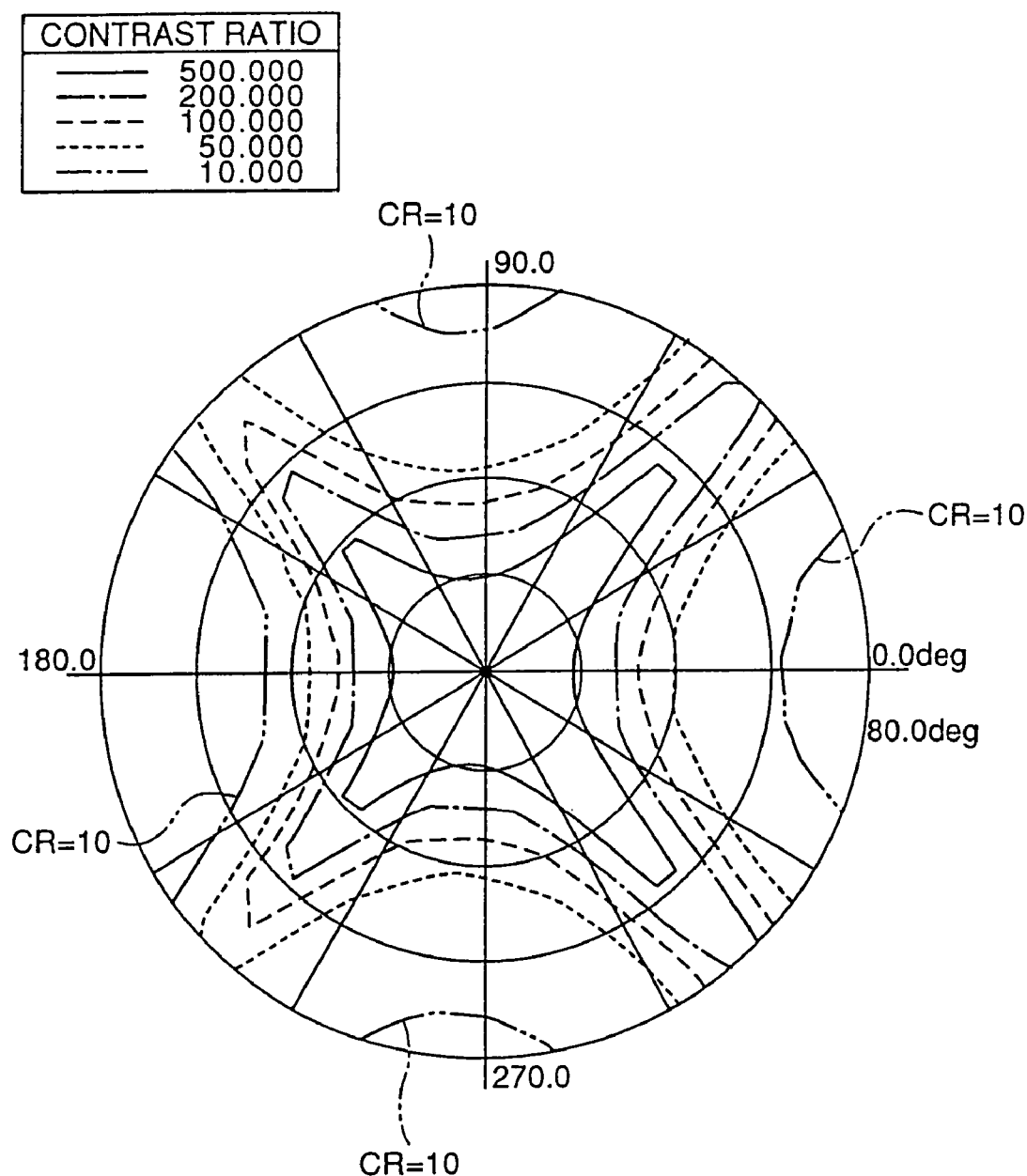
FIG. 77 is a diagram showing the viewing-angle characteristics of the liquid crystal display device of FIG. 76.

FIG. 77 shows the viewing-angle characteristics of the liquid crystal display device 90.

Referring to FIG. 77, the viewing-angle characteristic of the liquid crystal display device 90 is improved substantially as compared with the characteristic of FIG. 59 for the case in which no retardation film is provided.

Tenth Embodiment

Figure 78:
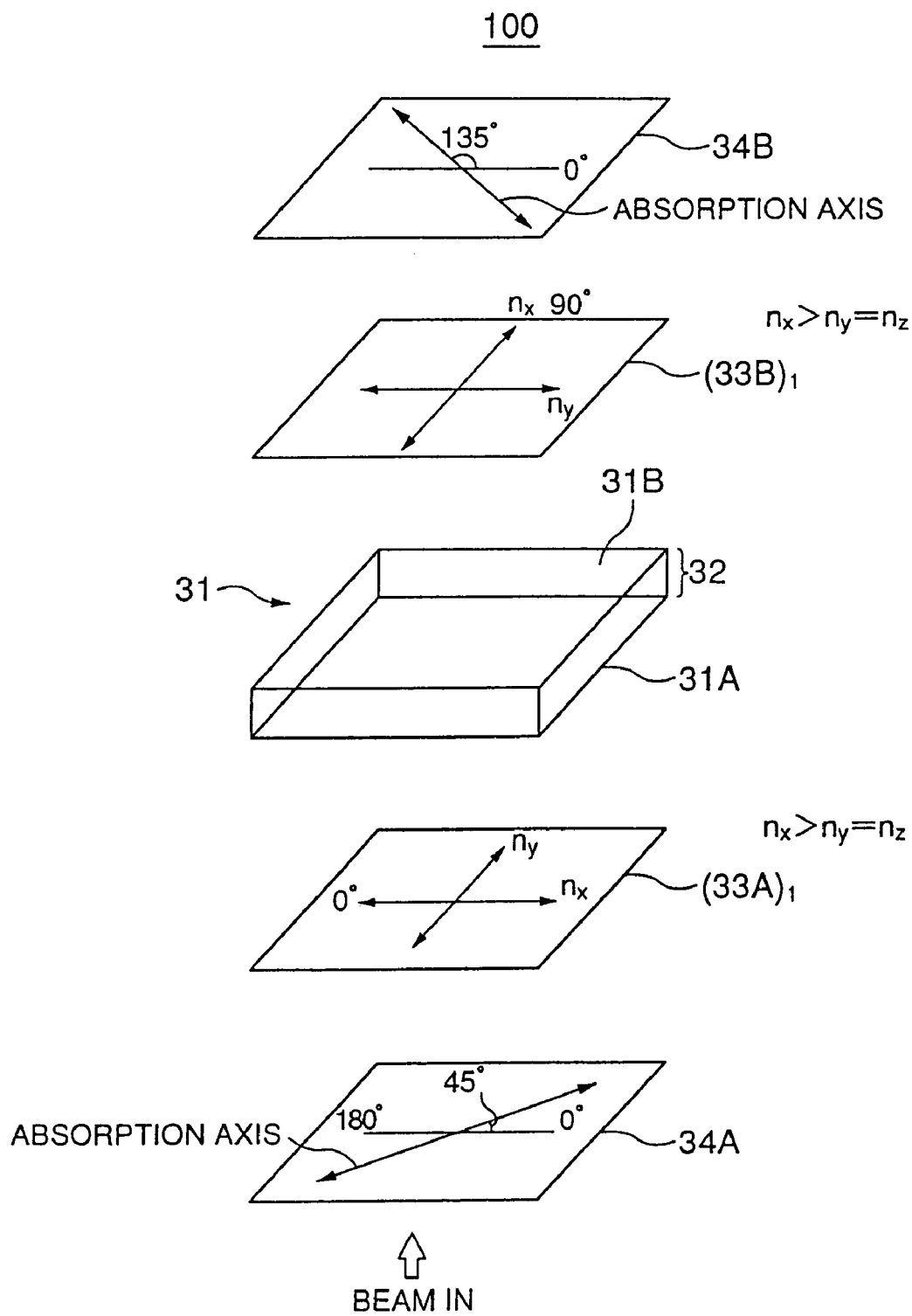
FIG. 78 is a diagram showing the construction of a liquid crystal display device according to a tenth embodiment of the present invention.

FIG. 78 shows the construction of a liquid crystal display device 100 according to a tenth embodiment of the present invention, wherein those parts corresponding to the parts described previously are designated by the same reference numerals and the description thereof will be omitted.

Referring to FIG. 78, the liquid crystal display device 100 has a construction similar to that of the liquid crystal display device 90 explained previously, except that the retardation film $(33B)_1$ is disposed such that the in-plane retardation axis $n_x$ intersects the absorption axis of the adjacent analyzer 34B with an angle of 45° and that the retardation film $(33A)_1$ is disposed such that the in-plane retardation axis $n_x$ of the retardation film $(33A)_1$ intersects the absorption axis of the adjacent polarizer 34A with an angle of 45°.

Figure 79:
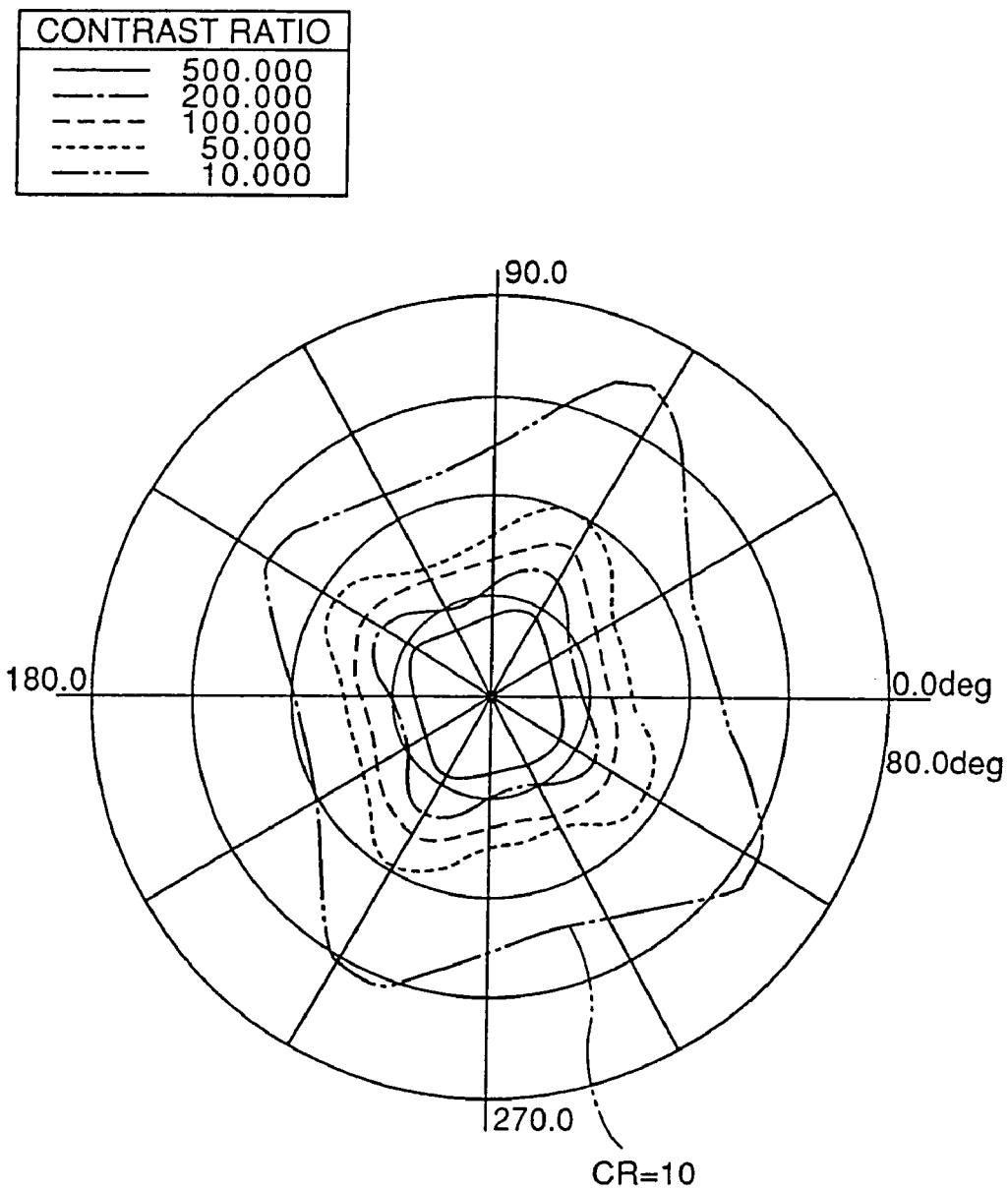
FIG. 79 is a diagram showing the viewing-angle characteristics of the liquid crystal display device of FIG. 78.

FIG. 79 shows the viewing-angle characteristics of the liquid crystal display device 100 for a case in which the retardation films $(33A)_1$ and $(33B)_1$ provide a retardation R of 75 nm.

As will be understood from FIG. 79, the viewing-angle characteristic of the liquid crystal display device 100 is slightly inferior to the other embodiments, although the viewing-angle characteristic of FIG. 79 is improved over the viewing-angle characteristic of FIG. 59 in which the retardation film is not provided.

Eleventh Embodiment

Figure 80:
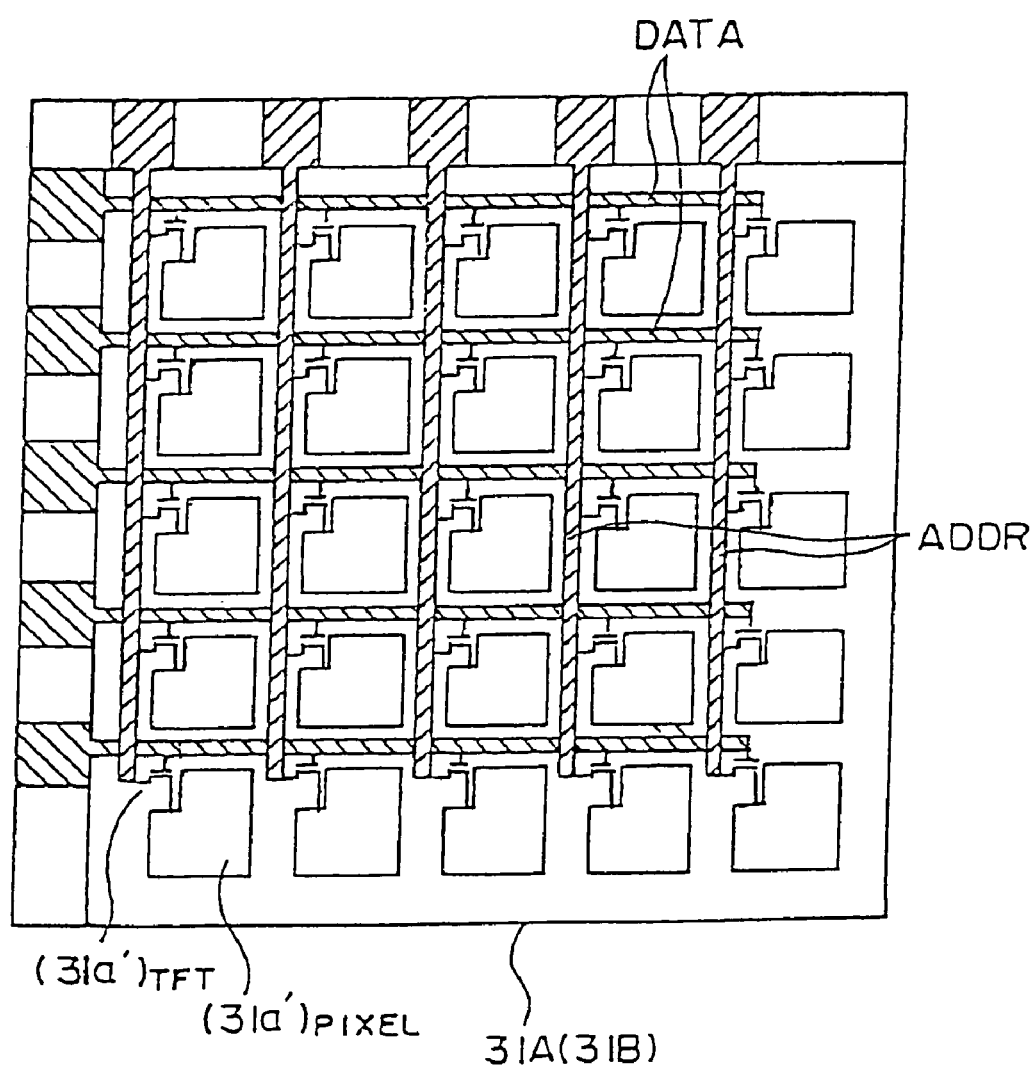
FIG. 80 is a diagram showing a construction of the liquid crystal display device according to an eleventh embodiment of the present invention.

FIG. 80 shows a construction of a liquid crystal display device 110 of an active-matrix type.

Referring to FIG. 80, the liquid crystal display device 110 has a construction similar to that of FIG. 48, except that a plurality of transparent pixel electrodes $(31a')_{PIXEL}$ and corresponding thin-film transistors $(31a')_{TFT}$ that drive the pixel electrodes, are provided on the glass substrate 31A or 31B, in correspondence to pixels that are defined in the liquid crystal panel 31. Thus, the transparent pixel electrode $(31a')_{PIXEL}$ and the thin-film transistor $(31a')_{TFT}$ correspond to the electrode 31a' or electrode 31b' of FIG. 48. Further, a data bus DATA and an address bus ADDR extend on the substrate 31A or 31B respectively for supplying a drive signal to the thin-film transistors forming the matrix array and for selectively activating the thin-film transistors in the array.

Figure 81:
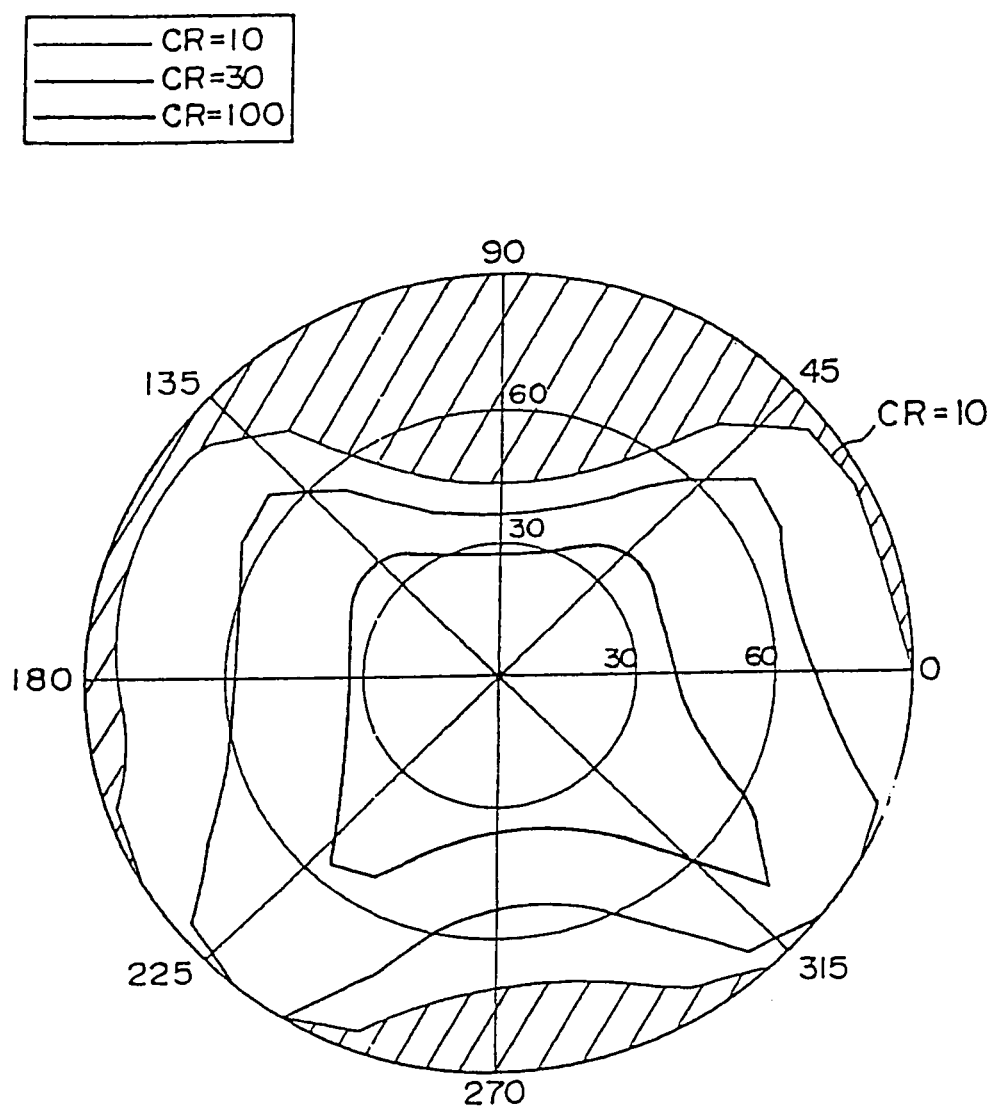
FIG. 81 is a diagram showing viewing-angle characteristics of the liquid crystal display device of FIG. 80.

FIG. 81 shows the viewing-angle characteristics of the liquid crystal display device 110 of FIG. 81 for the case in which the MJ95785 liquid crystal of Merck Japan, LTD. is used for the liquid crystal layer and in which the liquid crystal layer is formed to have a thickness of 3 μm. In FIG. 81, it should further be noted that the twist angle of the liquid crystal molecules is set to 45° and the liquid crystal layer shows a retardation Δn·d of 241 nm. Further, the RN 783 film of Nissan Chemicals, KK. is used for the molecular alignment films 31a and 31b. As will be understood clearly from FIG. 81, the active-matrix liquid crystal display device exhibits a very wide viewing-angle characteristic.

Twelfth Embodiment

Figure 82A:
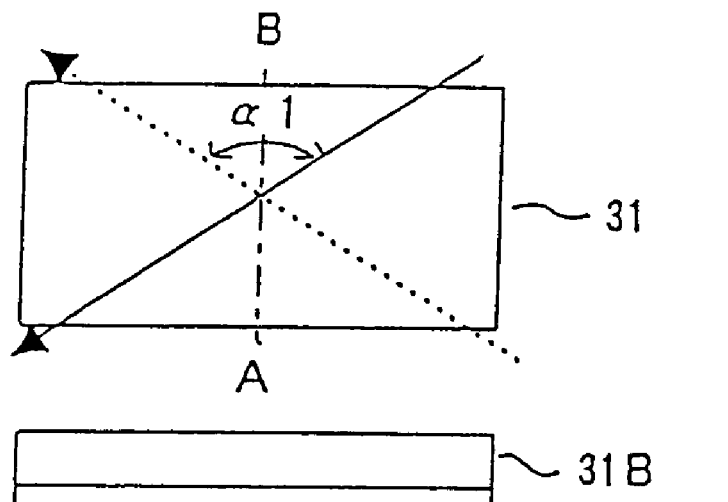
FIGS. 82A–82C are diagrams showing a domain structure of the liquid crystal display device of any of the preceding embodiments.
Figure 82B:
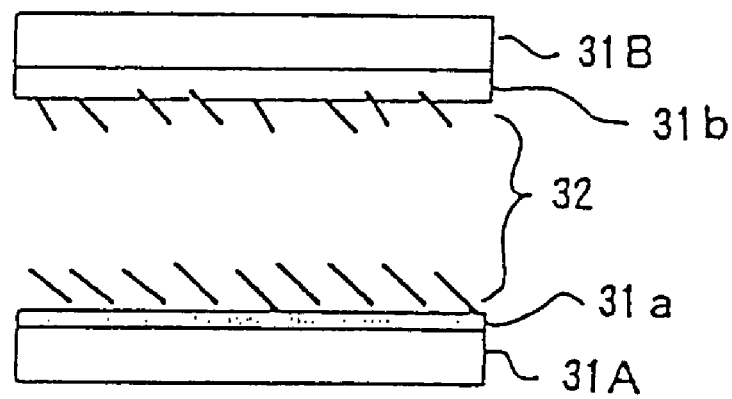
Figure 82C:
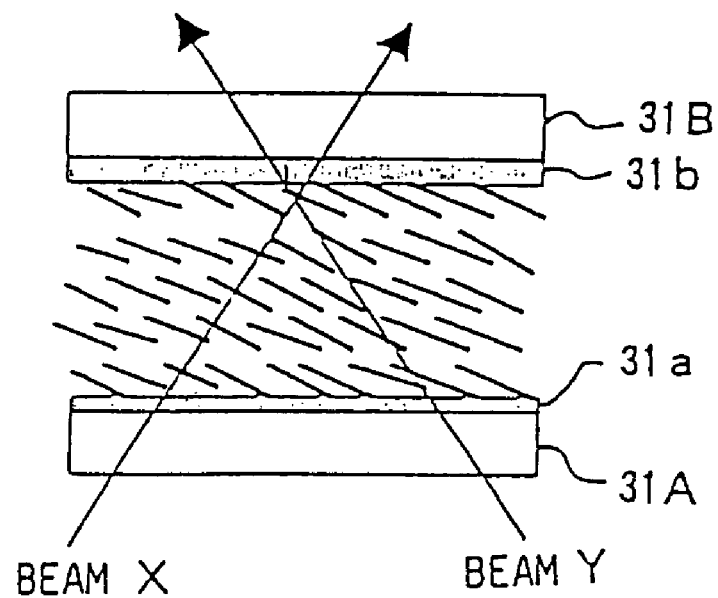

In the embodiments described heretofore, each of the pixels in the liquid crystal display device has a so-called single-domain structure shown in FIGS. 82A–82C, in which the molecular alignment of the liquid crystal molecules is uniform in each of the pixels. In FIGS. 82A–82C, those parts corresponding to the parts described previously are designated by the same reference numerals and the description thereof will be omitted.

Referring to FIGS. 82A–82C, it should be noted that FIG. 82A shows one pixel in the liquid crystal display device in a plan view, while FIG. 82B shows the cross sectional view of the pixel taken along a line A–B in FIG. 82A in an activated state of the liquid crystal display device. Further, FIG. 82C shows the state in which the liquid crystal display device is irradiated by optical beams X and Y from two directions. It should be noted that FIG. 82A shows the rubbing direction of the molecular alignment film 31$b$ provided on the upper substrate 31B by a continuous line. Further, the rubbing direction of the molecular alignment film 31$a$ on the lower substrate 31A is represented in FIG. 82A by a dotted line. The continuous line and the dotted line intersect each other with an angle $\alpha_1$, wherein the angle $\alpha_1$ is set to 45° when the twist angle of the liquid crystal molecules is to be set to 45°.

As can be seen in FIG. 82C, the molecular alignment of the liquid crystal molecules as viewed in the traveling direction of the optical beam changes, in the activated state of the liquid crystal display device, depending on whether the optical beam travels along the path X or along the path Y. When there exists such an asymmetricity in the optical structure of the liquid crystal display device, the problem of deterioration of the viewing-angle characteristics is inevitable.

Figure 83A:
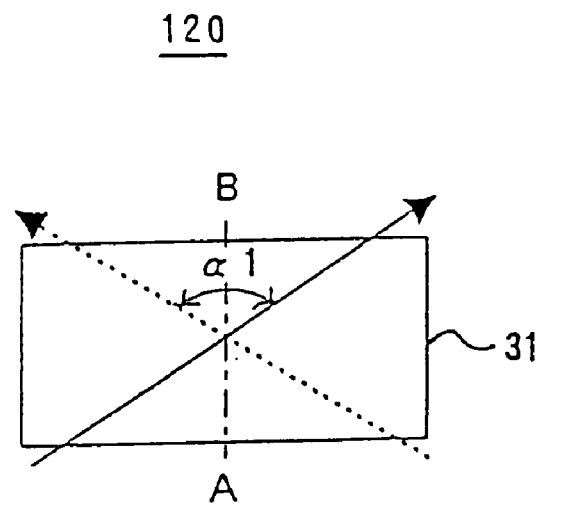
FIGS. 83A–83C are diagrams showing a domain structure of the liquid crystal display device according to a twelfth embodiment of the present invention.
Figure 83B:
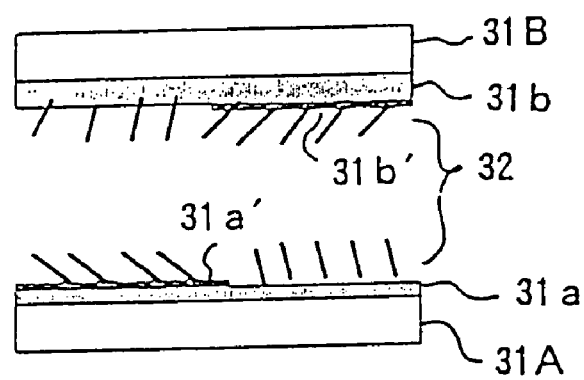
Figure 83C:
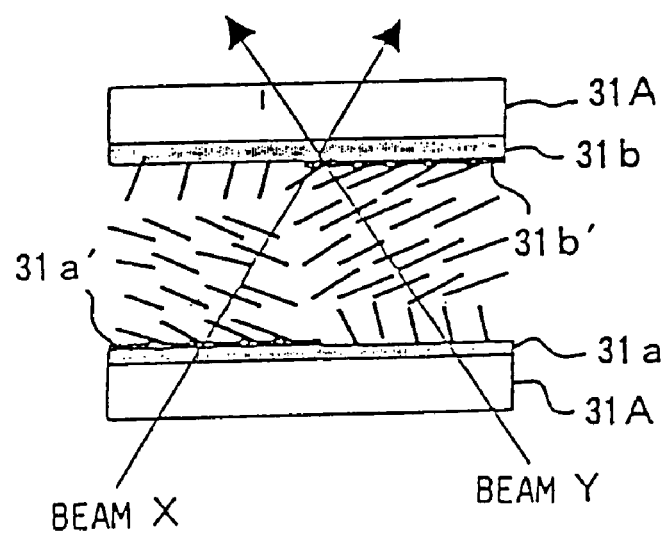

FIGS. 83A–83C show a construction of a liquid crystal display device 120 according to a seventh embodiment of the present invention, wherein those parts described previously are designated by the same reference numerals and the description thereof will be omitted. It should be noted that FIG. 83A shows a plan view similar to the plan view of FIG. 82A, while FIGS. 83B and 83C show cross-sectional views corresponding to FIGS. 82B and 82C.

Referring to FIGS. 83A–83C, it should be noted that the present embodiment uses ultraviolet-reformed molecular alignment films 31$a'$ and 31$b'$ such that the molecular alignment films 31$a'$ and 31$b'$ cover a part of the molecular alignment film 31$a$ and a part of the molecular alignment film 31$b$, respectively. Such ultraviolet-reformed molecular alignment films may be formed by depositing a molecular alignment film forming the films 31$a'$ and 31$b'$ on the molecular alignment film 31$a$ or 31$b$, after a rubbing process of the film 31$a$ or 31$b$ is completed. Further, the molecular alignment film thus deposited is exposed to an ultraviolet radiation such that the molecules in the molecular alignment film thus deposited cause a desired alignment. After such an alignment of the molecules, the deposited molecular-alignment film is patterned such that only a part thereof remains on the underlying molecular alignment film 31$a$ or 31$b$.

By forming the molecular alignment film 31$a'$ in the lower part of the pixel and by forming the molecular alignment film 31$b'$ in the upper part of the pixel in the illustration of FIG. 83C, the optical beam traveling in the direction X and the optical beam traveling in the direction Y experience substantially the same effect of molecular orientation of the liquid crystal molecules. In other words, the liquid crystal display device shows an optical property that is substantially identical in the X-direction and in the Y-direction.

Figure 84A:
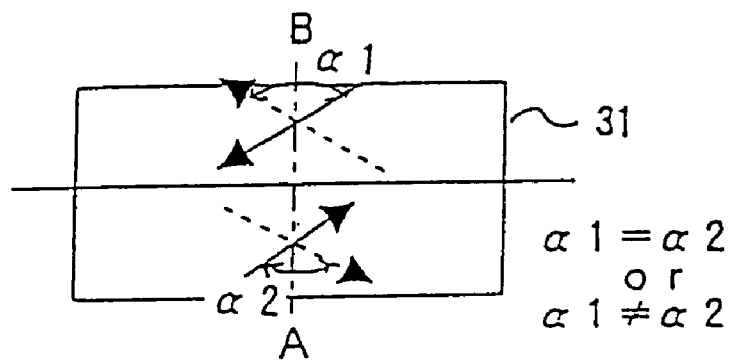
FIGS. 84A–84C are diagrams showing a domain structure of the liquid crystal display device according to a modification of the twelfth embodiment.
Figure 84B:
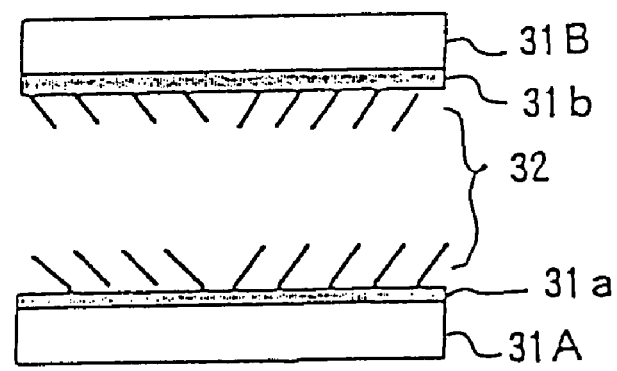
Figure 84C:
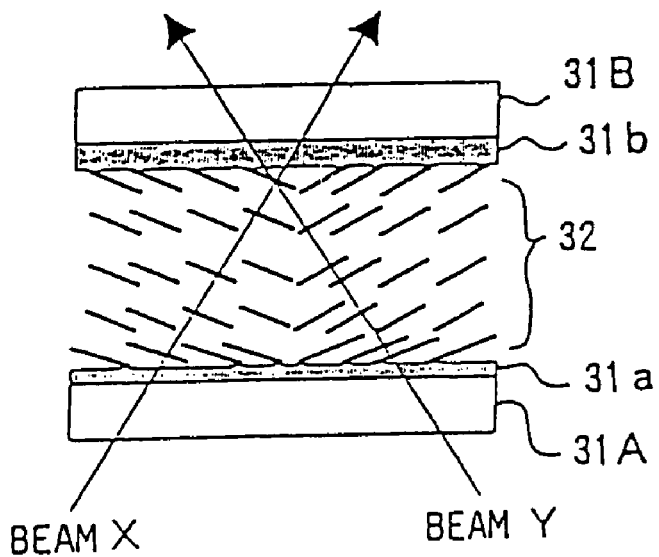

FIGS. 84A–84C show a modification of the present embodiment.

Referring to FIG. 84A, the direction of rubbing is changed in the pixel in the upper part and lower part in the illustration of FIG. 84A, and thus, the molecular orientation is different in the right region and left region of the pixel as can be seen in the cross-sectional view of FIG. 84B. As noted in FIG. 84A, the rubbing directions of the upper and lower molecular alignment layers 31$a$ and 31$b$ cross with each other with an angle $\alpha_1$ in the upper part of the pixel while the rubbing directions cross with each other with an angle $\alpha_2$ in the lower part of the pixel. As a result, the optical beam traveling in the X-direction and the optical beam traveling in the Y-direction experience substantially the same effect of molecular orientation of the liquid crystal molecules. Thereby, the viewing-angle characteristics of the liquid crystal display device are improved substantially.

Figure 85:
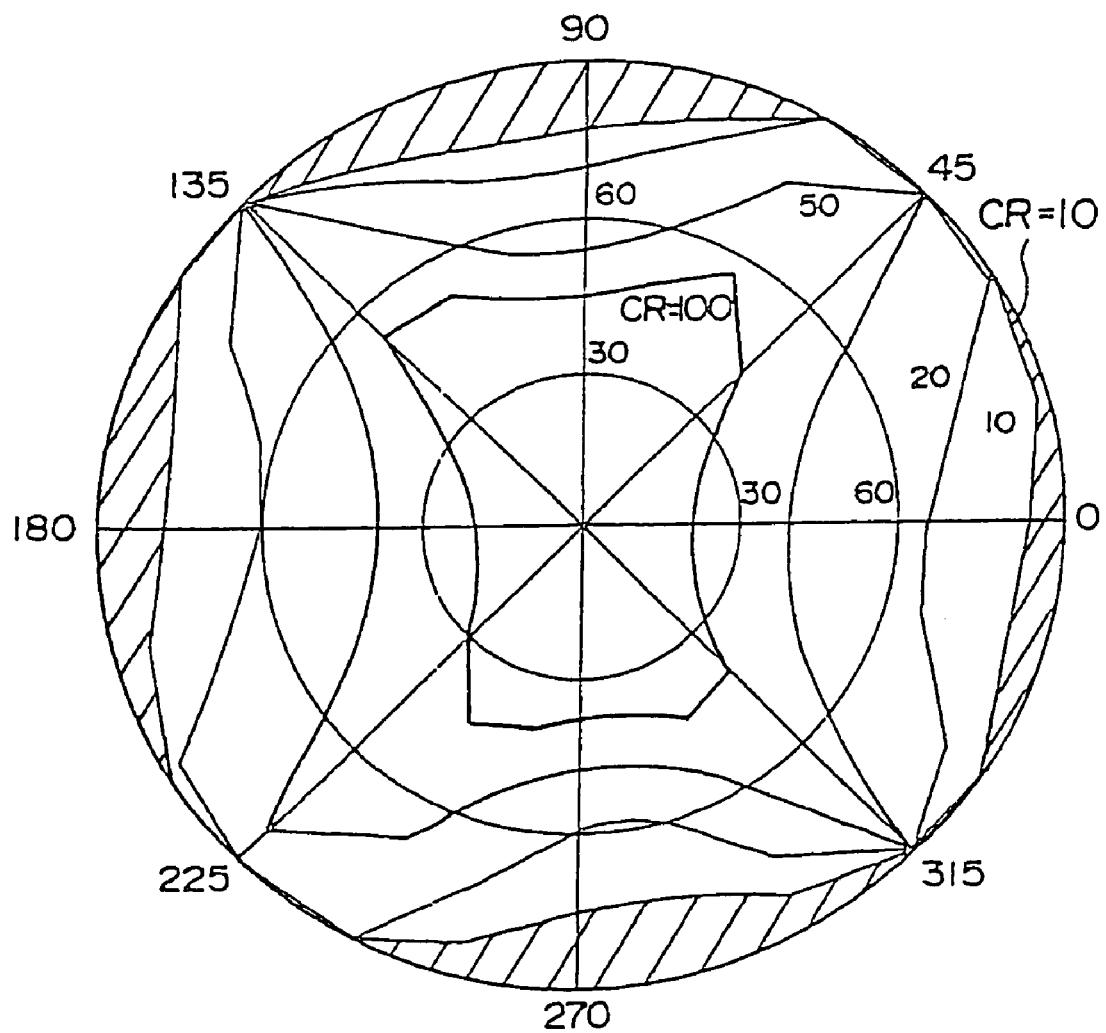
FIG. 85 is a diagram showing viewing-angle characteristics of the liquid crystal display device of the twelfth embodiment.

FIG. 85 shows the viewing-angle characteristics of the liquid crystal display device of FIG. 84 for the case in which the angles $\alpha_1$ and $\alpha_2$ are both set to 45°, in which the MJ95785 liquid crystal is used for the liquid crystal layer 32. The thickness d of the liquid crystal layer 32 is set to 3 μm. No chiral substance is added to the liquid crystal layer 32. Thus, the liquid crystal layer 32 has a retardation Δn·d of 287 nm and the twist angle is set to 45°. Further, it should be noted that the result of FIG. 85 is for the case in which the positive and negative retardation films are provided as indicated in FIG. 64 such that the total retardation R of the retardation films (33A)$_1$ and (33B)$_1$ is set to 25 nm and the retardation R' of the retardation film (33A)$_2$ and (33B)$_2$ is set to 160 nm.

Referring to FIG. 85, it should be noted that the area of the viewing-angle in which the contrast ratio decreases below 10 is substantially limited, and the liquid crystal display device shows excellent viewing-angle characteristics.

Figure 86:
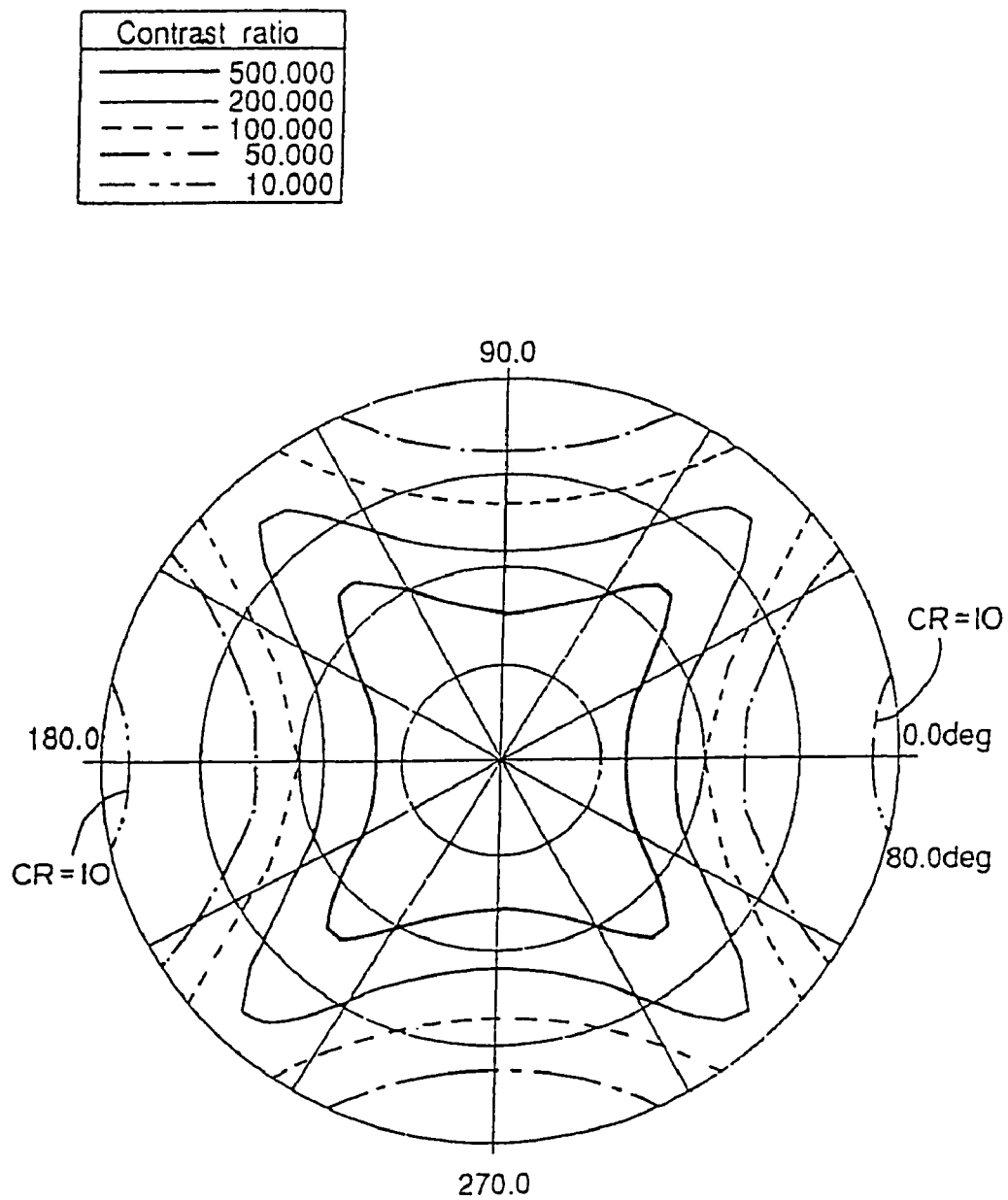
FIG. 86 is a diagram showing the result of simulation for the viewing-angle characteristics of the liquid crystal display device of the twelfth embodiment.

FIG. 86 shows the viewing-angle characteristics of the same liquid display device obtained by a simulation. The result of FIG. 66 indicates that there is a further possibility that the viewing-angle characteristics of the liquid display device be improved by a further optimization.

Figure 87:
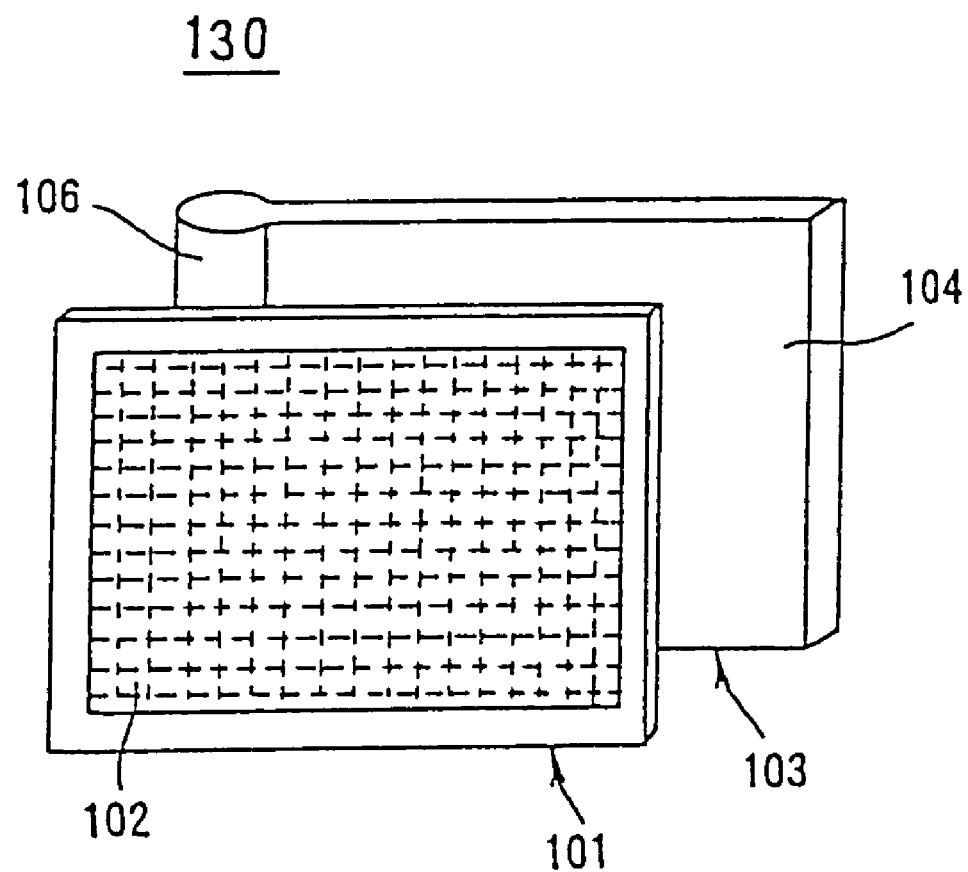
FIG. 87 is a diagram showing a construction of a direct-view type liquid crystal display device that uses the vertically aligned liquid crystal display device of the present invention.

FIG. 87 shows a construction of a direct-view type liquid crystal display apparatus 130 constructed by using the VA-mode liquid crystal display device of any of the foregoing embodiments.

Referring to FIG. 87, the liquid crystal display apparatus 130 includes a VA-model liquid crystal display device 101, which may be any of the liquid crystal display devices 10–120 explained heretofore, and a planar light source unit 103 disposed behind the liquid crystal display device 101. The liquid crystal display device 101 includes a plurality of pixel regions 102, wherein each of the pixel regions modulates the optical beam emitted by the planar light source unit 103. As usual, the planar light source unit 103 includes a light source part 106 that accommodates therein a linear light source such as a fluorescent tube and an optical diffusion part 104 that causes a diffusion of the light produced by the linear light source. As a result of such a diffusion, a two-dimensional illumination of the liquid crystal display device 101 becomes possible.

By using the liquid crystal display device explained heretofore for the liquid crystal display device 101, excellent viewing-angle characteristics are obtained, in addition to the high contrast and high response representation.

In the VA-mode liquid crystal display device of the present invention described heretofore, in which a liquid crystal having a negative dielectric anisotropy is used, it is also possible to use a liquid crystal having a positive dielectric anisotropy (so-called p-type liquid crystal). As the optimization of the optical properties of the liquid crystal device described heretofore is not affected by the nature of the liquid crystal whether it is an n-type liquid crystal or a p-type liquid crystal, the conclusion derived heretofore about the n-type liquid crystal display device is applicable also to a p-type liquid crystal display device. The only difference is the mode of driving the liquid crystal device as explained with reference to FIGS. 4A and 4B and FIGS. 5A and 5B.

In the embodiment of FIGS. 54, 60 or 64, it should be noted that the retardation film $(33A)_1$ or $(33B)_1$ should have a very small retardation of 120 nm or less. Such a birefringence film having a very small retardation is obtained by using a norbornene resin having a norbornene structure in the principal chain. It should be noted the norbornene resin is almost optically isotropic and can be conveniently used for forming the foregoing retardation films $(33A)_1$ and $(33B)_1$.

Thirtieth Embodiment

Figure 88:
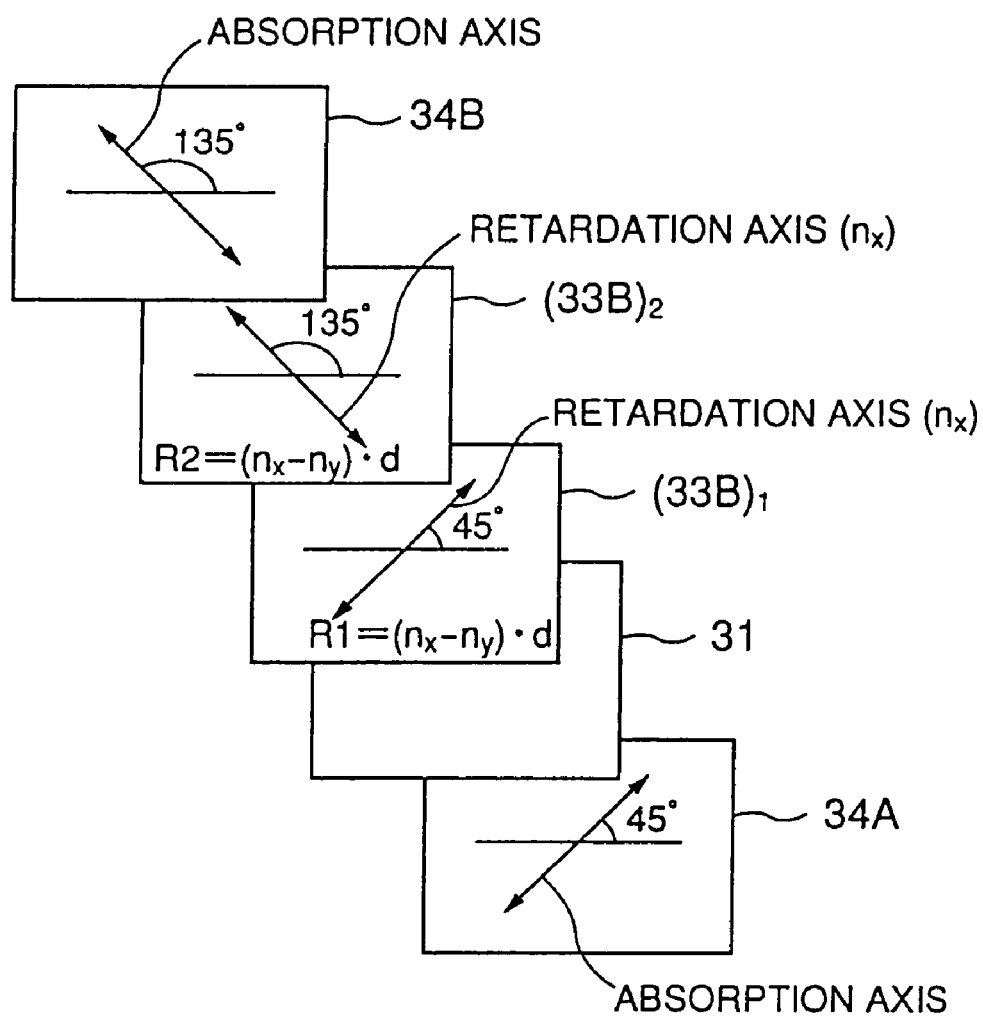
FIG. 88 is a diagram showing the construction of a liquid crystal display device according to a thirteenth embodiment of the present invention.

FIG. 88 shows the construction of a liquid crystal display device 140 according to a thirteenth embodiment of the present invention, wherein those parts corresponding to the parts described heretofore are designated by the same reference numerals and the description thereof will be omitted.

Referring to FIG. 88, the liquid crystal display device 140 has a construction similar to that of the liquid crystal display device 40 of FIG. 54 except that the retardation films $(33B)_1$ and $(33B)_2$ are disposed such that the retardation axis $n_x$ and the retardation axis $n_y$ intersect perpendicularly.

Figure 89:
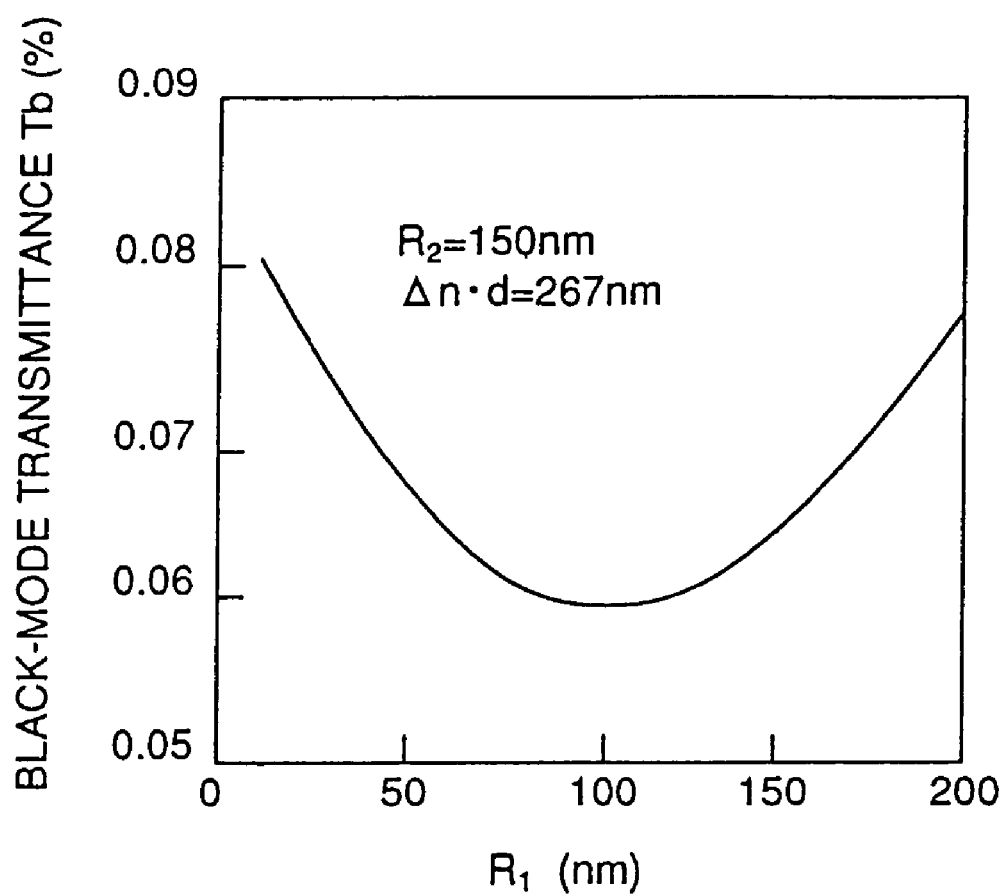
FIG. 89 is a diagram showing the black-mode transmittance of the liquid crystal display device of FIG. 88.

FIG. 89 shows the black-mode transmittance Tb of the liquid crystal display device 140 for a case in which the retardation $R_2$ of the retardation film $(33B)_2$ is set to 150 nm and the retardation $R_1$ of the retardation film $(33B)_1$ is changed variously.

Referring to FIG. 89, it should be noted that black-mode transmittance Tb becomes minimum when the sum of the retardation $R_1$ and the retardation $R_2$ is generally equal to the retardation $\Delta n \cdot d$ of the liquid crystal layer 32.

Figure 90:
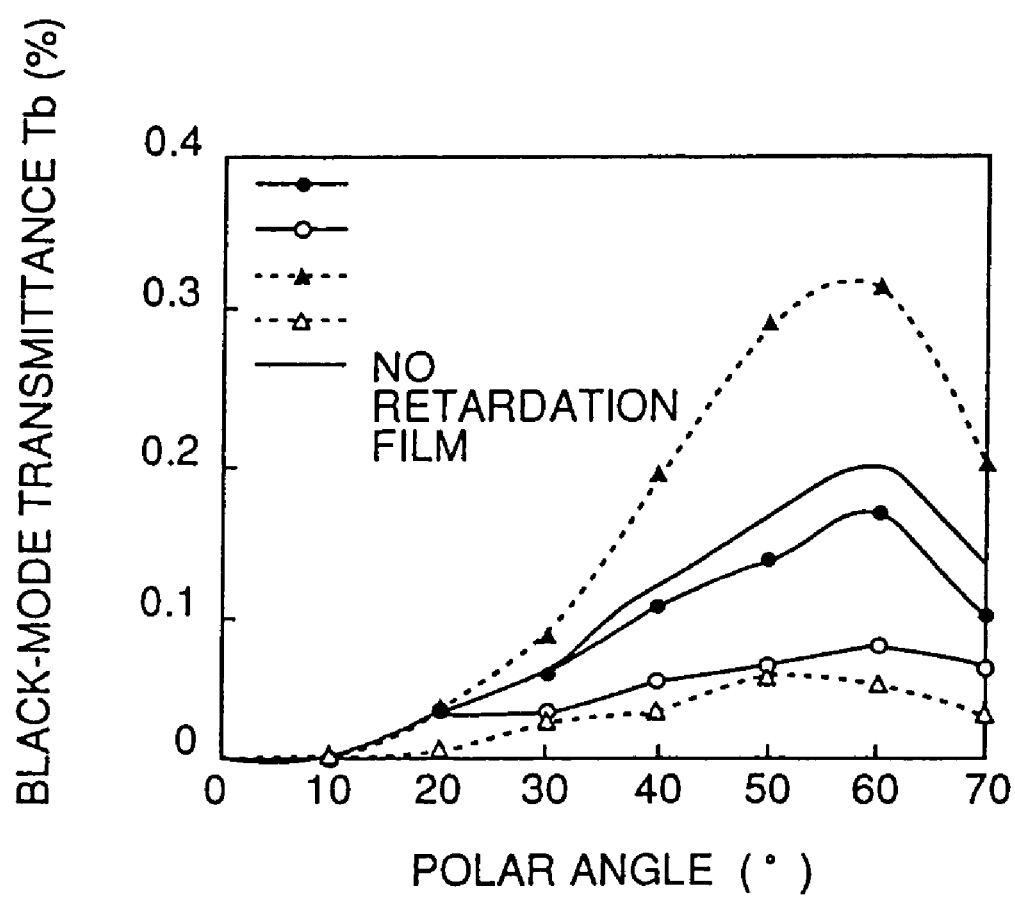
FIG. 90 is a diagram showing the polar-angle dependence of the black-mode transmittance for various structures of the thirteenth embodiment.

FIG. 90 shows the foregoing black-mode transmittance Tb of the liquid crystal display device 89 for various polar angles for the constructions of the liquid crystal display device shown in FIGS. 91A–91D.

Figure 91A:
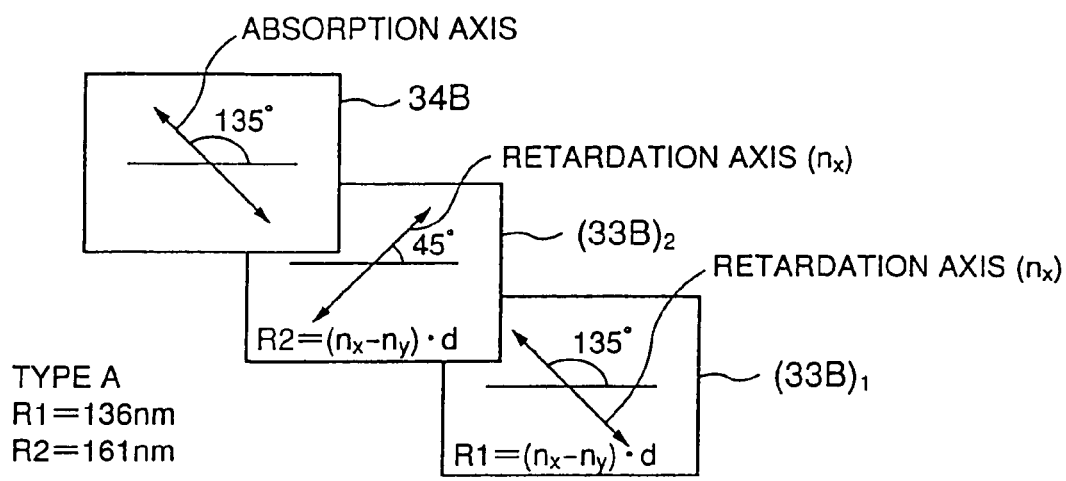
FIGS. 91A–91D show various structures used in the experiment of FIG. 90.
Figure 91B:
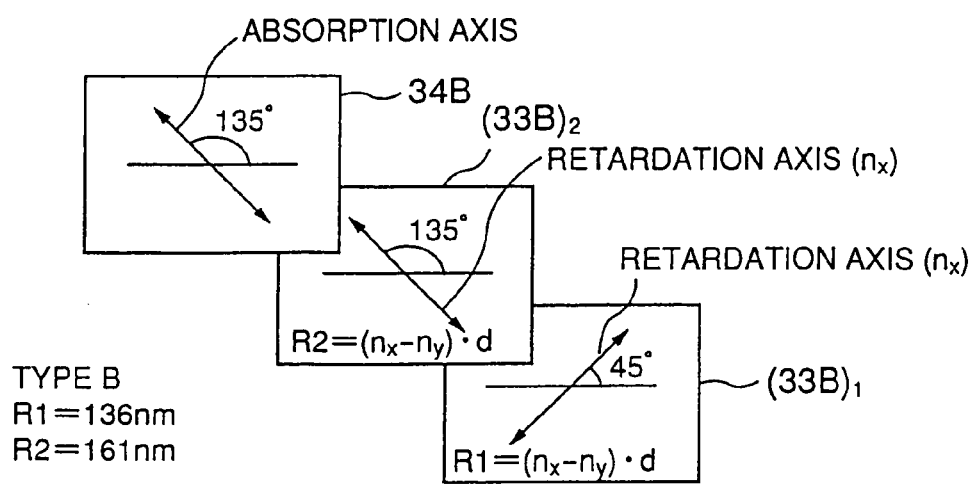
Figure 91C:
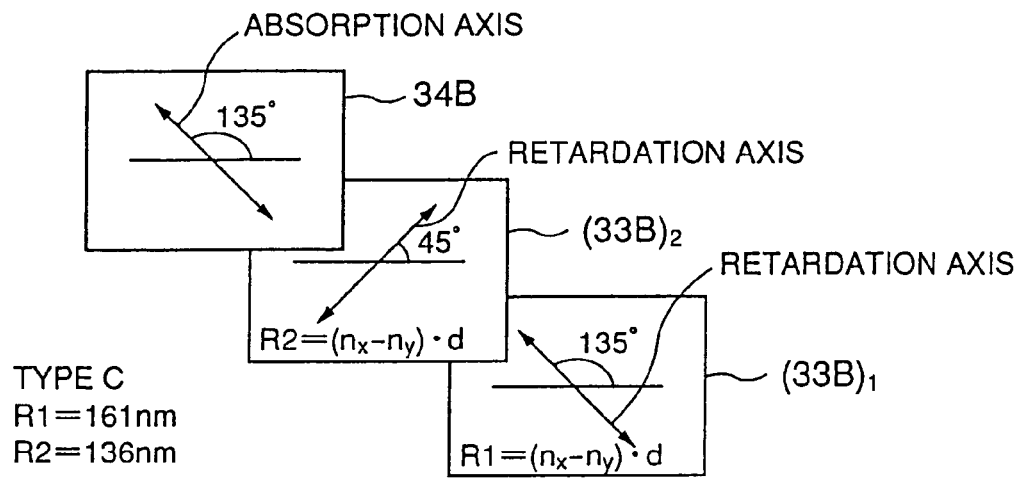
Figure 91D:
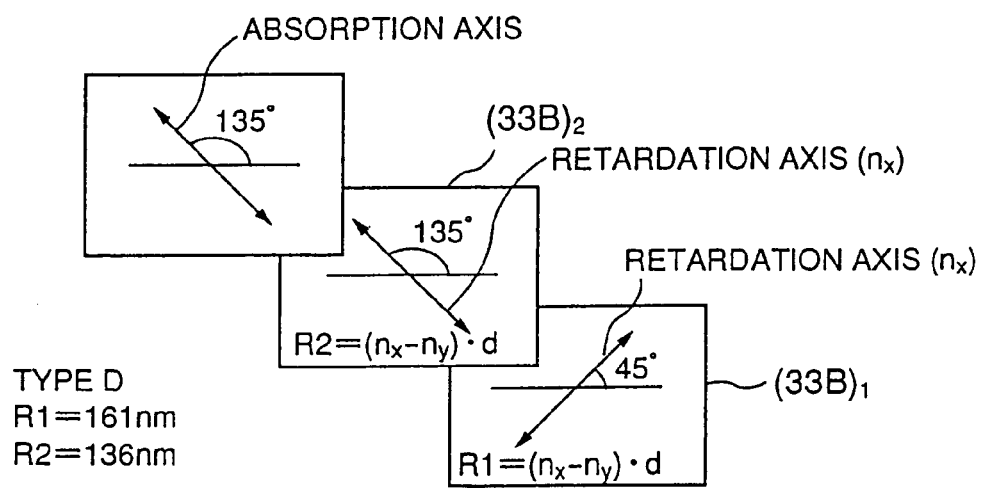
Figure 92A:
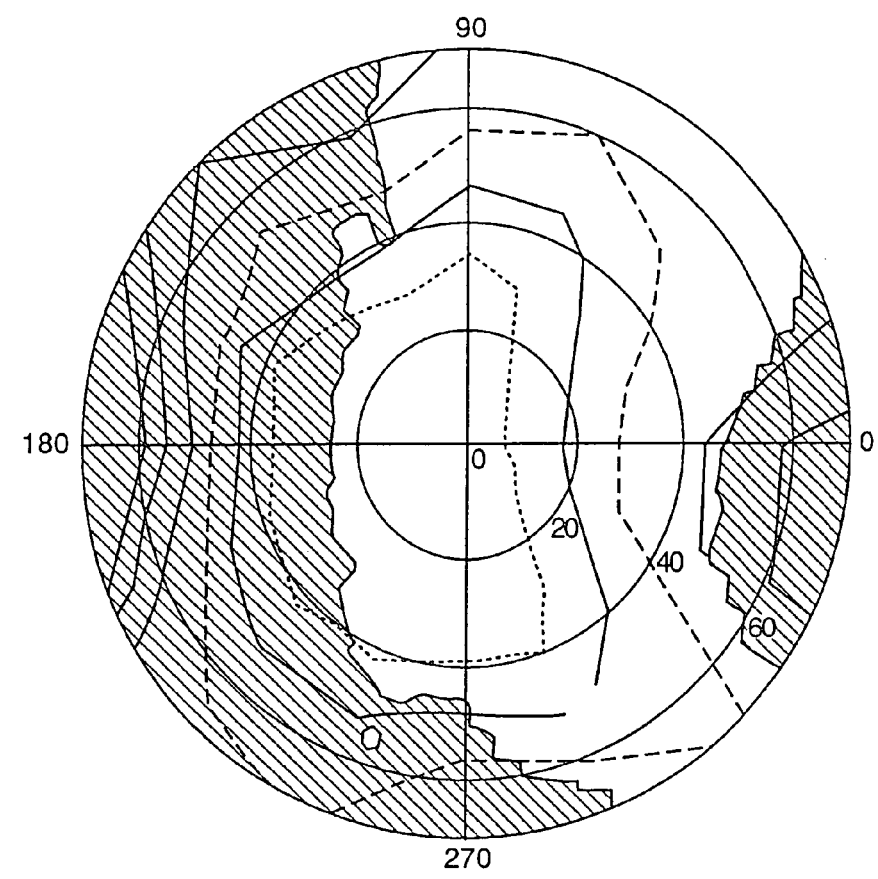
FIGS. 92A and 92B show the viewing-angle characteristics of the liquid crystal display device of FIG. 88 in comparison with a case in which retardation films are eliminated.
Figure 92B:
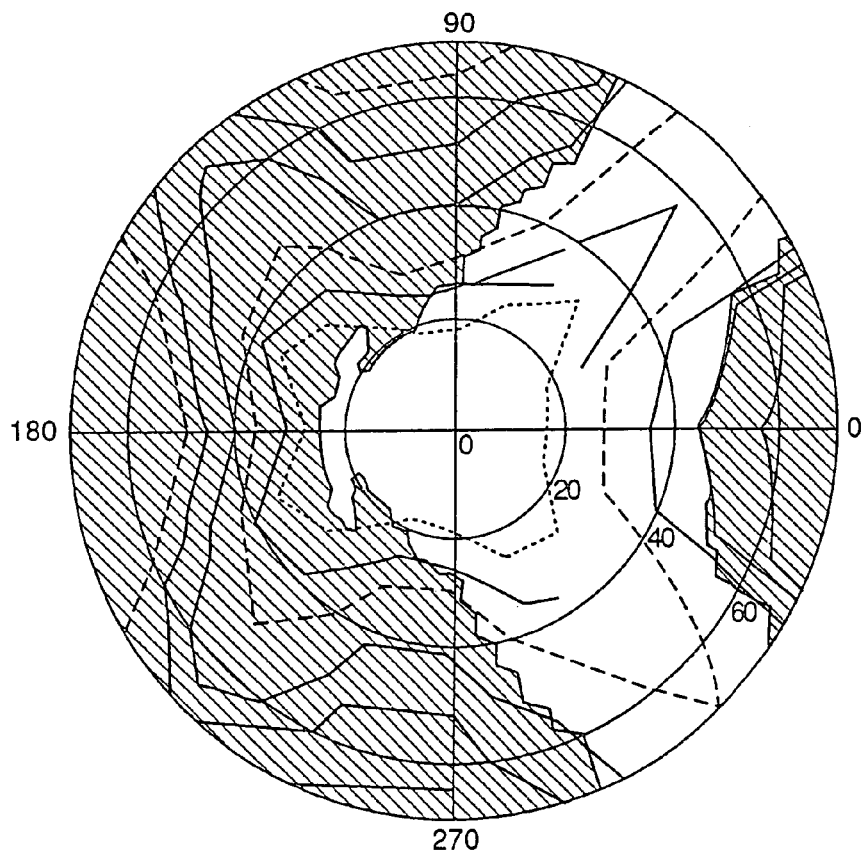

Referring to FIG. 90, the polar-angle-dependency of the black-mode transmittance Tb, and hence the viewing-angle characteristics of the liquid crystal display device 140, is improved substantially when the retardation film $(33B)_1$ and the retardation film $(33B)_2$ are disposed such that the retardation axis of the retardation film $(33B)_1$ adjacent to the liquid crystal layer 32 intersects the absorption axis of the polarizer 34B as indicated in FIG. 91B or FIG. 91D. In the case of the construction of FIG. 91C, on the other hand, it should be noted that the viewing-angle characteristic is deteriorated as compared with the case in which the retardation films are not provided.

Figure 93:
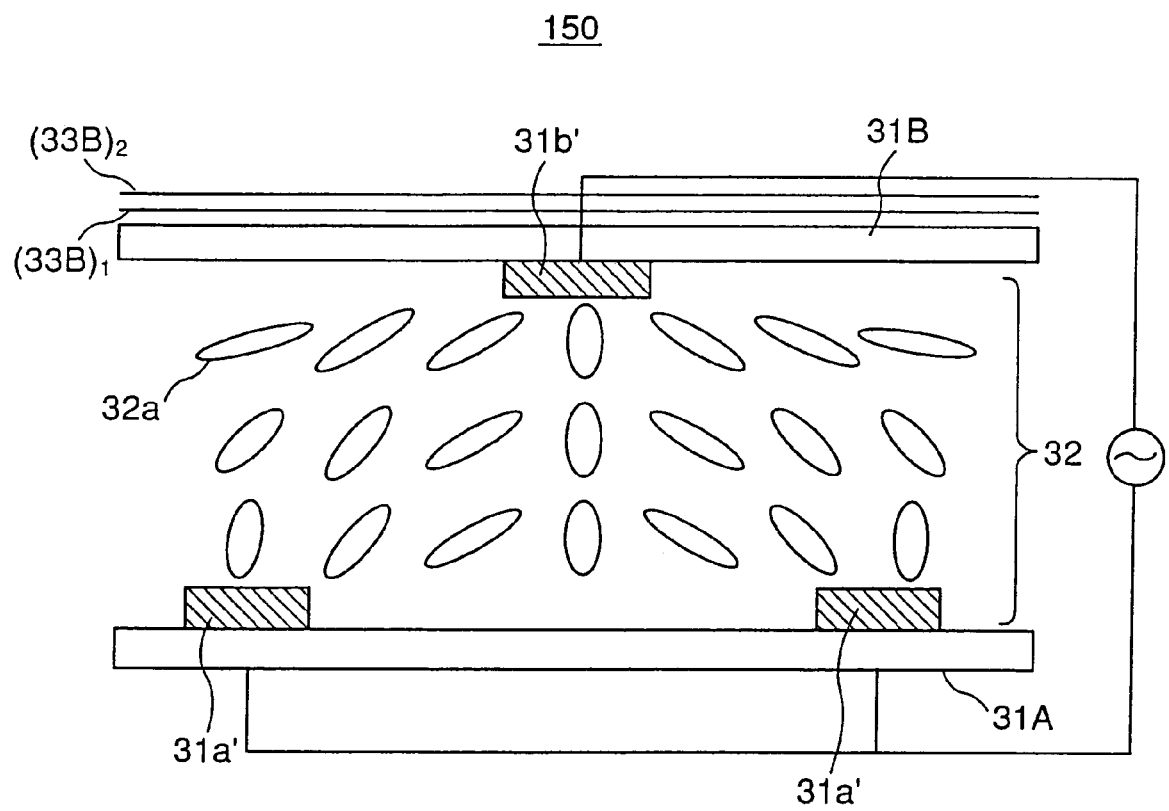
FIG. 93 is a diagram showing the construction of a liquid crystal display device according to a fourteenth embodiment of the present invention.

FIG. 93A shows the viewing-angle characteristics of the liquid crystal display device 140 in comparison with the viewing-angle characteristics of FIG. 93B for the case in which the retardation films are not provided. In FIGS. 93A and 93B, it should be noted that the hatched region indicates the region in which the contrast is smaller than about 1. From FIGS. 93A and 98B, it will be understood that the liquid crystal display device 140 shows a superior viewing-angle characteristic to the liquid crystal display device in which no retardation film is provided.

It should be noted that the characteristic of FIG. 93A is obtained also in the case in which a positive liquid crystal having a positive dielectric anisotropy is used for the liquid crystal layer 32.

Fourteenth Embodiment

Figure 94:
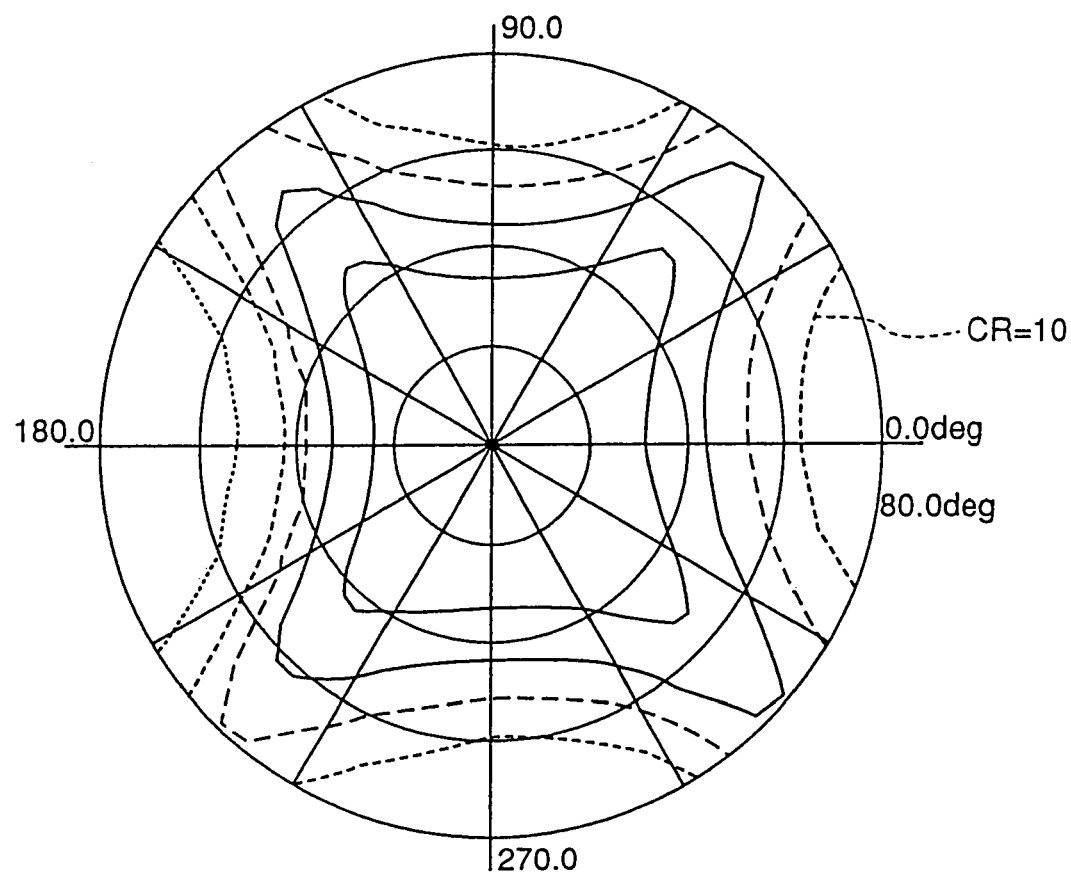
FIG. 94 is diagram showing the viewing-angle characteristics of the liquid crystal display device of FIG. 93.

FIG. 94 shows the construction of a liquid crystal display device 150 according to a fourteenth embodiment of the present invention, wherein those parts corresponding to the parts described previously are designated by the same reference numerals and the description thereof will be omitted.

Referring to FIG. 94, the liquid crystal display device 150 uses as p-type liquid crystal including p-type liquid crystal molecules 32a for the liquid crystal layer 32, such that the tilt angle of the liquid crystal molecules 32a is controlled in response to the drive voltage applied across the electrodes 31a' and 31b'. The glass substrates 31A and 31B are, covered by a molecular alignment film (not shown), and the molecular alignment film interacts with the liquid crystal molecules 32a such that the liquid crystal molecules 32a are aligned generally perpendicularly to the principal surface of the substrate 31A or 31B in the non-activated state of the liquid crystal display device 150. In the construction of FIG. 94, the liquid crystal display device 150 further includes the positive retardation film $(33B)_1$ and the negative retardation film $(33B)_2$ above the upper glass substrate 31A similarly to the construction of FIG. 54.

FIG. 95 shows the viewing-angle characteristic of the liquid crystal display device 150 of FIG. 94 for a case in which the positive liquid crystal ZLI-4792 of E. Merck, Inc. is used for the liquid crystal layer 32 and in which the retardation R of the retardation film $(33B)_1$ and the retardation R' of the retardation film $(33B)_2$ are set to 25 nm and 240 nm, respectively. In the evaluation of FIG. 95, it should further be noted that the JALS204 film of Nippon Synthetic Rubber, Co., LTD. is used for the molecular alignment film and the thickness of the liquid crystal layer 32 is set to 3.5 μm.

Referring to FIG. 95, it will be understood that the liquid crystal display device 150 has a viewing-angle characteristic similar to those obtained in the previous embodiments such as the embodiment of FIG. 65.

It should be noted that a similar viewing-angle characteristic is obtained also in the liquid crystal display device of FIGS. 5A and 5B. Further, the liquid crystal display device of FIGS. 5A and 5B or the liquid crystal display device of FIG. 94 is easily modified to have an active matrix construction indicated in FIG. 80. In this case, too, an excellent view angle characteristic is obtained.

Further, the present invention is not limited to the embodiments described heretofore, but various variations and modifications may be made without departing from the scope of the invention.

What is claimed is:

1. A liquid crystal display device, comprising:
a first substrate and a second substrate sandwiching a liquid crystal layer therebetween,
said liquid crystal layer including liquid crystal molecules of p-type aligned in a first pointing direction generally perpendicular to said first and second substrates in a non-active state in which no electric field is applied to said liquid crystal layer;
a first polarizer disposed adjacent to said first substrate at a side opposite to a side of said first substrate facing said liquid crystal layer;
a second polarizer disposed adjacent to said second substrate at a side opposite to a side of said second substrate facing said liquid crystal layer;
a first electrode provided on said first substrate;
a second electrode provided on said second substrate, said first and second electrodes forming an electric field acting therebetween in a direction oblique to said liquid crystal layer in a activated state in which a driving voltage is applied across said first and second electrodes, such that said liquid crystal molecules change a pointing direction thereof from said first pointing direction toward a second pointing direction parallel to said first and second substrates, and first and second retardation films respectively having a positive and a negative optical anisotropy, both disposed in at least one of a first gap formed between said first substrate and said first polarizer and a second gap formed between said second substrate and said second polarizer, wherein said first retardation film is closer to said liquid crystal layer than said second retardation film such that when viewed from said liquid crystal layer, said second retardation film is located outside of said first retardation film, said liquid crystal display device changing a state thereof from said non-activated state to said activated state by causing a change in a direction of said liquid crystal molecules from said first pointing direction to said second pointing direction in response to said electric field formed between said first and second electrodes.

2. A liquid crystal display device as claimed in claim 1, wherein said second electrode is located between two of said first electrodes when viewed in a direction perpendicular to said first and second substrates.

* * * * *